(12) United States Patent
Oberoi et al.

(10) Patent No.: US 11,235,375 B2
(45) Date of Patent: Feb. 1, 2022

(54) DUAL-INTERFACE COUPLER

(71) Applicant: The Boeing Company, Chicago, IL (US)

(72) Inventors: Harinder S. Oberoi, Snohomish, WA (US); Richard Griffith Reese, IV, Seattle, WA (US); Quang T. Do, Mukilteo, WA (US); Alan S. Draper, Everett, WA (US); Jeffrey Lawrence Miller, Mukilteo, WA (US); Michael J. Kozak, Snohomish, WA (US); Vanco Stojanoski, Macomb, MI (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 16/736,376

(22) Filed: Jan. 7, 2020

(65) Prior Publication Data

US 2020/0180011 A1    Jun. 11, 2020

Related U.S. Application Data

(63) Continuation of application No. 14/559,153, filed on Dec. 3, 2014, now Pat. No. 10,525,524.

(Continued)

(51) Int. Cl.
*B21J 15/28*    (2006.01)
*B64F 5/10*    (2017.01)
(Continued)

(52) U.S. Cl.
CPC .............. *B21J 15/28* (2013.01); *B21J 15/02* (2013.01); *B21J 15/10* (2013.01); *B21J 15/142* (2013.01);
(Continued)

(58) Field of Classification Search
CPC ... B21J 15/28; B21J 15/32; B21J 15/40; B21J 15/02; B21J 15/10; B21J 15/142;
(Continued)

(56) References Cited

U.S. PATENT DOCUMENTS 530,733 A    12/1894    Tower
819,866 A    5/1906    Dobson
(Continued)

FOREIGN PATENT DOCUMENTS

CN    1221500 A    6/1999
CN    2779207 Y    5/2006
(Continued)

OTHER PUBLICATIONS

Notice of Allowance, dated Feb. 26, 2018, regarding U.S. Appl. No. 15/352,524, 21 pages.
(Continued)

*Primary Examiner* — Mohammad Ali
*Assistant Examiner* — Kelvin Booker
(74) *Attorney, Agent, or Firm* — Yee & Associates, P.C.

(57) ABSTRACT

A dual-interface coupler includes a utilities unit, a number of utility cables configured to provide a number of utilities to the utilities unit, a first coupling unit associated with the utilities unit, and a second coupling unit associated with the utilities unit. The first coupling unit is configured to mechanically couple the utilities unit to a first corresponding coupling unit and comprises a utility interface. The number of utilities are configured to flow from the utilities unit through the utilities interface. The second coupling unit is configured to mechanically couple the second coupling unit to a second corresponding coupling unit.

20 Claims, 30 Drawing Sheets

Related U.S. Application Data

(60) Provisional application No. 62/022,641, filed on Jul. 9, 2014.

(51) Int. Cl.

| | | |
|---|---|---|
| *B21J 15/02* | (2006.01) | |
| *B29C 65/70* | (2006.01) | |
| *F16B 19/06* | (2006.01) | |
| *B23P 19/10* | (2006.01) | |
| *G05D 3/12* | (2006.01) | |
| *G05B 19/41* | (2006.01) | |
| *B21J 15/10* | (2006.01) | |
| *B21J 15/14* | (2006.01) | |
| *B60G 3/14* | (2006.01) | |
| *B25J 5/00* | (2006.01) | |
| *B25J 9/16* | (2006.01) | |
| *B25J 11/00* | (2006.01) | |
| *B60G 7/00* | (2006.01) | |
| *B21J 15/32* | (2006.01) | |
| *B21J 15/40* | (2006.01) | |
| *G05B 19/418* | (2006.01) | |
| *B25B 5/16* | (2006.01) | |
| *B29C 39/12* | (2006.01) | |
| *B29C 39/22* | (2006.01) | |
| *B64C 1/06* | (2006.01) | |
| *G05D 1/00* | (2006.01) | |
| *B29C 45/14* | (2006.01) | |
| *B29C 39/02* | (2006.01) | |
| *B29C 39/10* | (2006.01) | |
| *B64F 5/50* | (2017.01) | |
| *B23P 21/00* | (2006.01) | |
| *B29L 31/00* | (2006.01) | |
| *B60P 3/025* | (2006.01) | |

(52) U.S. Cl.
CPC .............. *B21J 15/32* (2013.01); *B21J 15/40* (2013.01); *B23P 19/10* (2013.01); *B25B 5/163* (2013.01); *B25J 5/007* (2013.01); *B25J 9/1682* (2013.01); *B25J 9/1687* (2013.01); *B25J 9/1697* (2013.01); *B25J 11/005* (2013.01); *B25J 11/007* (2013.01); *B29C 39/026* (2013.01); *B29C 39/10* (2013.01); *B29C 39/123* (2013.01); *B29C 39/22* (2013.01); *B29C 45/14336* (2013.01); *B29C 65/70* (2013.01); *B60G 3/145* (2013.01); *B60G 7/001* (2013.01); *B60G 7/008* (2013.01); *B64C 1/06* (2013.01); *B64F 5/10* (2017.01); *B64F 5/50* (2017.01); *F16B 19/06* (2013.01); *G05B 19/41805* (2013.01); *G05D 1/0088* (2013.01); *G05D 3/12* (2013.01); *B23P 21/002* (2013.01); *B23P 2700/00* (2013.01); *B23P 2700/01* (2013.01); *B29C 2045/14368* (2013.01); *B29C 2793/0081* (2013.01); *B29K 2715/00* (2013.01); *B29L 2031/748* (2013.01); *B60G 2204/143* (2013.01); *B60G 2204/418* (2013.01); *B60G 2206/8207* (2013.01); *B60G 2300/60* (2013.01); *B60P 3/025* (2013.01); *G05B 2219/45071* (2013.01); *Y02P 90/80* (2015.11); *Y10S 901/01* (2013.01); *Y10S 901/02* (2013.01); *Y10S 901/41* (2013.01)

(58) Field of Classification Search
CPC ..... B64F 5/10; B64F 5/50; B25J 5/007; B25J 9/1682; B25J 11/007; B25J 9/1687; B25J 9/1697; B25J 11/005; G05B 19/41805; G05B 2219/45071; G05B 19/41865; G05B 19/418; G05B 2219/45226; B25B 5/163; B29C 39/123; B29C 39/22; B29C 2045/14368; B29C 2793/0081; B29C 45/14336; B29C 39/026; B29C 39/10; B64C 1/06; B64C 1/00; B64C 1/12; B64C 1/068; B64C 2001/0072; B64C 1/069; G05D 1/0088; G05D 3/12; B60G 3/145; B60G 2204/143; B60G 2204/418; B60G 2206/8207; B60G 2300/60; B60G 7/001; B60G 7/008; Y02P 90/80; B23P 2700/01; B23P 2700/00; B23P 21/002; B23P 19/10; B60P 3/025; Y10S 901/41; Y10S 901/01; Y10S 901/02; B29K 2715/00; B29L 2031/748
See application file for complete search history.

(56) References Cited

U.S. PATENT DOCUMENTS

| | | | |
|---|---|---|---|
| 1,128,634 A | 2/1915 | Talbot | |
| 1,533,099 A | 4/1925 | Carroll | |
| 2,391,510 A | 12/1945 | Pioch et al. | |
| 2,505,245 A | 4/1950 | Hollerith | |
| 2,712,874 A | 7/1955 | Murray | |
| 2,714,321 A | 8/1955 | Roy | |
| 2,896,909 A | 7/1959 | Taylor | |
| 3,253,842 A | 5/1966 | Rabe | |
| 3,348,572 A | 10/1967 | Hall | |
| 3,774,636 A | 11/1973 | Arita | |
| 3,865,203 A | 2/1975 | Hibma | |
| 3,952,401 A | 4/1976 | Wagner | |
| 4,172,591 A | 10/1979 | Craig | |
| 4,424,741 A | 1/1984 | Moldestad | |
| 4,440,265 A | 4/1984 | Spagnoli | |
| 4,461,455 A | 7/1984 | Mills et al. | |
| 4,575,934 A | 3/1986 | Kitamura et al. | |
| 4,599,033 A | 7/1986 | Raz | |
| 4,685,368 A | 8/1987 | Gardener | |
| 4,714,339 A | 12/1987 | Lau et al. | |
| 4,740,025 A | 4/1988 | Nelson | |
| 4,798,371 A | 1/1989 | Wallisser | |
| 4,864,702 A | 9/1989 | Speller et al. | |
| 4,885,836 A | 12/1989 | Bonomi et al. | |
| 4,943,202 A | 7/1990 | Galloway | |
| 4,995,148 A | 2/1991 | Bonomi et al. | |
| 5,005,912 A | 4/1991 | Pipes | |
| 5,145,276 A | 9/1992 | Demange | |
| 5,152,228 A * | 10/1992 | Donkin | B60F 1/046 |
| | | | 105/215.1 |
| 5,163,793 A | 11/1992 | Martinez | |
| 5,248,341 A | 9/1993 | Berry et al. | |
| 5,302,141 A * | 4/1994 | O'Reilly | B60D 1/64 |
| | | | 439/680 |
| 5,408,219 A | 4/1995 | Newman et al. | |
| 5,423,396 A | 6/1995 | Fahrion | |
| 5,477,597 A | 12/1995 | Catania et al. | |
| 5,779,398 A * | 7/1998 | Battle | B60P 1/60 |
| | | | 406/108 |
| 5,795,078 A | 8/1998 | Li | |
| 5,857,713 A | 1/1999 | Horimoto | |
| 5,896,637 A | 4/1999 | Sarh | |
| 6,030,244 A | 2/2000 | Bickheit et al. | |
| 6,042,135 A * | 3/2000 | Ross | B60D 1/143 |
| | | | 280/456.1 |
| 6,098,260 A | 8/2000 | Sarh | |
| 6,108,896 A | 8/2000 | Gignac et al. | |
| 6,150,996 A * | 11/2000 | Nicholson | G09F 9/33 |
| | | | 345/1.3 |
| 6,158,666 A | 12/2000 | Banks et al. | |
| 6,282,036 B1 | 8/2001 | Woytassek | |
| 6,295,710 B1 | 10/2001 | Roberts et al. | |
| 6,318,746 B1 * | 11/2001 | McCrory | B62D 53/00 |
| | | | 280/411.1 |
| 6,357,194 B1 | 3/2002 | Jones | |
| 6,414,650 B1 * | 7/2002 | Nicholson | G06F 3/147 |
| | | | 345/1.1 |

(56) References Cited

U.S. PATENT DOCUMENTS

| | | |
|---|---|---|
| 6,447,073 B1 | 9/2002 | Goettker |
| 6,481,096 B2 | 11/2002 | Lehmker et al. |
| 6,505,393 B2 | 1/2003 | Stoewer et al. |
| 6,513,231 B1 | 2/2003 | Hafenrichter et al. |
| 6,575,443 B2 | 6/2003 | Kick |
| 7,111,854 B1 | 9/2006 | Tuthill et al. |
| 7,237,789 B1 | 7/2007 | Herman |
| 7,402,009 B2 | 7/2008 | Hamann et al. |
| 7,416,363 B2 | 8/2008 | Kozhuev |
| 7,530,607 B2 | 5/2009 | Luft |
| 7,601,007 B1 * | 10/2009 | Pogue .................. B60D 1/62 439/35 |
| 7,686,287 B2 | 3/2010 | Dixon et al. |
| 7,966,729 B2 | 6/2011 | Frauen et al. |
| 8,266,778 B2 | 9/2012 | Neuhaus et al. |
| 8,602,713 B1 | 12/2013 | Davis et al. |
| 8,634,950 B2 | 1/2014 | Simonetti et al. |
| 9,014,836 B2 | 4/2015 | Stone et al. |
| 9,096,331 B2 | 8/2015 | Gehlsen |
| 9,309,008 B2 | 4/2016 | Boulanger et al. |
| 9,315,137 B1 | 4/2016 | Davis et al. |
| 9,327,751 B2 | 5/2016 | Nou et al. |
| 9,505,051 B2 | 11/2016 | Oberoi et al. |
| 2001/0054228 A1 | 12/2001 | Lehmker et al. |
| 2002/0092149 A1 | 7/2002 | Wolf et al. |
| 2003/0009867 A1 | 1/2003 | Whiten et al. |
| 2004/0188112 A1 * | 9/2004 | Deves .................. B62D 49/02 172/439 |
| 2004/0267254 A1 | 12/2004 | Manzo et al. |
| 2005/0023052 A1 | 2/2005 | Beck et al. |
| 2005/0236888 A1 * | 10/2005 | Corbin .................. B60T 17/043 303/7 |
| 2005/0263302 A1 * | 12/2005 | Newnam .................. E02F 3/76 172/817 |
| 2005/0275181 A1 | 12/2005 | MacIsaac |
| 2006/0032702 A1 | 2/2006 | Linsmeier et al. |
| 2006/0117547 A1 | 6/2006 | Ffield et al. |
| 2006/0118235 A1 | 6/2006 | Lum et al. |
| 2006/0167587 A1 | 7/2006 | Read |
| 2006/0171776 A1 | 8/2006 | Luft |
| 2006/0218780 A1 | 10/2006 | Lewis et al. |
| 2006/0284047 A1 | 12/2006 | Spishak et al. |
| 2007/0001432 A1 | 1/2007 | Thurm |
| 2007/0036627 A1 | 2/2007 | Wright et al. |
| 2007/0051852 A1 | 3/2007 | McCoskey et al. |
| 2007/0072461 A1 * | 3/2007 | Williams ............ H01R 13/639 439/144 |
| 2007/0080001 A1 | 4/2007 | Beck et al. |
| 2007/0200379 A1 | 8/2007 | Key et al. |
| 2007/0276538 A1 | 11/2007 | Kjellsson |
| 2008/0087783 A1 | 4/2008 | Istas et al. |
| 2008/0099612 A1 | 5/2008 | Plude et al. |
| 2008/0160253 A1 | 7/2008 | Liu et al. |
| 2008/0178537 A1 | 7/2008 | Spangler et al. |
| 2008/0205763 A1 | 8/2008 | Marsh et al. |
| 2008/0250626 A1 | 10/2008 | Frankenberger et al. |
| 2008/0256776 A1 | 10/2008 | Neuhaus et al. |
| 2009/0022556 A1 | 1/2009 | Clark |
| 2009/0044655 A1 | 2/2009 | DeLouis et al. |
| 2009/0067973 A1 | 3/2009 | Eliuk et al. |
| 2009/0139375 A1 | 6/2009 | Hathaway |
| 2010/0031509 A1 | 2/2010 | Frauen et al. |
| 2010/0156632 A1 | 6/2010 | Hyland et al. |
| 2010/0235037 A1 | 6/2010 | Vian et al. |
| 2010/0307279 A1 | 12/2010 | Campagna et al. |
| 2011/0010007 A1 | 1/2011 | Sarh et al. |
| 2011/0037241 A1 * | 2/2011 | Temple ................ B62D 53/125 280/421 |
| 2011/0054694 A1 | 3/2011 | Munk |
| 2011/0063417 A1 | 3/2011 | Peters et al. |
| 2011/0101192 A1 | 5/2011 | Lee et al. |
| 2011/0189440 A1 | 8/2011 | Appleby et al. |
| 2012/0007374 A1 | 1/2012 | Nakasugi et al. |
| 2012/0041659 A1 * | 2/2012 | Greene .................... B60D 1/64 701/70 |
| 2012/0056405 A1 * | 3/2012 | Glazner ............... B62D 53/125 280/422 |
| 2012/0110816 A1 | 5/2012 | Groves et al. |
| 2012/0153597 A1 * | 6/2012 | Glazner ............... B62D 53/125 280/422 |
| 2012/0240381 A1 | 9/2012 | Carey |
| 2012/0300093 A1 | 11/2012 | Laudrain et al. |
| 2013/0008977 A1 | 1/2013 | Pfrenger et al. |
| 2013/0035783 A1 | 2/2013 | Scheuerman et al. |
| 2013/0152397 A1 | 6/2013 | Oberoi et al. |
| 2013/0167610 A1 | 7/2013 | Sarh et al. |
| 2013/0185925 A1 | 7/2013 | Sarh et al. |
| 2013/0193669 A1 * | 8/2013 | Glazner ................. B60R 16/08 280/421 |
| 2013/0318767 A1 | 12/2013 | Kott |
| 2014/0069193 A1 * | 3/2014 | Graham ................. G01N 29/04 73/584 |
| 2014/0096365 A1 | 4/2014 | Sarh et al. |
| 2014/0312581 A1 | 10/2014 | Anderson |
| 2014/0353894 A1 | 12/2014 | DesJardien et al. |
| 2014/0366352 A1 | 12/2014 | Jang |
| 2015/0005939 A1 | 1/2015 | DiStefano |
| 2015/0044896 A1 * | 2/2015 | Davies ................ H01R 13/639 439/345 |
| 2015/0345939 A1 * | 12/2015 | Salter ...................... B60Q 1/22 356/138 |
| 2015/0367886 A1 * | 12/2015 | Lavoie ............... B62D 15/0275 701/41 |
| 2015/0375390 A1 | 12/2015 | Becroft et al. |
| 2016/0075451 A1 | 3/2016 | Hunt et al. |
| 2016/0076879 A1 | 3/2016 | Hunt et al. |
| 2016/0130017 A1 | 5/2016 | Best et al. |
| 2016/0185467 A1 | 6/2016 | Lim |
| 2016/0311284 A1 | 10/2016 | Osborne et al. |
| 2016/0354883 A1 | 12/2016 | Vogat et al. |
| 2017/0015440 A1 | 1/2017 | Hunt et al. |
| 2017/0247122 A1 | 8/2017 | Hunt et al. |
| 2017/0253167 A1 | 9/2017 | Gill, III |

FOREIGN PATENT DOCUMENTS

| | | |
|---|---|---|
| CN | 101395059 A | 3/2009 |
| CN | 101462595 A | 6/2009 |
| CN | 102519441 A | 6/2010 |
| CN | 102001451 A | 4/2011 |
| CN | 102765489 A | 11/2012 |
| CN | 103228536 A | 7/2013 |
| CN | 103303491 A | 9/2013 |
| CN | 103434653 A | 12/2013 |
| CN | 103889664 A | 6/2014 |
| CN | 204624973 U | 9/2015 |
| DE | 1 0134852 A1 | 8/2002 |
| DE | 102008062026 A1 | 6/2010 |
| DE | 102009018991 A1 | 11/2010 |
| DE | 102011053800 A1 | 3/2013 |
| DE | 102012024865 A1 | 6/2014 |
| EP | 1063166 A1 | 12/2000 |
| EP | 1961514 A2 | 8/2008 |
| EP | 2166646 A1 | 3/2010 |
| EP | 2221151 A2 | 8/2010 |
| EP | 2527257 A1 | 11/2012 |
| EP | 2527527 A2 | 11/2012 |
| EP | 2604523 A2 | 6/2013 |
| EP | 2617536 A1 | 7/2013 |
| EP | 2965832 A3 | 1/2016 |
| EP | 2965871 A2 | 1/2016 |
| FR | 2153221 A1 | 5/1973 |
| FR | 2457151 A1 | 12/1980 |
| FR | 2706369 A1 | 12/1994 |
| FR | 2841809 A1 | 1/2004 |
| GB | 2473100 A | 3/2011 |
| WO | WO 9636461 A1 | 11/1996 |
| WO | WO2004113015 A2 | 12/2004 |

(56) References Cited

FOREIGN PATENT DOCUMENTS

| WO | WO2014023284 A2 | 2/2014 |
|---|---|---|
| WO | WO2014163921 A1 | 10/2014 |

OTHER PUBLICATIONS

Office Action, dated Feb. 22, 2018, regarding U.S. Appl. No. 14/559,191, 32 pages.
Extended European Search Report, dated Feb. 8, 2016, regarding Application No. EP14196497.3, 13 pages.
Partial European Search Report, dated Jan. 28, 2016, regarding Application No. EP14196608.5, 10 pages.
Extended European Search Report, dated Feb. 18, 2016, regarding Application No. EP14196581.4, 9 pages.
Office Action, dated Mar. 4, 2016, regarding U.S. Appl. No. 14/558,933, 22 pages.
Canadian Intellectual Property Office Office Action, dated Apr. 10, 2017, regarding Application No. 2,895,735, 3 pages.
Canadian Intellectual Property Office Office Action, dated May 2, 2017, regarding Application No. 2,894,311, 17 pages.
Canadian Intellectual Property Office Office Action, dated Apr. 27, 2017, regarding Application No. 2,895,737, 10 pages.
Canadian Intellectual Property Office Office Action, dated Apr. 6, 2017, regarding Application No. 2,894,306, 12 pages.
Final Office Action, dated Jun. 8, 2017, regarding U.S. Appl. No. 14/559,073, 22 pages.
Notice of Allowance, dated Jun. 2, 2017, regarding U.S. Appl. No. 14/559,115, 15 pages.
Final Office Action, dated May 9, 2017, regarding U.S. Appl. No. 14/559,191, 36 pages.
Final Office Action, dated Jun. 8, 2017, regarding U.S. Appl. No. 14/559,234, 22 pages.
Final Office Action, dated May 16, 2017, regarding U.S. Appl. No. 14/559,371, 27 pages.
Office Action, dated Apr. 5, 2017, regarding U.S. Appl. No. 14/559,518, 64 pages.
Decker et al. "Dynamic Measurement of Position and Orientation of Robots",IEEE Transactions on Instrumentation and Measurement, vol. 41, No. 6, Dec. 1992, 5 pages.
Canadian Intellectual Property Office Office Action, dated May 29, 2017, regarding Application No. 2,895,704, 7 pages.
Office Action, dated Jan. 27, 2017, U.S. Appl. No. 14/559,073, 53 pages.
Office Action, dated Nov. 29, 2016, U.S. Appl. No. 14/559,115, 48 pages.
Office Action, dated Feb. 1, 2017, regarding U.S. Appl. No. 14/559,234, 47 pages.
Office Action, dated Nov. 16, 2016, regarding U.S. Appl. No. 14/559,303, 48 pages.
Office Action, dated Jan. 18, 2017, regarding U.S. Appl. No. 14/559,371, 46 pages.
Extended European Search Report, dated Jul. 11, 2016, regarding Application No. 14196608.5, 15 pages.
Office Action, dated Feb. 10, 2017, regarding U.S. Appl. No. 14/559,855, 45 pages.
Office Action, dated Sep. 25, 2017, regarding U.S. Appl. No. 15/352,524, 49 pages.
Office Action, dated Nov. 22, 2017, regarding U.S. Appl. No. 14/559,234, 25 pages.
Office Action, dated Nov. 17, 2017, regarding U.S. Appl. No. 14/559,277, 73 pages.
Notice of Allowance, dated Sep. 6, 2017, regarding U.S. Appl. No. 14/559,371, 20 pages.
Notice of Allowance, dated Nov. 22, 2017, regarding U.S. Appl. No. 12/559,483, 17 pages.
Office Action, dated Dec. 12, 2017, regarding U.S. Appl. No. 14/559,073, 24 pages.
Final Office Action, dated Dec. 6, 2017, regarding U.S. Appl. No. 14/559,303, 32 pages.
Final Office Action, dated Aug. 9, 2017, regarding U.S. Appl. No. 14/559,855, 38 pages.
Office Action, dated Jun. 30, 2017, regarding U.S. Appl. No. 14/559,303, 25 pages.
Office Action, dated Jun. 30, 2017, regarding U.S. Appl. No. 14/559,483, 42 pages.
Final Office Action, dated Aug. 28, 2017, regarding U.S. Appl. No. 14/559,518, 29 pages.
Canadian Search Report, dated Jan. 30, 2017, regarding Application No. 2,895,739, 3 pages.
Extended European Search Report, dated Mar. 15, 2017, regarding Application No. 14196485.8, 9 pages.
Canadian Intellectual Property Office Examination Search Report, dated Feb. 23, 2017, regarding Application No. 2,896,059, 11 pages.
Notice of Allowance, dated Jul. 20, 2016, regarding U.S. Appl. No. 14/558,933, 18 pages.
Office Action, dated Sep. 23, 2016, regarding U.S. Appl. No. 14/559,191, 36 pages.
Sarh et al., "Positioning System for Electromagnetic Riveting," U.S. Appl. No. 14/168,259, filed Jan. 30, 2014, 82 pages.
Oberoi et al., "Mobile Platforms for Performing Operations along an Exterior of a Fuselage Assembly," U.S. Appl. No. 14/558,933, filed Dec. 3, 2014, 170 pages.
Oberoi et al., "Mobile Platforms for Performing Operations Inside a Fuselage Assembly," U.S. Appl. No. 14/559,073, filed Dec. 3, 2014, 163 pages.
Oberoi et al., "Wheel Mounting System," U.S. Appl. No. 14/559,115, filed Dec. 3, 2014, 149 pages.
Oberoi et al., "Metrology-Based System for Operating a Flexible Manufacturing System," U.S. Appl. No. 14/559,855, filed Dec. 3, 2014, 170 pages.
Oberoi et al., "Clamping Feet for an End Effector," U.S. Appl. No. 14/559,191, filed Dec. 3, 2014, 115 pages.
Oberoi et al., "Towers for Accessing an Interior of a Fuselage Assembly," U.S. Appl. No. 14/559,234, filed Dec. 3, 2014, 166 pages.
Oberoi et al., "Assembly Fixture for Supporting a Fuselage Assembly," U.S. Appl. No. 14/559,277, filed Dec. 3, 2014, 176 pages.
Oberoi et al., "Adjustable Retaining Structure for a Cradle Fixture," U.S. Appl. No. 14/559,303, filed Dec. 3, 2014, 175 pages.
Oberoi et al., "Utility Fixture for Creating a Distributed Utility Network," U.S. Appl. No. 14/559,371, filed Dec. 3, 2014, 158 pages.
Oberoi et al., "Two-Stage Riveting," U.S. Appl. No. 14/559,483, filed Dec. 3, 2014, 118 pages.
Oberoi et al., "Autonomous Flexible Manufacturing System for Building a Fuselage," U.S. Appl. No. 14/559,518, filed Dec. 3, 2014, 150 pages.
Extended European Search Report, dated May 4, 2016, regarding Application No. EP14196469.2, 8 pages.
Extended European Search Report, dated Apr. 8, 2016, regarding Application No. EP14196472.6, 6 pages.
Extended European Search Report, dated May 9, 2016, regarding Application No. EP14196474.2, 8 pages.
Extended European Search Report, dated May 10, 2016, regarding Application No. EP14196491.6, 7 pages.
European Patent Office Comunication Report, dated Dec. 6, 2018, regarding application No. 14196608.5, 4 pages.
Chinese National Intellectual Property Administration First Notification of Office Action with English Translation, dated Oct. 29, 2018, regarding application No. 201510400460.8, 16 pages.
European Patent Office Communication Report, dated Nov. 16, 2018, regarding application No. 14196574.8, 7 pages.
Canadian Intellectual Property Office Examination Search Report, dated Nov. 8, 2018, regarding application No. 2894308, 3 pages.
Chinese National Intellectual Property Administration First Notification of Office Action with English Translation, dated Oct. 26, 2018, regarding application No. 201510394571.2, 13 pages.
China National Intellectual Property Administration 2nd Notification of Office Action with English Translation, dated Jun. 5, 2019, regarding Application No. 201510394571.2, 13 pages.

(56) References Cited

OTHER PUBLICATIONS

The State Intellectual Property Office of China First Notification of Office Action, dated Feb. 9, 2018, regarding Application No. 201510394630.6, 10 pages.
Partial European Search Report, dated Jun. 20, 2016, regarding Application No. EP14196485.8, 129 pages.
Canadian Search Report, dated Jun. 28, 2016, regarding Application No. 2895735, 4 pages.
Canadian Search Report, dated Aug. 3, 2016, regarding Application No. 2895704, 4 pages.
Office Action, dated Jul. 21, 2021, regarding Korean Application No. 10-2015-0094486, 8 pages.

* cited by examiner

DUAL-INTERFACE COUPLER

This application is related to the following patent applications: entitled "Autonomous Flexible Manufacturing System for Building a Fuselage," Ser. No. 14/559,518, now U.S. Pat. No. 10,213,823; entitled "Mobile Platforms for Performing Operations along an Exterior of a Fuselage Assembly," Ser. No. 14/558,933, now U.S. Pat. No. 9,505,051; entitled "Mobile Platforms for Performing Operations Inside a Fuselage Assembly," Ser. No. 14/559,073, now U.S. Pat. No. 10,960,458; entitled "Wheel Mounting System," Ser. No. 14/559,115, now U.S. Pat. No. 9,782,822; entitled "Metrology-Based System for Operating a Flexible Manufacturing System," Ser. No. 14/559,855, now U.S. Pat. No. 10,046,381; entitled "Clamping Feet for an End Effector," Ser. No. 14/559,191, now U.S. Pat. No. 10,201,847; entitled "Towers for Accessing an Interior of a Fuselage Assembly," Ser. No. 14/559,234, now U.S. Pat. No. 10,406,593; entitled "Assembly Fixture for Supporting a Fuselage Assembly," Ser. No. 14/559,277, now U.S. Pat. No. 10,835,947; entitled "Adjustable Retaining Structure for a Cradle Fixture," Ser. No. 14/559,303, now U.S. Pat. No. 10,835,948; entitled "Utility Fixture for Creating a Distributed Utility Network," Ser. No. 14/559,371, now U.S. Pat. No. 9,895,741; and entitled "Two-Stage Riveting," Ser. No. 14/559,483, now U.S. Pat. No. 9,937,549, filed of even date herewith, each of which claims the benefit of U.S. Provisional Patent Application Ser. No. 62/022,641, filed Jul. 9, 2014 and entitled "Automated Flexible Manufacturing System for Building a Fuselage," each assigned to the same assignee, and each incorporated herein by reference in its entirety.

CROSS-REFERENCE TO RELATED APPLICATIONS

This application is related to the following patent applications: entitled "Autonomous Flexible Manufacturing System for Building a Fuselage," Ser. No. 14/559,518, now U.S. Pat. No. 10,213,823; entitled "Mobile Platforms for Performing Operations along an Exterior of a Fuselage Assembly," Ser. No. 14/558,933, now U.S. Pat. No. 9,505,051; entitled "Mobile Platforms for Performing Operations inside a Fuselage Assembly," Ser. No. 14/559,073; entitled "Wheel Mounting System," Ser. No. 14/559,115, now U.S. Pat. No. 9,782,822; entitled "Metrology-Based System for Operating a Flexible Manufacturing System," Ser. No. 14/559,855, now U.S. Pat. No. 10,046,381; entitled "Clamping Feet for an End Effector," Ser. No. 14/559,191, now U.S. Pat. No. 10,201,847; entitled "Towers for Accessing an Interior of a Fuselage Assembly," Ser. No. 14/559,234, now U.S. Pat. No. 10,406,593; entitled "Assembly Fixture for Supporting a Fuselage Assembly," Ser. No. 14/559,277; entitled "Adjustable Retaining Structure for a Cradle Fixture," Ser. No. 14/559,303; entitled "Utility Fixture for Creating a Distributed Utility Network," Ser. No. 14/559,371, now U.S. Pat. No. 9,895,741; and entitled "Two-Stage Riveting," Ser. No. 14/559,483, now U.S. Pat. No. 9,937,549, filed of even date herewith, each of which claims the benefit of U.S. Provisional Patent Application Ser. No. 62/022,641, filed Jul. 9, 2014 and entitled "Automated Flexible Manufacturing System for Building a Fuselage," each assigned to the same assignee, and each incorporated herein by reference in its entirety.

BACKGROUND INFORMATION

1. Field

The present disclosure relates generally to aircraft and, in particular, to building the fuselage of an aircraft. Still more particularly, the present disclosure relates to a method, apparatus, and system for coupling a number of utilities between a first system and a second system using a dual-interface coupler.

2. Background

Building a fuselage may include assembling skin panels and a support structure for the fuselage. The skin panels and support structure may be joined together to form a fuselage assembly. For example, without limitation, the skin panels may have support members, such as frames and stringers, attached to the surface of the skin panels that will face the interior of the fuselage assembly. These support members may be used to form the support structure for the fuselage assembly. The skin panels may be positioned relative to each other and the support members may be tied together to form this support structure.

Fastening operations may then be performed to join the skin panels and the support members together to form the fuselage assembly. These fastening operations may include, for example, riveting operations, interference-fit bolting operations, other types of attachment operations, or some combination thereof. The fuselage assembly may need to be assembled in a manner that meets outer mold line (OML) requirements and inner mold line (IML) requirements for the fuselage assembly.

With some currently available methods for building a fuselage assembly, the fastening operations performed to assemble the skin panels and the support members together may be performed manually. For example, without limitation, a first human operator positioned at an exterior of the fuselage assembly and a second human operator positioned at an interior of the fuselage assembly may use handheld tools to perform these fastening operations. In some cases, this type of manual fastening process may be more labor-intensive, time-consuming, ergonomically challenging, or expensive than desired. Further, some current assembly methods used to build fuselages that involve manual fastening processes may not allow fuselages to be built in the desired assembly facilities or factories at desired assembly rates or desired assembly costs.

In some cases, the current assembly methods and systems used to build fuselages may require that these fuselages be built in facilities or factories specifically designated and permanently configured for building fuselages. These current assembly methods and systems may be unable to accommodate different types and shapes of fuselages. For example, without limitation, large and heavy equipment needed for building fuselages may be permanently affixed to a factory and configured for use solely with fuselages of a specific type.

Further, providing utilities, such as power, air, communications, hydraulic fluid, water, and other types of utilities, to the various systems used in some current assembly methods may be more difficult or cumbersome than desired. For example, without limitation, the various cables and connection devices needed to provide these types of utilities to the different tools being used to assemble a fuselage may impede or restrict the movement of personnel and tools within a manufacturing environment. Therefore, it would be desirable to have a method and apparatus that take into account at least some of the issues discussed above, as well as other possible issues.

SUMMARY

In one illustrative embodiment, a method for coupling a number of utilities between a first system and a second system may be provided. A first interface that couples the number of utilities between the first system and the second system may be created between the first system and a utilities unit. The first interface may be activated. A second interface may be deactivated between the second system and the utilities unit while the first interface remains activated.

In another illustrative embodiment, an apparatus may comprise a first coupling unit associated with a utilities unit, a first corresponding coupling unit associated with a first system, a second coupling unit associated with the utilities unit, and a second corresponding coupling unit associated with a second system. The first corresponding coupling unit may be coupleable to the first coupling unit. The second corresponding coupling unit may be coupleable to the second coupling unit.

In yet another illustrative embodiment, a dual-interface coupler may comprise a first coupling unit associated with a utilities unit, a first corresponding coupling unit associated with a first system, a second coupling unit associated with the utilities unit, a second corresponding coupling unit associated with a second system, a first alignment system associated with the first corresponding coupling unit, and a second alignment system associated with the second corresponding coupling unit. The first corresponding coupling unit may be coupleable to the first coupling unit. The second corresponding coupling unit may be coupleable to the second coupling unit.

In yet another illustrative embodiment, a method for coupling a number of utilities between an external mobile platform and a cradle fixture may be provided. A first coupling unit associated with a utilities unit may be mated with a first corresponding coupling unit associated with the external mobile platform to create a first interface that comprises a mechanical interface and a utility interface. The number of utilities may be distributed from the cradle fixture through the utilities unit across the utility interface to the external mobile platform.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
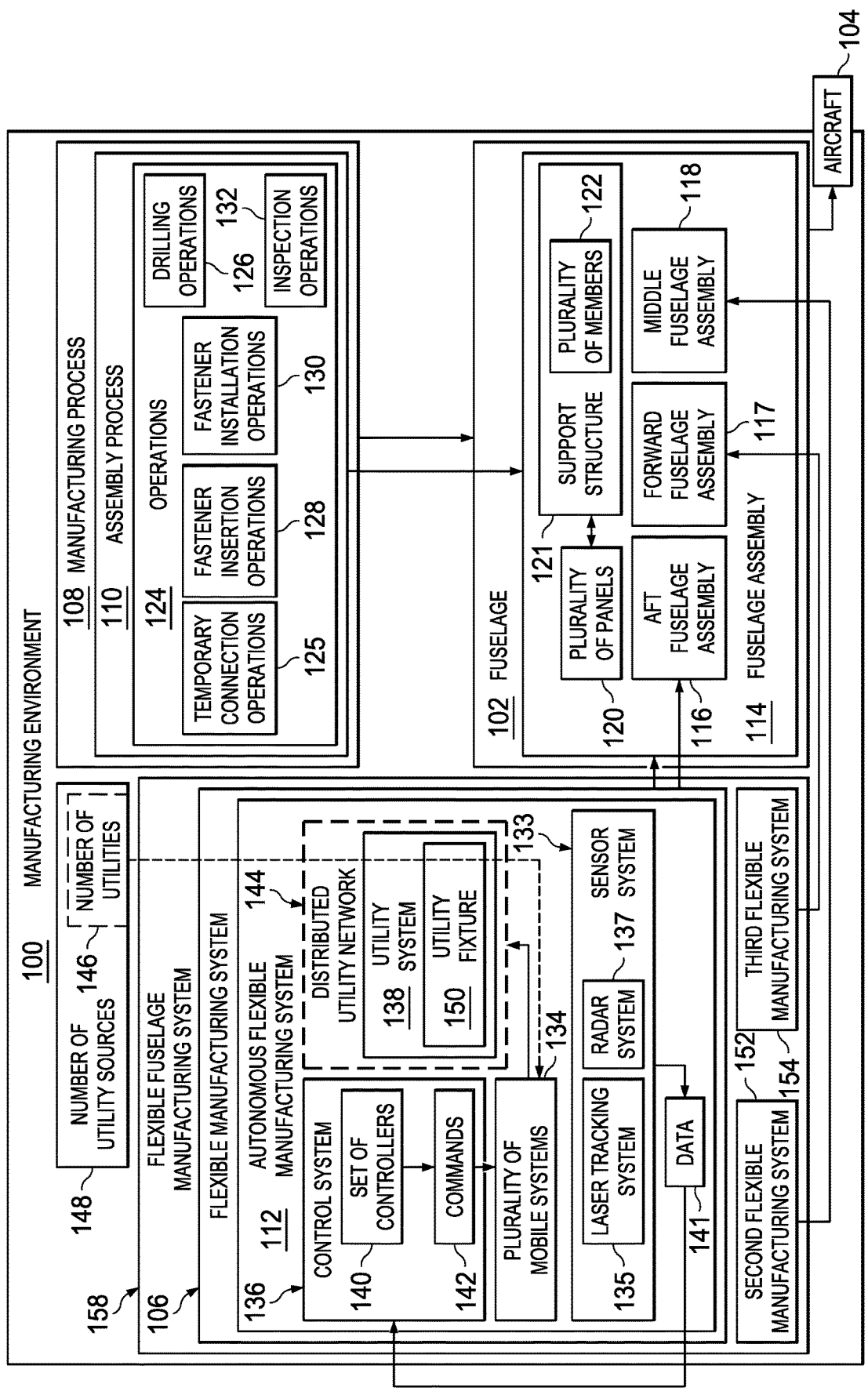
FIG. 1 is an illustration of a manufacturing environment in the form of a block diagram in accordance with an illustrative embodiment.

The illustrative embodiments recognize and take into account different considerations. For example, the illustrative embodiments recognize and take into account that it may be desirable to automate the process of building a fuselage assembly for an aircraft. Automating the process of building a fuselage assembly for an aircraft may improve build efficiency, improve build quality, and reduce costs associated with building the fuselage assembly. The illustrative embodiments also recognize and take into account that automating the process of building a fuselage assembly may improve the accuracy and precision with which assembly operations are performed, thereby ensuring improved compliance with outer mold line (OML) requirements and inner mold line (IML) requirements for the fuselage assembly.

Further, the illustrative embodiments recognize and take into account that automating the process used to build a fuselage assembly for an aircraft may significantly reduce the amount of time needed for the build cycle. For example, without limitation, automating fastening operations may reduce and, in some cases, eliminate, the need for human operators to perform these fastening operations as well as other types of assembly operations.

Further, this type of automation of the process for building a fuselage assembly for an aircraft may be less labor-intensive, time-consuming, ergonomically challenging, and expensive than performing this process primarily manually. Reduced manual labor may have a desired benefit for the human laborer. Additionally, automating the fuselage assembly process may allow fuselage assemblies to be built in desired assembly facilities and factories at desired assembly rates and desired assembly costs.

The illustrative embodiments also recognize and take into account that it may be desirable to use equipment that can be autonomously driven and operated to automate the process of building a fuselage assembly. In particular, it may be desirable to have an autonomous flexible manufacturing system comprised of mobile systems that may be autonomously driven across a factory floor, autonomously positioned relative to the factory floor as needed for building the fuselage assembly, autonomously operated to build the fuselage assembly, and then autonomously driven away when building of the fuselage assembly has been completed.

As used herein, performing any operation, action, or step autonomously may mean performing that operation substantially without any human input. For example, without limitation, a platform that may be autonomously driven is a platform that may be driven substantially independently of any human input. In this manner, an autonomously drivable platform may be a platform that is capable of driving or being driven substantially independently of human input.

Thus, the illustrative embodiments provide a method, apparatus, and system for building a fuselage assembly for an aircraft. In particular, the illustrative embodiments provide an autonomous flexible manufacturing system that automates most, if not all, of the process of building a fuselage assembly. For example, without limitation, the autonomous flexible manufacturing system may automate the process of installing fasteners to join fuselage skin panels and a fuselage support structure together to build the fuselage assembly. The illustrative embodiments provide a flexible manufacturing system that allows a fuselage assembly to be built in an austere manufacturing facility.

However, the illustrative embodiments recognize and take into account that automating the process for building a fuselage assembly using an autonomous flexible manufacturing system may present unique technical challenges that require unique technical solutions. For example, the illustrative embodiments recognize and take into account that it may be desirable to provide utilities to all of the various systems within the autonomous flexible manufacturing system. In particular, it may be desirable to provide these utilities in a manner that will not disrupt or delay the process of building the fuselage assembly or restrict the movement of various mobile systems within the autonomous flexible manufacturing system over a factory floor.

For example, without limitation, it may be desirable to provide a set of utilities, such as power, communications, and air, to the autonomous flexible manufacturing system using an infrastructure that includes only a single direct connection to each of a set of utility sources providing the set of utilities. These direct connections may be above-ground, in-ground, or embedded. These direct connections may be established using, for example, without limitation, a utility fixture. Thus, the infrastructure may include a utility fixture that provides a direct connection to each of the set of utility sources and an assembly area with a floor space sufficiently large to allow the various systems of an autonomous flexible manufacturing system to be coupled to the utility fixture and each other in series. In this manner, the set of utilities may flow from the set of utility sources to the utility fixture and then downstream to the various systems of the autonomous flexible manufacturing system within the assembly area.

Thus, the illustrative embodiments provide a distributed utility network that may be used to provide utilities to the various systems of the autonomous flexible manufacturing system. The distributed utility network may provide these utilities in a manner that does not restrict or impede movement of the various mobile systems of the autonomous flexible manufacturing system. The different mobile systems of the autonomous flexible manufacturing system may be autonomously coupled to each other to create this distributed utility network.

Referring now to the figures and, in particular, with reference to FIGS. 1-7, illustrations of a manufacturing environment are depicted in the form of block diagrams in accordance with an illustrative embodiment. In particular, in FIGS. 1-7, a fuselage assembly, a flexible manufacturing system, the various systems within the flexible manufacturing system that may be used to build the fuselage assembly, and a distributed utility network are described.

Turning now to FIG. 1, an illustration of a manufacturing environment is depicted in the form of a block diagram in accordance with an illustrative embodiment. In this illustrative example, manufacturing environment 100 may be an example of one environment in which at least a portion of fuselage 102 may be manufactured for aircraft 104.

Manufacturing environment 100 may take a number of different forms. For example, without limitation, manufacturing environment 100 may take the form of a factory, a manufacturing facility, an outdoor factory area, an enclosed manufacturing area, an offshore platform, or some other type of manufacturing environment 100 suitable for building at least a portion of fuselage 102.

Fuselage 102 may be built using manufacturing process 108. Flexible manufacturing system 106 may be used to implement at least a portion of manufacturing process 108. In one illustrative example, manufacturing process 108 may be substantially automated using flexible manufacturing system 106. In other illustrative examples, only one or more stages of manufacturing process 108 may be substantially automated.

Flexible manufacturing system 106 may be configured to perform at least a portion of manufacturing process 108 autonomously. In this manner, flexible manufacturing system 106 may be referred to as autonomous flexible manufacturing system 112. In other illustrative examples, flexible manufacturing system 106 may be referred to as an automated flexible manufacturing system.

As depicted, manufacturing process 108 may include assembly process 110 for building fuselage assembly 114. Flexible manufacturing system 106 may be configured to perform at least a portion of assembly process 110 autonomously.

Fuselage assembly 114 may be fuselage 102 at any stage during manufacturing process 108 prior to the completion of manufacturing process 108. In some cases, fuselage assembly 114 may be used to refer to a partially assembled fuselage 102. Depending on the implementation, one or more other components may need to be attached to fuselage assembly 114 to fully complete the assembly of fuselage 102. In other cases, fuselage assembly 114 may be used to refer to the fully assembled fuselage 102. Flexible manufacturing system 106 may build fuselage assembly 114 up to the point needed to move fuselage assembly 114 to a next stage in the manufacturing process for building aircraft 104. In some cases, at least a portion of flexible manufacturing system 106 may be used at one or more later stages in the manufacturing process for building aircraft 104.

In one illustrative example, fuselage assembly 114 may be an assembly for forming a particular section of fuselage 102. As one example, fuselage assembly 114 may take the form of aft fuselage assembly 116 for forming an aft section of fuselage 102. In another example, fuselage assembly 114 may take the form of forward fuselage assembly 117 for forming a forward section of fuselage 102. In yet another example, fuselage assembly 114 may take the form of middle fuselage assembly 118 for forming a center section of fuselage 102 or some other middle section of fuselage 102 between the aft and forward sections of fuselage 102.

As depicted, fuselage assembly 114 may include plurality of panels 120 and support structure 121. Support structure 121 may be comprised of plurality of members 122. Plurality of members 122 may be used to both support plurality of panels 120 and connect plurality of panels 120 to each other. Support structure 121 may help provide strength, stiffness, and load support for fuselage assembly 114.

Plurality of members 122 may be associated with plurality of panels 120. As used herein, when one component or structure is "associated" with another component or structure, the association is a physical association in the depicted examples.

For example, a first component, such as one of plurality of members 122, may be considered to be associated with a second component, such as one of plurality of panels 120, by being at least one of secured to the second component, bonded to the second component, mounted to the second component, attached to the component, coupled to the component, welded to the second component, fastened to the second component, adhered to the second component, glued to the second component, or connected to the second component in some other suitable manner. The first component also may be connected to the second component using one or more other components. For example, the first component may be connected to the second component using a third component. Further, the first component may be considered to be associated with the second component by being formed as part of the second component, an extension of the second component, or both. In another example, the first component may be considered part of the second component by being co-cured with the second component.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" or "at least one of item A, item B, or item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In these illustrative examples, a member of plurality of members 122 may be associated with at least one of plurality of panels 120 in a number of different ways. For example, without limitation, a member of plurality of members 122 may be attached directly to a single panel, attached to two or more panels, attached to another member that is directly attached to at least one panel, attached to at least one member that is directly or indirectly attached to at least one panel, or associated with at least one of plurality of panels 120 in some other way.

In one illustrative example, substantially all or all of plurality of members 122 may be associated with plurality of panels 120 prior to the beginning of assembly process 110 for building fuselage assembly 114. For example, a corresponding portion of plurality of members 122 may be associated with each panel of plurality of panels 120 prior to plurality of panels 120 being joined to each other through assembly process 110.

In another illustrative example, only a first portion of plurality of members 122 may be associated with plurality of panels 120 prior to the beginning of assembly process 110. Assembly process 110 may include attaching a remaining portion of plurality of members 122 to plurality of panels 120 for at least one of providing support to plurality of panels 120 or connecting plurality of panels 120 together.

The first portion of plurality of members 122 attached to plurality of panels 120 prior to assembly process 110 and the remaining portion of plurality of members 122 attached to plurality of panels 120 during assembly process 110 may together form support structure 121.

In yet another illustrative example, all of plurality of members 122 may be associated with plurality of panels 120 during assembly process 110. For example, each of plurality of panels 120 may be "naked" without any members attached to or otherwise associated with the panel prior to assembly process 110. During assembly process 110, plurality of members 122 may then be associated with plurality of panels 120.

In this manner, support structure 121 for fuselage assembly 114 may be built up in a number of different ways. Fuselage assembly 114 comprising plurality of panels 120 and support structure 121 is described in greater detail in FIG. 2 below.

Building fuselage assembly 114 may include joining plurality of panels 120 together. Joining plurality of panels 120 may be performed in a number of different ways. Depending on the implementation, joining plurality of panels 120 together may include joining one or more of plurality of members 122 to one or more of plurality of panels 120 or to other members of plurality of members 122.

In particular, joining plurality of panels 120 may include joining at least one panel to at least one other panel, joining at least one member to at least one other member, or joining at least one member to at least one panel, or some combination thereof. As one illustrative example, joining a first panel and a second panel together may include at least one of the following: fastening the first panel directly to the second panel, joining a first member associated with the first panel to a second member associated with the second panel, joining a member associated with the first panel directly to the second panel, joining one member associated with both the first panel and the second panel to another member, joining a selected member to both the first panel and the second panel, or some other type of joining operation.

Assembly process 110 may include operations 124 that may be performed to join plurality of panels 120 together to build fuselage assembly 114. In this illustrative example, flexible manufacturing system 106 may be used to perform at least a portion of operations 124 autonomously.

Operations 124 may include, for example, but are not limited to, temporary connection operations 125, drilling operations 126, fastener insertion operations 128, fastener installation operations 130, inspection operations 132, other types of assembly operations, or some combination thereof. Temporary connection operations 125 may be performed to temporarily connect plurality of panels 120 together. For example, without limitation, temporary connection operations 125 may include temporarily tacking plurality of panels 120 together using tack fasteners.

Drilling operations 126 may include drilling holes through one or more of plurality of panels 120 and, in some cases, through one or more of plurality of members 122. Fastener insertion operations 128 may include inserting fasteners into the holes drilled by drilling operations 126.

Fastener installation operations 130 may include fully installing each of the fasteners that have been inserted into the holes. Fastener installation operations 130 may include, for example, without limitation, riveting operations, interference-fit bolting operations, other types of fastener installation operations, or some combination thereof. Inspection operations 132 may include inspecting the fully installed fasteners. Depending on the implementation, flexible manufacturing system 106 may be used to perform any number of these different types of operations 124 substantially autonomously.

As depicted, flexible manufacturing system 106 may include plurality of mobile systems 134, control system 136, and utility system 138. Each of plurality of mobile systems 134 may be a drivable mobile system. In some cases, each of plurality of mobile systems 134 may be an autonomously drivable mobile system. For example, without limitation, each of plurality of mobile systems 134 may include one or more components that may be autonomously driven within manufacturing environment 100 from one location to another location. Plurality of mobile systems 134 are described in greater detail in FIG. 3 below.

In this illustrative example, control system 136 may be used to control the operation of flexible manufacturing system 106. For example, without limitation, control system 136 may be used to control plurality of mobile systems 134. In particular, control system 136 may be used to direct the movement of each of plurality of mobile systems 134 within manufacturing environment 100. Control system 136 may be at least partially associated with plurality of mobile systems 134.

In one illustrative example, control system 136 may include set of controllers 140. As used herein, a "set of" items may include one or more items. In this manner, set of controllers 140 may include one or more controllers.

Each of set of controllers 140 may be implemented using hardware, firmware, software, or some combination thereof. In one illustrative example, set of controllers 140 may be associated with plurality of mobile systems 134. For example, without limitation, one or more of set of controllers 140 may be implemented as part of plurality of mobile systems 134. In other examples, one or more of set of controllers 140 may be implemented independently of plurality of mobile systems 134.

Set of controllers 140 may generate commands 142 to control the operation of plurality of mobile systems 134 of flexible manufacturing system 106. Set of controllers 140 may communicate with plurality of mobile systems 134 using at least one of a wireless communications link, a wired communications link, an optical communications link, or other type of communications link. In this manner, any number of different types of communications links may be used for communication with and between set of controllers 140.

In these illustrative examples, control system 136 may control the operation of plurality of mobile systems 134 using data 141 received from sensor system 133. Sensor system 133 may be comprised of any number of individual sensor systems, sensor devices, controllers, other types of components, or combination thereof. In one illustrative example, sensor system 133 may include laser tracking system 135 and radar system 137. Laser tracking system 135 may be comprised of any number of laser tracking devices, laser targets, or combination thereof. Radar system 137 may be comprised of any number of radar sensors, radar targets, or combination thereof.

Sensor system 133 may be used to coordinate the movement and operation of the various mobile systems in plurality of mobile systems 134 within manufacturing environment 100. As one illustrative example, radar system 137 may be used for macro-positioning mobile systems, systems within mobile systems, components within mobile systems, or some combination thereof. Further, laser tracking system 135 may be used for micro-positioning mobile systems, systems within mobile systems, components within mobile systems, or some combination thereof.

Plurality of mobile systems 134 may be used to form distributed utility network 144. Depending on the implementation, one or more of plurality of mobile systems 134 may form distributed utility network 144. Number of utilities 146 may flow from number of utility sources 148 to the various mobile systems of plurality of mobile systems 134 that make up distributed utility network 144.

In this illustrative example, each of number of utility sources 148 may be located with manufacturing environment 100. In other illustrative examples, one or more of number of utility sources 148 may be located outside of manufacturing environment 100. The corresponding utility provided by these one or more utility sources may then be carried into manufacturing environment 100 using, for example, without limitation, one or more utility cables.

In one illustrative example, distributed utility network 144 may allow number of utilities 146 to flow directly from number of utility sources 148 to one mobile system in plurality of mobile systems 134 over some number of utility cables. This one mobile system may then distribute number of utilities 146 to other mobile systems of plurality of mobile systems 134 such that these other mobile systems do not need to directly receive number of utilities 146 from number of utility sources 148.

As depicted, distributed utility network 144 may be formed using utility system 138. Utility system 138 may include utility fixture 150. Utility system 138 may be configured to connect to number of utility sources 148 such that number of utilities 146 may flow from number of utility sources 148 to utility fixture 150. Utility fixture 150 may be above-ground or in-ground, depending on the implementation. For example, without limitation, utility fixture 150 may be embedded in a floor within manufacturing environment 100.

Utility fixture 150 may then distribute number of utilities 146 to one or more of plurality of mobile systems 134. In particular, one autonomous coupling of one of plurality of mobile systems 134 to utility fixture 150 may be followed by any number of autonomous couplings of mobile systems to each other in series to form distributed utility network 144. Utility fixture 150 may distribute number of utilities 146 to each of plurality of mobile systems 134 downstream of utility fixture 150 in the series of autonomous couplings of the mobile systems.

Depending on the implementation, distributed utility network 144 may have a chain-like configuration or a tree-like configuration. In one illustrative example, plurality of mobile systems 134 may include mobile systems A, B, C, and D (not shown in figure) with mobile system A autonomously coupled to utility fixture 150 and mobile systems B, C, and D autonomously coupled to mobile system A and each other in series. An example of a chain-like configuration for distributed utility network 144 may include number of utilities 146 flowing from number of utility sources 148 over some number of utility cables to utility fixture 150, from utility fixture 150 to mobile system A, from mobile system A to mobile system B, from mobile system B to mobile system C, and from mobile system C to mobile system D. An example of a tree-like configuration for distributed utility network 144 may include number of utilities 146 flowing from number of utility sources 148 over some number of utility cables to utility fixture 150, from utility fixture 150 to mobile system A, from mobile system A to both mobile system B and mobile system C, and from mobile system C to mobile system D. An example of one manner in which distributed utility network 144 may be implemented using plurality of mobile systems 134 is described in greater detail in FIG. 5 below.

In some illustrative examples, multiple flexible manufacturing systems may be used to build multiple fuselage assemblies concurrently. For example, flexible manufacturing system 106 may be a first flexible manufacturing system of many flexible manufacturing systems.

In one illustrative example, flexible manufacturing system 106, second flexible manufacturing system 152, and third flexible manufacturing system 154 may be used to build aft fuselage assembly 116, middle fuselage assembly 118, and forward fuselage assembly 117, respectively. Aft fuselage assembly 116, middle fuselage assembly 118, and forward fuselage assembly 117 may then be joined together to form a fully assembled fuselage 102. In this manner, in this example, flexible manufacturing system 106, second flexible manufacturing system 152, and third flexible manufacturing system 154 may together form flexible fuselage manufacturing system 158.

Thus, any number of fuselage assemblies, such as fuselage assembly 114, may be built within manufacturing environment 100 using any number of flexible manufacturing systems implemented in a manner similar to flexible manufacturing system 106. Similarly, any number of full fuselages, such as fuselage 102, may be built within manufacturing environment 100 using any number of flexible fuselage manufacturing systems implemented in a manner similar to flexible fuselage manufacturing system 158.

Figure 2:
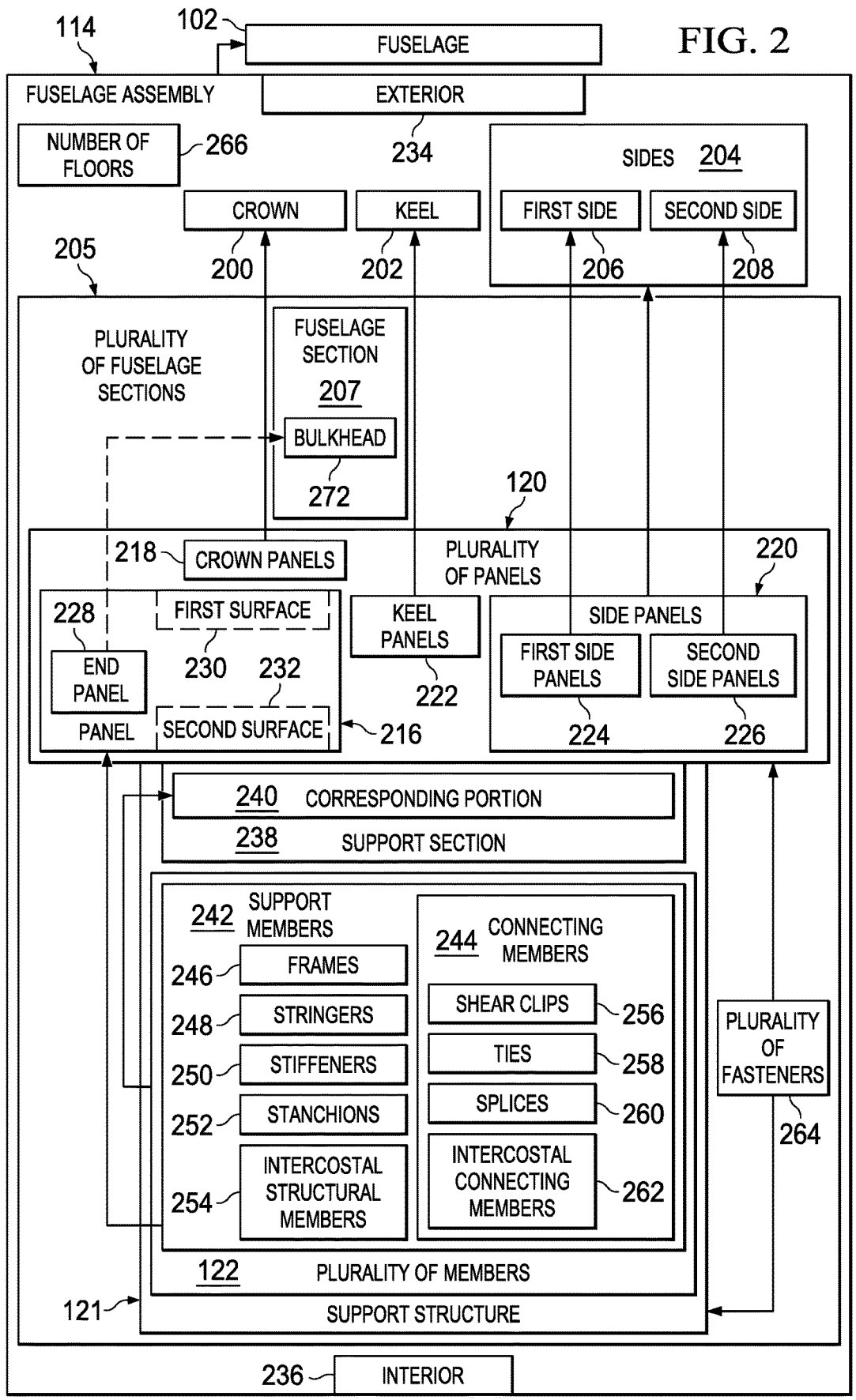
FIG. 2 is an illustration of a fuselage assembly in the form of a block diagram in accordance with an illustrative embodiment.

With reference now to FIG. 2, an illustration of fuselage assembly 114 from FIG. 1 is depicted in the form of a block diagram in accordance with an illustrative embodiment. As described above, fuselage assembly 114 may include plurality of panels 120 and support structure 121. Fuselage assembly 114 may be used to refer to any stage in the building of fuselage assembly 114. For example, fuselage assembly 114 may be used to refer to a single one of plurality of panels 120, multiple ones of plurality of panels 120 that have been or are being joined together, a partially built fuselage assembly, or a fully built fuselage assembly.

As depicted, fuselage assembly 114 may be built such that fuselage assembly 114 has plurality of fuselage sections 205. Each of plurality of fuselage sections 205 may include one or more of plurality of panels 120. In this illustrative example, each of plurality of fuselage sections 205 may take the form of a cylindrically-shaped fuselage section, a barrel-shaped fuselage section, a tapered cylindrical fuselage section, a cone-shaped fuselage section, a dome-shaped fuselage section, or a section having some other type of shape. Depending on the implementation, a fuselage section of plurality of fuselage sections 205 may have a shape that has a substantially circular cross-sectional shape, elliptical cross-sectional shape, oval cross-sectional shape, polygon with rounded corners cross-sectional shape, or otherwise closed-curve cross-sectional shape.

As one specific illustrative example, each of plurality of fuselage sections 205 may be a portion of fuselage assembly 114 defined between two radial cross-sections of fuselage assembly 114 that are taken substantially perpendicular to a center axis or longitudinal axis through fuselage assembly 114. In this manner, plurality of fuselage sections 205 may be arranged along the longitudinal axis of fuselage assembly 114. In other words, plurality of fuselage sections 205 may be arranged longitudinally.

Fuselage section 207 may be an example of one of plurality of fuselage sections 205. Fuselage section 207 may be comprised of one or more of plurality of panels 120. In one illustrative example, multiple panel sections may be arranged circumferentially around fuselage section 207 to form the skin of fuselage section 207. In some cases, multiple rows of two or more longitudinally adjacent panels may be arranged circumferentially around fuselage section 207 to form the skin of fuselage section 207.

In one illustrative example, fuselage assembly 114 may have crown 200, keel 202, and sides 204. Sides 204 may include first side 206 and second side 208.

Crown 200 may be the top portion of fuselage assembly 114. Keel 202 may be the bottom portion of fuselage assembly 114. Sides 204 of fuselage assembly 114 may be the portions of fuselage assembly 114 between crown 200 and keel 202. In one illustrative example, each of crown 200, keel 202, first side 206, and second side 208 of fuselage assembly 114 may be formed by at least a portion of at least one of plurality of panels 120. Further, a portion of each of plurality of fuselage sections 205 may form each of crown 200, keel 202, first side 206, and second side 208.

Panel 216 may be an example of one of plurality of panels 120. Panel 216 may also be referred to as a skin panel, a fuselage panel, or a fuselage skin panel, depending on the implementation. In some illustrative examples, panel 216 may take the form of a mega-panel comprised of multiple smaller panels, which may be referred to as sub-panels. A mega-panel may also be referred to as a super panel. In these illustrative examples, panel 216 may be comprised of at least one of a metal, a metal alloy, some other type of metallic material, a composite material, or some other type of material. As one illustrative example, panel 216 may be comprised of an aluminum alloy, steel, titanium, a ceramic material, a composite material, some other type of material, or some combination thereof.

When used to form keel 202 of fuselage assembly 114, panel 216 may be referred to as a keel panel or a bottom panel. When used to form one of sides 204 of fuselage assembly 114, panel 216 may be referred to as a side panel. When used to form crown 200 of fuselage assembly 114, panel 216 may be referred to as a crown panel or a top panel. As one illustrative example, plurality of panels 120 may include crown panels 218 for forming crown 200, side panels 220 for forming sides 204, and keel panels 222 for forming keel 202. Side panels 220 may include first side panels 224 for forming first side 206 and second side panels 226 for forming second side 208.

In one illustrative example, fuselage section 207 of plurality of fuselage sections 205 of fuselage assembly 114 may include one of crown panels 218, two of side panels 220, and one of keel panels 222. In another illustrative example, fuselage section 207 may form an end of fuselage assembly 114.

In some cases, fuselage section 207 may be comprised solely of a single panel, such as panel 216. For example, without limitation, panel 216 may take the form of end panel 228.

End panel 228 may be used to form one end of fuselage assembly 114. For example, when fuselage assembly 114 takes the form of aft fuselage assembly 116 in FIG. 1, end panel 228 may form the aftmost end of fuselage assembly 114. When fuselage assembly 114 takes the form of forward fuselage assembly 117 in FIG. 1, end panel 228 may form the forwardmost end of fuselage assembly 114.

In one illustrative example, end panel 228 may take the form of a cylindrically-shaped panel, a cone-shaped panel, a barrel-shaped panel, or a tapered cylindrical panel. For example, end panel 228 may be a single cylindrically-shaped panel having a substantially circular cross-sectional shape that may change in diameter with respect to a center axis for fuselage assembly 114.

In this manner, as described above, fuselage section 207 may be comprised solely of end panel 228. In some illustrative examples, fuselage section 207 may be an end fuselage section that is comprised of only a single panel, which may be end panel 228. In some cases, bulkhead 272 may be associated with end panel 228 when fuselage section 207 is an end fuselage section. Bulkhead 272, which may also be referred to as a pressure bulkhead, may be considered separate from or part of end panel 228, depending on the implementation. Bulkhead 272 may have a dome-type shape in these illustrative examples.

When fuselage assembly 114 takes the form of aft fuselage assembly 116 in FIG. 1, bulkhead 272 may be part of fuselage section 207 located at the aftmost end of aft fuselage assembly 116. When fuselage assembly 114 takes the form of forward fuselage assembly 117 in FIG. 1, bulkhead 272 may be part of fuselage section 207 located at forwardmost end of aft fuselage assembly 116. Middle fuselage assembly 118 in FIG. 1 may not include a bulkhead, such as bulkhead 272, at either end of middle fuselage assembly 118. In this manner, plurality of fuselage sections 205 may be implemented in any number of different ways.

Panel 216 may have first surface 230 and second surface 232. First surface 230 may be configured for use as an exterior-facing surface. In other words, first surface 230 may be used to form exterior 234 of fuselage assembly 114. Second surface 232 may be configured for use as an interior-facing surface. In other words, second surface 232 may be used to form interior 236 of fuselage assembly 114. Each of plurality of panels 120 may be implemented in a manner similar to panel 216.

As described earlier, support structure 121 may be associated with a corresponding one of plurality of panels 120. Support structure 121 may be comprised of plurality of members 122 that are associated with panel 216. In one illustrative example, corresponding portion 240 may be the portion of plurality of members 122 that correspond to panel 216. Corresponding portion 240 may form support section 238 corresponding to panel 216. Support section 238 may form a part of support structure 121.

Plurality of members 122 may include support members 242. Support members 242 may include, for example, without limitation, at least one of connecting members 244, frames 246, stringers 248, stiffeners 250, stanchions 252, intercostal structural members 254, or other types of structural members.

Connecting members 244 may connect other types of support members 242 together. In some cases, connecting members 244 may also connect support members 242 to plurality of panels 120. Connecting members 244 may include, for example, without limitation, shear clips 256, ties 258, splices 260, intercostal connecting members 262, other types of mechanical connecting members, or some combination thereof.

In one illustrative example, when panel 216 is comprised of multiple sub-panels, connecting members 244 may be used to, for example, without limitation, connect together complementary frames of frames 246 running in the hoop-wise direction on adjacent sub-panels and complementary stringers of stringers 248 running in the longitudinal direction on adjacent sub-panels. In other illustrative examples, connecting members 244 may be used to connect together complementary frames, stringers, or other types of support members on two or more adjacent panels in plurality of panels 120. In some cases, connecting members 244 may be used to connect together complementary support members on two or more adjacent fuselage sections.

Operations 124, as described in FIG. 1, may be performed to join plurality of panels 120 together to build fuselage assembly 114. In one illustrative example, plurality of fasteners 264 may be used to join plurality of panels 120 together.

As described above, joining plurality of panels 120 together may be performed in a number of different ways. Joining plurality of panels 120 together may include at least one of joining at least one panel in plurality of panels 120 to another one of plurality of panels 120, joining at least one panel in plurality of panels 120 to at least one of plurality of members 122, joining at least one member in plurality of members 122 to another one of plurality of members 122, or some other type of joining operation. Plurality of panels 120 may be joined together such that plurality of members 122 ultimately form support structure 121 for fuselage assembly 114.

As depicted, number of floors 266 may be associated with fuselage assembly 114. In this illustrative example, number of floors 266 may be part of fuselage assembly 114. Number of floors 266 may include, for example, without limitation, at least one of a passenger floor, a cargo floor, or some other type of floor.

Figure 3:
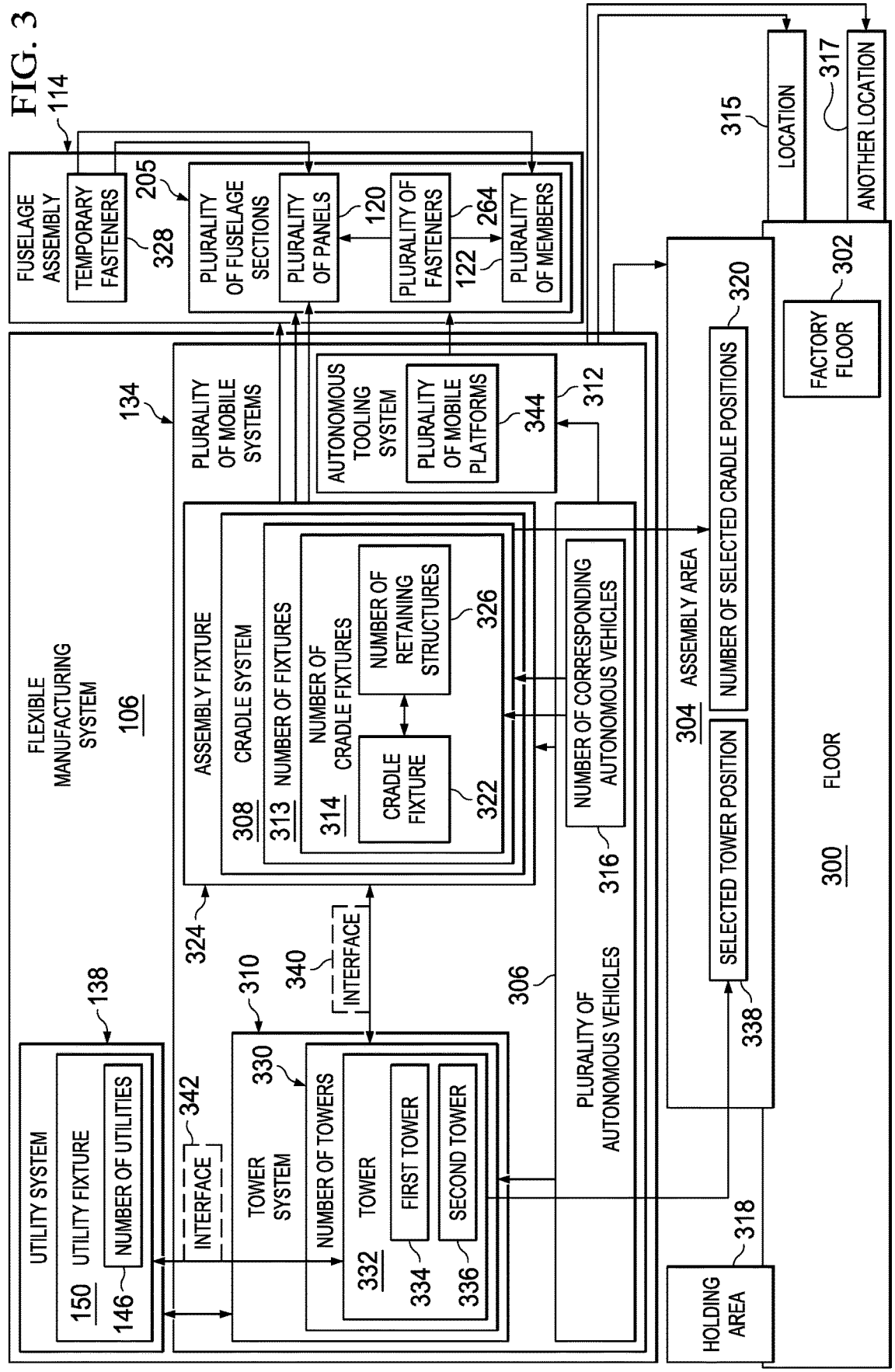
FIG. 3 is an illustration of a plurality of mobile systems of a flexible manufacturing system within a manufacturing environment in the form of a block diagram in accordance with an illustrative embodiment.

With reference now to FIG. 3, an illustration of plurality of mobile systems 134 of flexible manufacturing system 106 within manufacturing environment 100 from FIG. 1 is depicted in the form of a block diagram in accordance with an illustrative embodiment. As depicted, flexible manufacturing system 106 may be used to build fuselage assembly 114 on floor 300 of manufacturing environment 100. When manufacturing environment 100 takes the form of a factory, floor 300 may be referred to as factory floor 302.

In one illustrative example, floor 300 may be substantially smooth and substantially planar. For example, floor 300 may be substantially level. In other illustrative examples, one or more portions of floor 300 may be sloped, ramped, or otherwise uneven.

Assembly area 304 may be an area within manufacturing environment 100 designated for performing assembly process 110 in FIG. 1 to build a fuselage assembly, such as fuselage assembly 114. Assembly area 304 may also be referred to as a cell or a work cell. In this illustrative example, assembly area 304 may be a designated area on floor 300. However, in other illustrative examples, assembly area 304 may include a designated area on floor 300 as well as the area above this designated area. Any number of assembly areas may be present within manufacturing environment 100 such that any number of fuselage assemblies may be built concurrently within manufacturing environment 100.

As depicted, plurality of mobile systems 134 may include plurality of autonomous vehicles 306, cradle system 308, tower system 310, and autonomous tooling system 312. Each of plurality of mobile systems 134 may be drivable across floor 300. In other words, each of plurality of mobile systems 134 may be capable of being autonomously driven across floor 300 from one location 315 to another location 317 on floor 300.

In one illustrative example, each of plurality of autonomous vehicles 306 may take the form of an automated guided vehicle (AGV), which may be capable of operating independently without human direction or guidance. In some cases, plurality of autonomous vehicles 306 may be referred to as a plurality of automated guided vehicles (AGVs).

In this illustrative example, cradle system 308 may be used to support and hold fuselage assembly 114 during assembly process 110 in FIG. 1. In some cases, cradle system 308 may be referred to as a drivable cradle system. In still other cases, cradle system 308 may be referred to as an autonomously drivable cradle system.

Cradle system 308 may include number of fixtures 313. As used herein, a "number of" items may include one or more items. In this manner, number of fixtures 313 may include one or more fixtures. In some illustrative examples, number of fixtures 313 may be referred to as a number of drivable fixtures. In other illustrative examples, number of fixtures 313 may be referred to as a number of autonomously drivable fixtures.

Number of fixtures 313 may include number of cradle fixtures 314. In some illustrative examples, number of cradle fixtures 314 may be referred to as a number of drivable cradle fixtures. In other illustrative examples, number of cradle fixtures 314 may be referred to as a number of autonomously drivable cradle fixtures. Cradle fixture 322 may be an example of one of number of cradle fixtures 314.

Number of retaining structures 326 may be associated with each of number of cradle fixtures 314. Number of retaining structures 326 associated with each of number of cradle fixtures 314 may be engaged with and used to support fuselage assembly 114. For example, number of retaining structures 326 associated with cradle fixture 322 may be engaged with and used to support one or more of plurality of panels 120.

Number of cradle fixtures 314 may be autonomously driven across floor 300 of manufacturing environment 100 to assembly area 304. In one illustrative example, each of number of cradle fixtures 314 may be autonomously driven across floor 300 using a corresponding one of plurality of autonomous vehicles 306. In other words, without limitation, number of corresponding autonomous vehicles 316 in plurality of autonomous vehicles 306 may be used to drive number of cradle fixtures 314 across floor 300 into assembly area 304.

In this illustrative example, number of corresponding autonomous vehicles 316 may drive from, for example, without limitation, holding area 318, across floor 300, to assembly area 304. Holding area 318 may be an area in which at least one of plurality of autonomous vehicles 306, cradle system 308, tower system 310, autonomous tooling system 312, or control system 136 from FIG. 1 may be held when flexible manufacturing system 106 is not in use or when that particular device or system is not in use.

Holding area 318 may be referred to as a home area, a storage area, or a base area, depending on the implementation. Although holding area 318 is depicted as being located within manufacturing environment 100, holding area 318 may be located in some other area or environment outside of manufacturing environment 100 in other illustrative examples.

Number of corresponding autonomous vehicles 316 in plurality of autonomous vehicles 306 may drive number of cradle fixtures 314 into number of selected cradle positions 320. As used herein, a "position" may be comprised of a location, an orientation, or both. The location may be in two-dimensional coordinates or three-dimensional coordinates with respect to a reference coordinate system. The orientation may be a two-dimensional or three-dimensional orientation with respect to a reference coordinate system. This reference coordinate system may be, for example, without limitation, a fuselage coordinate system, an aircraft coordinate system, a coordinate system for manufacturing environment 100, or some other type of coordinate system.

When number of cradle fixtures 314 includes more than one cradle fixture such that number of selected cradle positions 320 includes more than one cradle position, these cradle positions may be positions selected relative to each other. In this manner, number of cradle fixtures 314 may be positioned such that number of cradle fixtures 314 are in number of selected cradle positions 320 relative to each other.

In these illustrative examples, number of corresponding autonomous vehicles 316 may be used to drive number of cradle fixtures 314 into number of selected cradle positions 320 within assembly area 304. "Driving" a component or a system across floor 300 may mean, for example, but not limited to, moving substantially the entirety of that component or system from one location to another location. For example, without limitation, driving cradle fixture 322 across floor 300 may mean moving the entirety of cradle fixture 322 from one location to another location. In other words, all or substantially all components that comprise cradle fixture 322 may be simultaneously moved together from one location to another location.

Once number of cradle fixtures 314 has been driven into number of selected cradle positions 320 in assembly area 304, number of cradle fixtures 314 may be coupled to each other and to tower system 310. Number of corresponding autonomous vehicles 316 may then drive away from number of cradle fixtures 314 to, for example, without limitation, holding area 318, once number of cradle fixtures 314 is positioned in number of selected cradle positions 320 within selected tolerances. In other illustrative examples, number of corresponding autonomous vehicles 316 may be comprised of a single autonomous vehicle that is used to drive each of number of cradle fixtures 314 into a corresponding selected position in number of selected cradle positions 320 within assembly area 304 one at a time.

In assembly area 304, number of cradle fixtures 314 may be configured to form assembly fixture 324. Assembly fixture 324 may be formed when the different cradle fixtures in number of cradle fixtures 314 have been placed in number of selected cradle positions 320 relative to each other. In some cases, assembly fixture 324 may be formed when number of cradle fixtures 314 have been coupled to each other while number of cradle fixtures 314 is in number of selected cradle positions 320 and when number of retaining structures 326 associated with each of number of cradle fixtures 314 has been adjusted to receive fuselage assembly 114.

In this manner, number of cradle fixtures 314 may form a single fixture entity, such as assembly fixture 324. Assembly fixture 324 may be used to support and hold fuselage assembly 114. In some cases, assembly fixture 324 may be referred to as an assembly fixture system or a fixture system. In some cases, assembly fixture 324 may be referred to as a drivable assembly fixture. In other cases, assembly fixture 324 may be referred to as an autonomously drivable assembly fixture.

Once assembly fixture 324 has been formed, number of cradle fixtures 314 may receive fuselage assembly 114. In other words, plurality of fuselage sections 205 may be engaged with number of cradle fixtures 314. In particular, plurality of fuselage sections 205 may be engaged with number of retaining structures 326 associated with each of number of cradle fixtures 314. Plurality of fuselage sections 205 may be engaged with number of cradle fixtures 314 in any number of ways.

When number of cradle fixtures 314 includes a single cradle fixture, that cradle fixture may be used to support and hold substantially the entire fuselage assembly 114. When number of cradle fixtures 314 includes multiple cradle fixtures, each of these cradle fixtures may be used to support and hold at least one corresponding fuselage section of plurality of fuselage sections 205.

In one illustrative example, each of plurality of fuselage sections 205 may be engaged with number of cradle fixtures 314 one at a time. For example, without limitation, all of the panels for a particular fuselage section in plurality of fuselage sections 205 may be positioned relative to each other and a corresponding cradle fixture in number of cradle fixtures 314 and then engaged with the corresponding cradle fixture. The remaining fuselage sections in plurality of fuselage sections 205 may then be formed and engaged with number of cradle fixtures 314 in a similar manner. In this manner, plurality of panels 120 may be engaged with number of cradle fixtures 314 by engaging at least a portion of plurality of panels 120 with number of retaining structures 326 associated with each of number of cradle fixtures 314 that makes up assembly fixture 324 such that plurality of panels 120 is supported by number of cradle fixtures 314.

As described in FIG. 2, plurality of panels 120 may include keel panels 222, side panels 220, and crown panels 218. In one illustrative example, all of keel panels 222 in FIG. 2 used to form keel 202 of fuselage assembly 114 in FIG. 2 may first be positioned relative to and engaged with number of cradle fixtures 314. Next, all of side panels 220 in FIG. 2 used to form sides 204 of fuselage assembly 114 in FIG. 2 may be positioned relative to and engaged with keel panels 222. Then, all of crown panels 218 in FIG. 2 used to form crown 200 of fuselage assembly 114 in FIG. 2 may be positioned relative to and engaged with side panels 220. In this manner, plurality of fuselage sections 205 may be concurrently assembled to form fuselage assembly 114.

In one illustrative example, each panel in plurality of panels 120 may have a corresponding portion of plurality of members 122 fully formed and associated with the panel prior to the panel being engaged with one of number of cradle fixtures 314. This corresponding portion of plurality of members 122 may be referred to as a support section. For example, support section 238 in FIG. 2 may be fully formed and associated with panel 216 in FIG. 2 prior to panel 216 being engaged with one of number of cradle fixtures 314 or another panel of plurality of panels 120 in FIG. 2. In other words, a corresponding portion of support members 242 in FIG. 2 may already be attached to panel 216 and a corresponding portion of connecting members 244 in FIG. 2 already installed to connect this portion of support members 242 to each other prior to panel 216 from FIG. 2 being engaged with one of number of cradle fixtures 314.

In other illustrative examples, plurality of members 122 may be associated with plurality of panels 120 after plurality of panels 120 have been engaged with each other and number of cradle fixtures 314. In still other illustrative examples, only a portion of plurality of members 122 may be associated with plurality of panels 120 prior to plurality of panels 120 being engaged with each other and number of cradle fixtures 314 and then a remaining portion of plurality of members 122 associated with plurality of panels 120 once plurality of panels 120 have been engaged with each other and number of cradle fixtures 314.

In some illustrative examples, one or more of support members 242 in FIG. 2, one or more of connecting members 244 in FIG. 2, or both may not be associated with panel 216 when panel 216 from FIG. 2 is engaged with one of number of cradle fixtures 314 or with one of the other panels in plurality of panels 120. For example, without limitation, frames 246 described in FIG. 2 may be added to panel 216 from FIG. 2 after panel 216 has been engaged with cradle fixture 322. In another example, stiffeners 250 described in FIG. 2 may be added to panel 216 from FIG. 2 after panel 216 has been engaged with cradle fixture 322.

Building fuselage assembly 114 may include engaging plurality of panels 120 with each other as plurality of panels 120 are built up on number of cradle fixtures 314 of assembly fixture 324. For example, adjacent panels in plurality of panels 120 may be connected by connecting at least a portion of the support members associated with the panels. Depending on the implementation, at least one of lap splices, butt splices, or other types of splices may be used to connect the adjacent panels in addition to or in place of connecting the corresponding support members of the adjacent panels.

As one illustrative example, the support members associated with two adjacent panels in plurality of panels 120 may be connected together using connecting members, thereby connecting the two adjacent panels. The two support members associated with these two adjacent panels may be, for example, without limitation, spliced, tied, clipped, tacked, pinned, joined, or fastened together in some other manner. When the two adjacent panels are hoop-wise adjacent, complementary frames may be connected in the hoop-wise direction. When the two adjacent panels are longitudinally adjacent, complementary stringers may be connected in the longitudinal direction.

In some cases, connecting complementary stringers, frames, or other support members on these two adjacent panels may be part of splicing these panels together. Adjacent panels may be connected together using any number of panel splices, stringer splices, frame splices, or other types of splices.

In one illustrative example, plurality of panels 120 may be temporarily connected to each other by temporarily fastening at least one of plurality of panels 120 or plurality of members 122 together using temporary fasteners or permanent fasteners. For example, without limitation, temporary clamps may be used to temporarily connect and hold in place two of plurality of panels 120 together. Temporarily connecting plurality of panels 120 together may be performed by at least one of temporarily connecting at least two plurality of panels 120 together, temporarily connecting at least two plurality of members 122 together, or temporarily connecting at least one of plurality of panels 120 to at least one of plurality of members 122 such that plurality of members 122 associated with plurality of panels 120 forms support structure 121 in FIG. 2 for fuselage assembly 114.

As one illustrative example, plurality of panels 120 may be temporarily tacked or pinned together using temporary fasteners 328 until plurality of fasteners 264 are installed to join plurality of panels 120 together to form fuselage assembly 114. Temporarily connecting plurality of panels 120 may temporarily connect together plurality of fuselage sections 205 from FIG. 2 formed by plurality of panels 120. Once plurality of fasteners 264 have been installed, temporary fasteners 328 may then be removed.

In this manner, plurality of panels 120 may be connected together in a number of different ways. Once plurality of panels 120 have been connected together, plurality of members 122 may be considered as forming support structure 121 for fuselage assembly 114. Connecting plurality of panels 120 together and forming support structure 121 may maintain desired compliance with outer mold line requirements and inner mold line requirements for fuselage assembly 114. In other words, plurality of panels 120 may be held together in place relative to each other such that fuselage assembly 114 formed using plurality of panels 120 meets outer mold line requirements and inner mold line requirements for fuselage assembly 114 within selected tolerances.

In particular, assembly fixture 324 may support plurality of panels 120 and support structure 121 associated with plurality of panels 120 such that fuselage assembly 114 built using plurality of panels 120 and support structure 121 has a shape and a configuration that is within selected tolerances. In this manner, this shape and configuration may be maintained within selected tolerances while supporting plurality of panels 120 and plurality of members 122 associated with plurality of panels 120 during the building of fuselage assembly 114. This shape may be at least partially determined by, for example, without limitation, the outer mold line requirements and inner mold line requirements for fuselage assembly 114. In some cases, the shape may be at least partially determined by the location and orientation of the frames and stringers of fuselage assembly 114.

In some cases, when the assembly of plurality of panels 120 and support structure 121 that comprise fuselage assembly 114 has reached a desired point, number of corresponding autonomous vehicles 316 may drive assembly fixture 324 out of assembly area 304. For example, fuselage assembly 114 may be driven across floor 300 into a different area within manufacturing environment 100, from floor 300 onto another floor in a different manufacturing environment, or from floor 300 onto another floor in some other area or environment.

In one illustrative example, assembly fixture 324 may be driven to some other location at which another assembly fixture is located such that the two assembly fixtures may be coupled to form a larger assembly fixture. As one illustrative example, assembly fixture 324 may be used to hold and support aft fuselage assembly 116 in FIG. 1, while another assembly fixture implemented in a manner similar to assembly fixture 324 may be used to hold and support forward fuselage assembly 117 in FIG. 1. Yet another assembly fixture implemented in a manner similar to assembly fixture 324 may be used to hold and support middle fuselage assembly 118 in FIG. 1.

Once these three fuselage assemblies have been built, the three assembly fixtures may be brought together to form a larger assembly fixture for holding aft fuselage assembly 116, middle fuselage assembly 118, and forward fuselage assembly 117 such that these three fuselage assemblies may be joined to form fuselage 102 described in FIG. 1. In particular, this larger assembly fixture may hold aft fuselage assembly 116, middle fuselage assembly 118, and forward fuselage assembly 117 in alignment with each other such that fuselage 102 may be built within selected tolerances.

In another illustrative example, a first assembly fixture and a second assembly fixture implemented in a manner similar to assembly fixture 324 may be used to hold and support aft fuselage assembly 116 and forward fuselage assembly 117, respectively, from FIG. 1. Once these two fuselage assemblies have been built, the two assembly fixtures may then be brought together to form a larger assembly fixture for holding the two fuselage assemblies such that these fuselage assemblies may be joined to form fuselage 102. The larger assembly fixture may hold aft fuselage assembly 116 and forward fuselage assembly 117 in alignment with each other such that fuselage 102 may be built within selected tolerances.

As depicted, tower system 310 includes number of towers 330. Tower 332 may be an example of one implementation for one of number of towers 330. Tower 332 may be configured to provide access to interior 236 of fuselage assembly 114 described in FIG. 2. In some illustrative examples, tower 332 may be referred to as a drivable tower. In other illustrative examples, tower 332 may be referred to as an autonomously drivable tower.

In one illustrative example, tower 332 may take the form of first tower 334. First tower 334 may also be referred to as an operator tower in some cases. In another illustrative example, tower 332 may take the form of second tower 336. Second tower 336 may also be referred to as a robotics tower in some cases. In this manner, number of towers 330 may include both first tower 334 and second tower 336.

First tower 334 may be configured substantially for use by a human operator, whereas second tower 336 may be configured substantially for use by a mobile platform having at least one robotic device associated with the mobile platform. In other words, first tower 334 may allow a human operator to access and enter interior 236 of fuselage assembly 114. Second tower 336 may allow a mobile platform to access and enter interior 236 of fuselage assembly 114.

First tower 334 and second tower 336 may be positioned relative to assembly fixture 324 at different times during assembly process 110. As one illustrative example, one of plurality of autonomous vehicles 306 may be used to move or autonomously drive first tower 334 from holding area 318 into selected tower position 338 within assembly area 304. Number of cradle fixtures 314 may then be autonomously driven, using number of corresponding autonomous vehicles 316, into number of selected cradle positions 320 relative to first tower 334, which is in selected tower position 338 within assembly area 304.

Second tower 336 may be exchanged for first tower 334 at some later stage during assembly process 110 in FIG. 1. For example, one of plurality of autonomous vehicles 306 may be used to autonomously drive first tower 334 out of assembly area 304 and back into holding area 318. The same autonomous vehicle or a different autonomous vehicle in plurality of autonomous vehicles 306 may then be used to autonomously drive second tower 336 from holding area 318 into selected tower position 338 within assembly area 304 that was previously occupied by first tower 334. Depending on the implementation, first tower 334 may be later exchanged for second tower 336.

In other illustrative examples, first tower 334 and second tower 336 may each have an autonomous vehicle in plurality of autonomous vehicles 306 fixedly associated with the tower. In other words, one of plurality of autonomous vehicles 306 may be integrated with first tower 334 and one of plurality of autonomous vehicles 306 may be integrated with second tower 336. For example, one of plurality of autonomous vehicles 306 may be considered part of or built into first tower 334. First tower 334 may then be considered capable of autonomously driving across floor 300. In a similar manner, one of plurality of autonomous vehicles 306 may be considered part of or built into second tower 336. Second tower 336 may then be considered capable of autonomously driving across floor 300.

Tower system 310 and assembly fixture 324 may be configured to form interface 340 with each other. Interface 340 may be a physical interface between tower system 310 and assembly fixture 324. Tower system 310 may also be configured to form interface 342 with utility system 138. In one illustrative example, interface 340 and interface 342 may be autonomously formed.

Interface 342 may be a physical interface between tower system 310 and utility system 138. In these illustrative examples, in addition to being physical interfaces, interface 340 and interface 342 may also be utility interfaces. For example, with respect to the utility of power, interface 340 and interface 342 may be considered electrical interfaces.

Utility system 138 is configured to distribute number of utilities 146 to tower system 310 when tower system 310 and utility system 138 are physically and electrically coupled through interface 342. Tower system 310 may then distribute number of utilities 146 to assembly fixture 324 formed by cradle system 308 when assembly fixture 324 and tower system 310 are physically and electrically coupled through interface 340. Number of utilities 146 may include at least one of power, air, hydraulic fluid, communications, water, or some other type of utility.

As depicted, utility system 138 may include utility fixture 150. Utility fixture 150 may be configured to receive number of utilities 146 from number of utility sources 148. Number of utility sources 148 may include, for example, without limitation, at least one of a power generator, a battery system, a water system, an electrical line, a communications system, a hydraulic fluid system, an air tank, or some other type of utility source. For example, utility fixture 150 may receive power from a power generator.

In one illustrative example, utility fixture 150 may be positioned relative to assembly area 304. Depending on the implementation, utility fixture 150 may be positioned inside assembly area 304 or outside of assembly area 304.

In some illustrative examples, utility fixture 150 may be associated with floor 300. Depending on the implementation, utility fixture 150 may be permanently associated with floor 300 or temporarily associated with floor 300. In other illustrative examples, utility fixture 150 may be associated with some other surface of manufacturing environment 100, such as a ceiling, or some other structure in manufacturing environment 100. In some cases, utility fixture 150 may be embedded within floor 300.

In one illustrative example, first tower 334 may be autonomously driven into selected tower position 338 with respect to floor 300 relative to utility fixture 150 such that interface 342 may be formed between first tower 334 and utility fixture 150. Once interface 342 has been formed, number of utilities 146 may flow from utility fixture 150 to first tower 334. Assembly fixture 324 may then autonomously form interface 340 with first tower 334 to form a network of utility cables between first tower 334 and assembly fixture 324. Once both interface 342 and interface 340 have been formed, number of utilities 146 received at utility fixture 150 may flow from utility fixture 150 to first tower 334 and to each of number of cradle fixtures 314 that forms assembly fixture 324. In this manner, first tower 334 may function as a conduit or "middleman" for distributing number of utilities 146 to assembly fixture 324.

When interface 340 has been formed between second tower 336 and assembly fixture 324 and interface 342 has been formed between second tower 336 and utility fixture 150, number of utilities 146 may be provided to second tower 336 and assembly fixture 324 in a similar manner as described above. Thus, utility fixture 150 may distribute number of utilities 146 to tower system 310 and assembly fixture 324 without tower system 310 and cradle assembly fixture 324 having to separately connect to number of utility sources 148 or any other utility sources.

Autonomous tooling system 312 may be used to assemble plurality of panels 120 and support structure 121 while fuselage assembly 114 is being supported and held by assembly fixture 324. Autonomous tooling system 312 may include plurality of mobile platforms 344. Each of plurality of mobile platforms 344 may be configured to perform one or more of operations 124 in assembly process 110 described in FIG. 1. In particular, plurality of mobile platforms 344 may be autonomously driven into selected positions relative to plurality of panels 120 within selected tolerances to autonomously perform operations 124 that join plurality of panels 120 together to build fuselage assembly 114. Plurality of mobile platforms 344 are described in greater detail in FIG. 4 below.

In this illustrative example, set of controllers 140 in control system 136 may generate commands 142 as described in FIG. 1 to control the operation of at least one of cradle system 308, tower system 310, utility system 138, autonomous tooling system 312, or plurality of autonomous vehicles 306. Set of controllers 140 in FIG. 1 may communicate with at least one of cradle system 308, tower system 310, utility system 138, autonomous tooling system 312, or plurality of autonomous vehicles 306 using any number of wireless communications links, wired communications links, optical communications links, other types of communications links, or combination thereof.

In this manner, plurality of mobile systems 134 of flexible manufacturing system 106 may be used to automate the process of building fuselage assembly 114. Plurality of mobile systems 134 may enable fuselage assembly 114 to be built substantially autonomously with respect to joining together plurality of panels 120 to reduce the overall time, effort, and human resources needed.

Flexible manufacturing system 106 may build fuselage assembly 114 up to the point needed to move fuselage assembly 114 to the next stage in manufacturing process 108 for building fuselage 102 or the next stage in the manufacturing process for building aircraft 104, depending on the implementation. In some cases, cradle system 308 in the form of assembly fixture 324 may continue carrying and supporting fuselage assembly 114 during one or more of these later stages in manufacturing process 108 for building fuselage 102 and aircraft 104.

Figure 4:
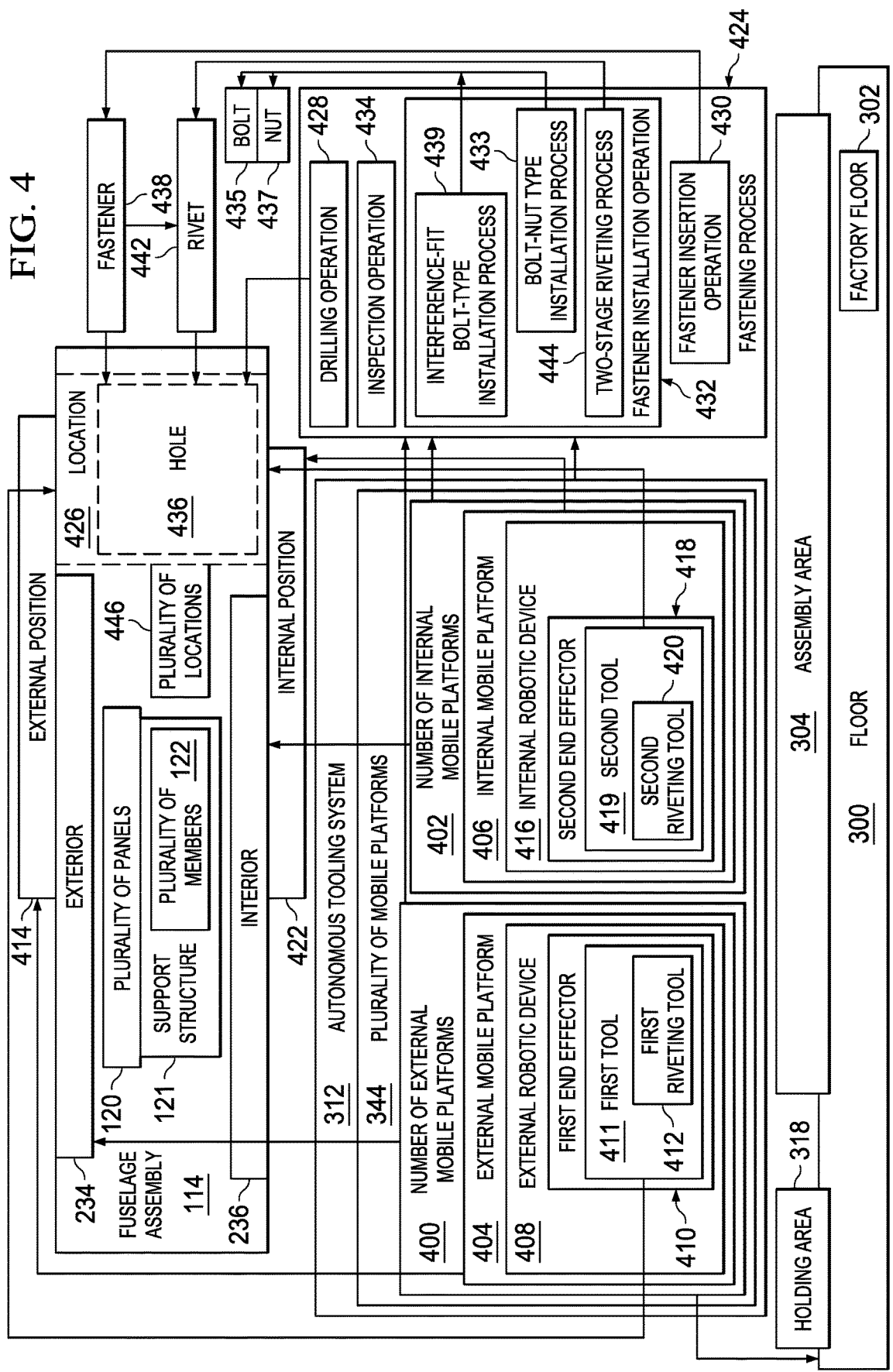
FIG. 4 is an illustration a plurality of mobile platforms in the form of a block diagram in accordance with an illustrative embodiment.

With reference now to FIG. 4, an illustration of plurality of mobile platforms 344 from FIG. 3 is depicted in the form of a block diagram in accordance with an illustrative embodiment. As depicted, plurality of mobile platforms 344 may include number of external mobile platforms 400 and number of internal mobile platforms 402. In this manner, plurality of mobile platforms 344 may include at least one external mobile platform and at least one internal mobile platform.

In some illustrative examples, number of external mobile platforms 400 may be referred to as a number of drivable external mobile platforms. Similarly, in some cases, number of internal mobile platforms 402 may be referred to as a number of drivable internal mobile platforms. In other illustrative examples, number of external mobile platforms 400 and number of internal mobile platforms 402 may be referred to as a number of autonomously drivable external mobile platforms and a number of autonomously drivable internal mobile platforms, respectively.

External mobile platform 404 may be an example of one of number of external mobile platforms 400 and internal mobile platform 406 may be an example of one of number of internal mobile platforms 402. External mobile platform 404 and internal mobile platform 406 may be platforms that are autonomously drivable. Depending on the implementation, each of external mobile platform 404 and internal mobile platform 406 may be configured to autonomously drive across floor 300 on its own or with the assistance of one of plurality of autonomous vehicles 306 from FIG. 3.

As one illustrative example, without limitation, external mobile platform 404 may be autonomously driven across floor 300 using a corresponding one of plurality of autonomous vehicles 306. In some illustrative examples, external mobile platform 404 and this corresponding one of plurality of autonomous vehicles 306 may be integrated with each other. For example, the autonomous vehicle may be fixedly associated with external mobile platform 404. An entire load of external mobile platform 404 may be transferable to the autonomous vehicle such that driving the autonomous vehicle across floor 300 drives external mobile platform 404 across floor 300.

External mobile platform 404 may be driven from, for example, without limitation, holding area 318 to a position relative to exterior 234 of fuselage assembly 114 to perform one or more operations 124 in FIG. 1. As depicted, at least one external robotic device 408 may be associated with external mobile platform 404. In this illustrative example, external robotic device 408 may be considered part of external mobile platform 404. In other illustrative examples, external robotic device 408 may be considered a separate component that is physically attached to external mobile platform 404. External robotic device 408 may take the form of, for example, without limitation, a robotic arm.

External robotic device 408 may have first end effector 410. Any number of tools may be associated with first end effector 410. These tools may include, for example, without limitation, at least one of a drilling tool, a fastener insertion tool, a fastener installation tool, an inspection tool, or some other type of tool. In particular, any number of fastening tools may be associated with first end effector 410.

As depicted, first tool 411 may be associated with first end effector 410. In one illustrative example, first tool 411 may be any tool that is removably associated with first end effector 410. In other words, first tool 411 associated with first end effector 410 may be changed as various operations need to be performed. For example, without limitation, first tool 411 may take the form of one type of tool, such as a drilling tool, to perform one type of operation. This tool may then be exchanged with another type of tool, such as a fastener insertion tool, to become the new first tool 411 associated with first end effector 410 to perform a different type of operation.

In one illustrative example, first tool 411 may take the form of first riveting tool 412. First riveting tool 412 may be used to perform riveting operations. In some illustrative examples, a number of different tools may be exchanged with first riveting tool 412 and associated with first end effector 410. For example, without limitation, first riveting tool 412 may be exchangeable with a drilling tool, a fastener insertion tool, a fastener installation tool, an inspection tool, or some other type of tool.

External mobile platform 404 may be autonomously driven across floor 300 and positioned relative to assembly fixture 324 in FIG. 3 supporting fuselage assembly 114 to position first end effector 410 and first tool 411 associated with first end effector 410 relative to one of plurality of panels 120. For example, external mobile platform 404 may be autonomously driven across floor 300 to external position 414 relative to assembly fixture 324. In this manner, first tool 411 carried by external mobile platform 404 may be macro-positioned using external mobile platform 404.

Once in external position 414, first end effector 410 may be autonomously controlled using at least external robotic device 408 to position first tool 411 associated with first end effector 410 relative to a particular location on an exterior-facing side of one of plurality of panels 120. In this manner, first tool 411 may be micro-positioned relative to the particular location.

Internal mobile platform 406 may be located on second tower 336 in FIG. 3 when internal mobile platform 406 is not in use. When interface 340 described in FIG. 3 is formed between second tower 336 and assembly fixture 324, internal mobile platform 406 may be driven from second tower 336 into interior 236 of fuselage assembly 114 and used to perform one or more of operations 124. In one illustrative example, internal mobile platform 406 may have a movement system that allows internal mobile platform 406 to move from second tower 336 onto a floor inside fuselage assembly 114.

At least one internal robotic device 416 may be associated with internal mobile platform 406. In this illustrative example, internal robotic device 416 may be considered part of internal mobile platform 406. In other illustrative examples, internal robotic device 416 may be considered a separate component that is physically attached to internal mobile platform 406. Internal robotic device 416 may take the form of, for example, without limitation, a robotic arm.

Internal robotic device 416 may have second end effector 418. Any number of tools may be associated with second end effector 418. For example, without limitation, at least one of a drilling tool, a fastener insertion tool, a fastener installation tool, an inspection tool, or some other type of tool may be associated with second end effector 418. In particular, any number of fastening tools may be associated with second end effector 418.

As depicted, second tool 419 may be associated with second end effector 418. In one illustrative example, second tool 419 may be any tool that is removably associated with second end effector 418. In other words, second tool 419 associated with second end effector 418 may be changed as various operations need to be performed. For example, without limitation, first tool 411 may take the form of one type of tool, such as a drilling tool, to perform one type of operation. This tool may then be exchanged with another type of tool, such as a fastener insertion tool, to become the new first tool 411 associated with first end effector 410 to perform a different type of operation.

In one illustrative example, second tool 419 may take the form of second riveting tool 420. Second riveting tool 420 may be associated with second end effector 418. Second riveting tool 420 may be used to perform riveting operations. In some illustrative examples, a number of different tools may be exchanged with second riveting tool 420 and associated with second end effector 418. For example, without limitation, second riveting tool 420 may be exchangeable with a drilling tool, a fastener insertion tool, a fastener installation tool, an inspection tool, or some other type of tool.

Internal mobile platform 406 may be driven from second tower 336 into fuselage assembly 114 and positioned relative to interior 236 of fuselage assembly 114 to position second end effector 418 and second tool 419 associated with second end effector 418 relative to one of plurality of panels 120. In one illustrative example, internal mobile platform 406 may be autonomously driven onto one of number of floors 266 in FIG. 2 into internal position 422 within fuselage assembly 114 relative to fuselage assembly 114. In this manner, second tool 419 may be macro-positioned into internal position 422 using internal mobile platform 406.

Once in internal position 422, second end effector 418 may be autonomously controlled to position second tool 419 associated with second end effector 418 relative to a particular location on an interior-facing side of one of plurality of panels 120 or an interior-facing side of one of plurality of members 122 in FIG. 2 that make up support structure 121. In this manner, second tool 419 may be micro-positioned relative to the particular location.

In one illustrative example, external position 414 for external mobile platform 404 and internal position 422 for internal mobile platform 406 may be selected such that fastening process 424 may be performed at location 426 on fuselage assembly 114 using external mobile platform 404 and internal mobile platform 406. Fastening process 424 may include any number of operations. In one illustrative example, fastening process 424 may include at least one of drilling operation 428, fastener insertion operation 430, fastener installation operation 432, inspection operation 434, or some other type of operation.

As one specific example, drilling operation 428 may be performed autonomously using first tool 411 associated with first end effector 410 of external mobile platform 404 or second tool 419 associated with second end effector 418 of internal mobile platform 406. For example, without limitation, first tool 411 or second tool 419 may take the form of a drilling tool for use in performing drilling operation 428. Drilling operation 428 may be autonomously performed using first tool 411 or second tool 419 to form hole 436 at location 426. Hole 436 may pass through at least one of two panels in plurality of panels 120, two members of a plurality of members 122, or a panel and one of plurality of members 122.

Fastener insertion operation 430 may be performed autonomously using first tool 411 associated with first end effector 410 of external mobile platform 404 or second tool 419 associated with second end effector 418 of internal mobile platform 406. Fastener insertion operation 430 may result in fastener 438 being inserted into hole 436.

Fastener installation operation 432 may then be performed autonomously using at least one of first tool 411 associated with first end effector 410 of external mobile platform 404 or second tool 419 associated with second end effector 418 of internal mobile platform 406. In one illustrative example, fastener installation operation 432 may be performed autonomously using first tool 411 in the form of first riveting tool 412 and second tool 419 in the form of second riveting tool 420 such that fastener 438 becomes rivet 442 installed at location 426. Rivet 442 may be a fully installed rivet. Rivet 442 may be one of plurality of fasteners 264 described in FIG. 2.

In one illustrative example, fastener installation operation 432 may take the form of bolt-nut type installation process 433. First tool 411 associated with first end effector 410 may be used to, for example, without limitation, install bolt 435 through hole 436. Second tool 419 associated with second end effector 418 may then be used to install nut 437 over bolt 435. In some cases, installing nut 437 may include applying a torque sufficient to nut 437 such that a portion of nut 437 breaks off. In these cases, nut 437 may be referred to as a frangible collar.

In another illustrative example, fastener installation operation 432 may take the form of interference-fit bolt-type installation process 439. First tool 411 associated with first end effector 410 may be used to, for example, without limitation, install bolt 435 through hole 436 such that an interference fit is created between bolt 435 and hole 436. Second tool 419 associated with second end effector 418 may then be used to install nut 437 over bolt 435.

In yet another illustrative example, fastener installation operation 432 may take the form of two-stage riveting process 444. Two-stage riveting process 444 may be performed using, for example, without limitation, first riveting tool 412 associated with external mobile platform 404 and second riveting tool 420 associated with internal mobile platform 406.

For example, first riveting tool 412 and second riveting tool 420 may be positioned relative to each other by external mobile platform 404 and internal mobile platform 406, respectively. For example, external mobile platform 404 and external robotic device 408 may be used to position first riveting tool 412 relative to location 426 at exterior 234 of fuselage assembly 114. Internal mobile platform 406 and internal robotic device 416 may be used to position second riveting tool 420 relative to the same location 426 at interior 236 of fuselage assembly 114.

First riveting tool 412 and second riveting tool 420 may then be used to perform two-stage riveting process 444 to form rivet 442 at location 426. Rivet 442 may join at least two of plurality of panels 120 together, a panel in plurality of panels 120 to support structure 121 formed by plurality of members 122, or two panels in plurality of panels 120 to support structure 121.

In this example, two-stage riveting process 444 may be performed at each of plurality of locations 446 on fuselage assembly 114 to install plurality of fasteners 264 as described in FIG. 2. Two-stage riveting process 444 may ensure that plurality of fasteners 264 in FIG. 2 are installed at plurality of locations 446 with a desired quality and desired level of accuracy.

In this manner, internal mobile platform 406 may be autonomously driven and operated inside fuselage assembly 114 to position internal mobile platform 406 and second riveting tool 420 associated with internal mobile platform 406 relative to plurality of locations 446 on fuselage assembly 114 for performing assembly process 110 described in FIG. 1. Similarly, external mobile platform 404 may be autonomously driven and operated around fuselage assembly 114 to position external mobile platform 404 and first riveting tool 412 associated with external mobile platform 404 relative to plurality of locations 446 on fuselage assembly 114 for performing operations 124.

Figure 5:
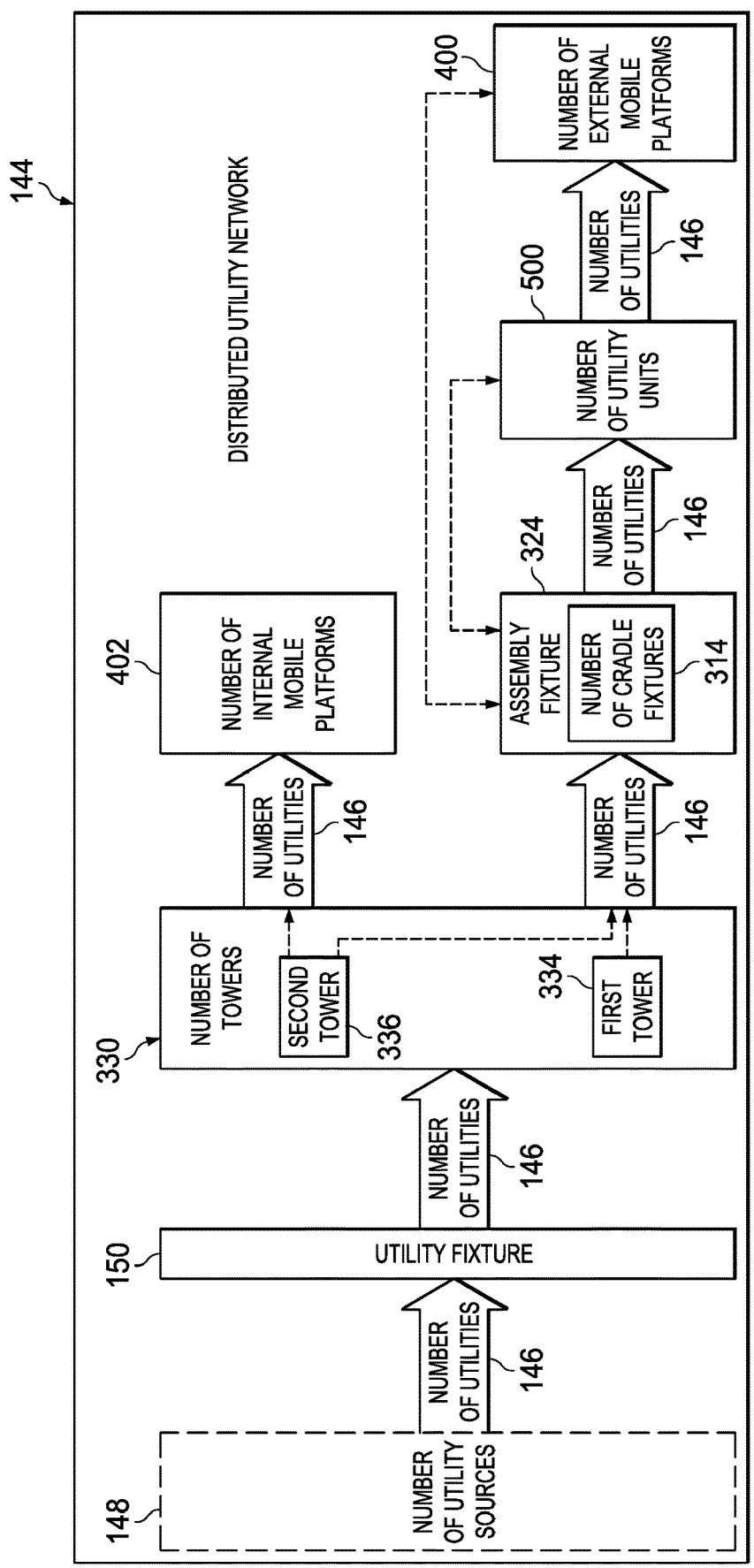
FIG. 5 is an illustration of a flow of a number of utilities across a distributed utility network in the form of a block diagram in accordance with an illustrative embodiment.

With reference now to FIG. 5, an illustration of a flow of number of utilities 146 across distributed utility network 144 from FIG. 1 is depicted in the form of a block diagram in accordance with an illustrative embodiment. As depicted, number of utilities 146 may be distributed across distributed utility network 144.

Distributed utility network 144 may include, for example, without limitation, number of utility sources 148, utility fixture 150, number of towers 330, assembly fixture 324, number of external mobile platforms 400, and number of utility units 500. In some cases, distributed utility network 144 may also include number of internal mobile platforms 402. In some illustrative examples, number of utility sources 148 may be considered separate from distributed utility network 144.

In this illustrative example, only one of number of towers 330 may be included in distributed utility network 144 at a time. When first tower 334 is used, distributed utility network 144 may be formed when utility fixture 150 is coupled to number of utility sources 148, first tower 334 is coupled to utility fixture 150, assembly fixture 324 is coupled to first tower 334, and number of external mobile platforms 400 is coupled to number of utility units 500.

Number of utility units 500 may be associated with number of cradle fixtures 314 of assembly fixture 324 or separated from number of cradle fixtures 314. For example, without limitation, a number of dual interfaces may be created between number of external mobile platforms 400, number of utility units 500, and number of cradle fixtures 314 using one or more dual-interface couplers.

When second tower 336 is used, distributed utility network 144 may be formed when utility fixture 150 is coupled to number of utility sources 148, second tower 336 is coupled to utility fixture 150, assembly fixture 324 is coupled to second tower 336, number of internal mobile platforms 402 is coupled to second tower 336, and number of external mobile platforms 400 is coupled to number of utility units 500, which may be associated with number of cradle fixtures 314 or separated from number of cradle fixtures 314. Number of internal mobile platforms 402 may receive number of utilities 146 through a number of cable management systems associated with second tower 336.

In this manner, number of utilities 146 may be distributed across distributed utility network 144 using a single utility fixture 150. This type of distributed utility network 144 may reduce the number of utility components, utility cables, and other types of devices needed to provide number of utilities 146 to the various components in distributed utility network 144. Further, with this type of distributed utility network 144, starting from at least utility fixture 150, number of utilities 146 may be provided completely above floor 300 of manufacturing environment in FIG. 1.

Figure 6:
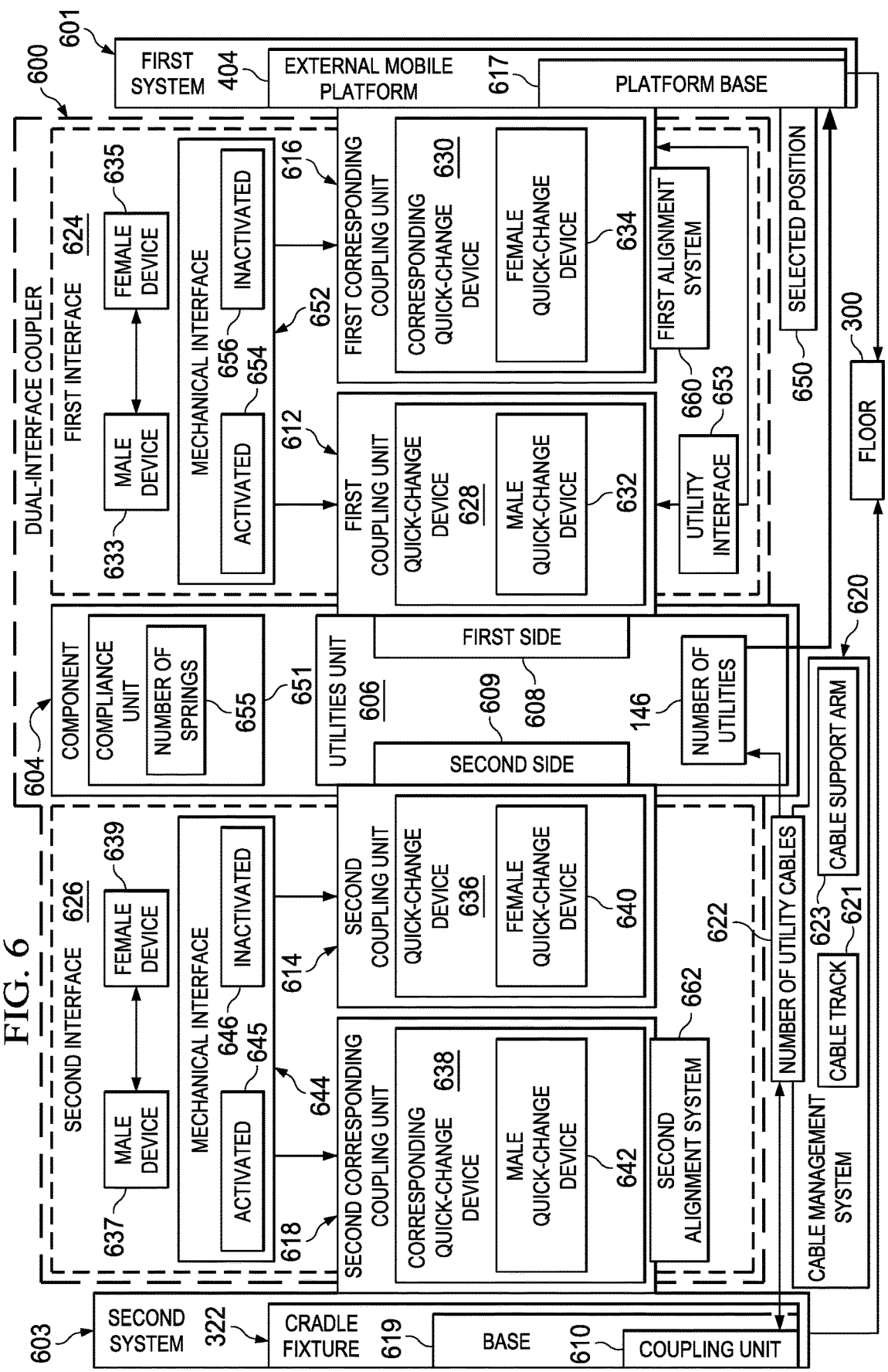
FIG. 6 is an illustration of a dual-interface coupler in the form of a block diagram in accordance with an illustrative embodiment.

With reference now to FIG. 6, an illustration of a dual-interface coupler is depicted in the form of a block diagram in accordance with an illustrative embodiment. In this illustrative example, dual-interface coupler 600 may be used to couple number of utilities 146 from FIG. 1 between first system 601 and second system 603.

In this illustrative example, first system 601 and second system 603 may take the form of mobile systems, such as those included in plurality of mobile systems 134 in FIG. 1. Depending on the implementation, at least one of first system 601 and second system 603 may be a component or system within one of plurality of mobile systems 134 in FIG. 1.

For example, without limitation, first system 601 may take the form of a mobile platform, such as one of plurality of mobile platforms 344 in FIG. 3. Second system 603 may take the form of a fixture, such as, for example, without limitation, one of number of fixtures 313 in FIG. 3. As one specific example, first system 601 may take the form of external mobile platform 404 from FIG. 4 and second system 603 may take the form of cradle fixture 322 from FIG. 3. As another illustrative example, first system 601 may take the form of cradle fixture 322 and second system 603 may take the form of tower 332 in FIG. 3.

Coupling number of utilities 146 between first system 601 and second system 603 may include coupling first system 601 to second system 603 using component 604. In this illustrative example, component 604 may take the form of utilities unit 606. Utilities unit 606 may be an example of one of number of utility units 500 in FIG. 5 that form part of distributed utility network 144 in FIG. 1.

Dual-interface coupler 600 may include first coupling unit 612, first corresponding coupling unit 616, second coupling unit 614, and second corresponding coupling unit 618. Dual-interface coupler 600 may enable couplings at either side of utilities unit 606. For example, as depicted, utilities unit 606 may have first side 608 and second side 609. First coupling unit 612 and second coupling unit 614 may be associated with first side 608 and second side 609, respectively.

First corresponding coupling unit 616 may be associated with first system 601. First coupling unit 612 may be configured to mate with first corresponding coupling unit 616. When first system 601 takes the form of external mobile platform 404, first corresponding coupling unit 616 may be associated with platform base 617 of external mobile platform 404. Second corresponding coupling unit 618 may be associated with second system 603. Second coupling unit 614 may be configured to mate with second corresponding coupling unit 618. When second system 603 takes the form of cradle fixture 322, second corresponding coupling unit 618 may be associated with base 619 of cradle fixture 322. In other illustrative examples, first corresponding coupling unit 616 and second corresponding coupling unit 618 may be associated with other components of external mobile platform 404 and cradle fixture 322, respectively.

Further, utilities unit 606 may receive number of utilities 146 from cradle fixture 322. For example, without limitation, utilities unit 606 may receive number of utilities 146 through number of utility cables 622 connected at least one of directly or indirectly to cradle fixture 322. Number of utility cables 622 may connect to, for example, without limitation, another coupling unit, such as coupling unit 610 associated with cradle fixture 322. In this manner, number of utilities 146 may be considered coupled between utilities unit 606 and cradle fixture 322 through number of utility cables 622.

Coupling unit 610 may receive number of utilities 146 from a corresponding coupling unit (not shown) associated with at least one of tower 332 in FIG. 3 or another one of number of cradle fixtures 314 in FIG. 3. Number of utilities 146 received at coupling unit 610, and thereby utilities unit 606, may be received as part of the flow of number of utilities 146 through distributed utility network 144 described in FIGS. 1 and 5.

Cable management system 620 may be used to manage number of utility cables 622. Cable management system 620 may include, for example, without limitation, cable track 621 and cable support arm 623. Cable track 621 and cable support arm 623 may be used to keep number of utility cables 622 organized and out of the way of certain components or devices when utilities unit 606 is coupled to cradle fixture 322, external mobile platform 404, or both. In some cases, cable track 621 may be comprised of a flexible material, have a flexible configuration, or both.

Cable track 621 and cable support arm 623 may manage number of utility cables 622 such that external mobile platform 404 may freely move utilities unit 606 relative to cradle fixture 322. In this manner, cable management system 620 may provide flexibility in the manner in which number of utilities 146 is distributed to external mobile platform 404 to support free movement of external mobile platform 404 relative to assembly fixture 324.

Coupling may be formed by establishing a dual-interface comprised of first interface 624 and second interface 626. First interface 624 may be formed using first coupling unit 612 associated with utilities unit 606 and first corresponding coupling unit 616 associated with first system 601 in the form of, for example, external mobile platform 404. Second interface 626 may be formed using second coupling unit 614 associated with utilities unit 606 and second corresponding coupling unit 618 associated with second system 603 in the form of, for example, cradle fixture 322.

First interface 624 may be formed by the mating of male device 633 and female device 635. Depending on the implementation, one of first coupling unit 612 and first corresponding coupling unit 616 may take the form of male device 633, while the other may take the form of female device 635.

As one illustrative example, first coupling unit 612 may take the form of quick-change device 628 and first corresponding coupling unit 616 may take the form of corresponding quick-change device 630. Quick-change device 628 may take the form of, for example, without limitation, male quick-change device 632, while corresponding quick-change device 630 may take the form of, for example, without limitation, female quick-change device 634.

Similarly, second interface 626 may be formed by the mating of male device 637 and female device 639. Depending on the implementation, one of second coupling unit 614 and second corresponding coupling unit 618 may take the form of male device 637, while the other may take the form of female device 639.

As one illustrative example, second coupling unit 614 may take the form of quick-change device 636 and second corresponding coupling unit 618 may take the form of corresponding quick-change device 638. Quick-change device 636 may take the form of, for example, without limitation, female quick-change device 640, while corresponding quick-change device 638 may take the form of, for example, without limitation, male quick-change device 642.

As described above, the mating of second coupling unit 614 and second corresponding coupling unit 618 may form second interface 626. Second interface 626 may be comprised of mechanical interface 644. For example, mating quick-change device 636 and corresponding quick-change device 638 may form mechanical interface 644. With mechanical interface 644, movement of cradle fixture 322 along floor 300 may also move utilities unit 606. Mechanical interface 644 may have one of two states. For example, without limitation, mechanical interface 644 may be activated 645 or inactivated 646. In some cases, some type of mechanical interlocking device may be used to switch mechanical interface 644 between activated 645 or inactivated 646.

When activated 645, mechanical interface 644, and thereby second interface 626, may be considered locked. In other words, when mechanical interface 644 is activated 645, the second coupling unit 614 may not be disengaged from second corresponding coupling unit 618. In this manner, the mating between utilities unit 606 and cradle fixture 322 may be locked. When inactivated 646, mechanical interface 644, and thereby second interface 626, may be considered unlocked. In other words, when mechanical interface 644 is inactivated 646, second coupling unit 614 may be capable of being disengaged from second corresponding coupling unit 618. In this manner, the mating between utilities unit 606 and cradle fixture 322 may be unlocked.

To couple utilities unit 606 with external mobile platform 404, external mobile platform 404 may be driven across floor 300 into a selected position relative to cradle fixture 322. For example, without limitation, one of plurality of autonomous vehicles 306 from FIG. 3 may be used to drive external mobile platform 404 towards cradle fixture 322 and into selected position 650 relative to cradle fixture 322. Selected position 650 may be one in which first corresponding coupling unit 616 is positioned relative to utilities unit 606 that is coupled to cradle fixture 322.

External mobile platform 404 may drive first corresponding coupling unit 616 towards first coupling unit 612 such that first corresponding coupling unit 616 may engage first coupling unit 612. First coupling unit 612 may then be coupled with, or mated to, first corresponding coupling unit 616 to form first interface 624.

Mating first coupling unit 612 and first corresponding coupling unit 616 may be aided by aligning first coupling unit 612 with first corresponding coupling unit 616. Compliance unit 651 may be associated with utilities unit 606. Compliance unit 651 may provide some freedom of movement with first coupling unit 612 that aids in aligning first coupling unit 612 to first corresponding coupling unit 616. Compliance unit 651 may include, for example, without limitation, number of springs 655 that provide first coupling unit 612 with some rotational freedom of movement.

First interface 624 may be comprised of mechanical interface 652 and utility interface 653. Mating first coupling unit 612 with first corresponding coupling unit 616 may form mechanical interface 652 and utility interface 653. A utility interface, such as utility interface 653, may also be referred to as a utilities interface.

Mechanical interface 652 may have one of two states. Mechanical interface 652 may be activated 654 or inactivated 656. In some cases, some type of mechanical interlocking device may be used to switch mechanical interface 652 between activated 654 or inactivated 656.

When activated 654, mechanical interface 652, and thereby first interface 624, may be considered locked. In other words, when mechanical interface 652 is activated 654, first coupling unit 612 may not be disengaged from first corresponding coupling unit 616. In this manner, the mating between utilities unit 606 and external mobile platform 404 may be locked. When inactivated 656, mechanical interface 652, and thereby first interface 624, may be considered unlocked. In other words, when mechanical interface 652 is inactivated 656, first coupling unit 612 may be capable of being disengaged from first corresponding coupling unit 616. In this manner, the mating between utilities unit 606 and external mobile platform 404 may be unlocked.

Utility interface 653 may be formed when mechanical interface 652 is activated 654. Number of utilities 146 may flow from utilities unit 606 through utility interface 653 to external mobile platform 404. In particular, number of utilities 146 may flow from utilities unit 606, through first coupling unit 612 and first corresponding coupling unit 616, and to external mobile platform 404.

Once first interface 624 has been activated, second interface 626 may be deactivated. In other words, when mechanical interface 652 is activated 654, mechanical interface 644 may be switched from activated 645 to inactivated 646. In other words, mechanical interface 644 may be unlocked such that second coupling unit 614 may be disengaged from and moved away from second corresponding coupling unit 618. In particular, second coupling unit 614 may be moved away from cradle fixture 322.

For example, without limitation, once mechanical interface 644 is inactivated 646, external mobile platform 404 may be driven such that second coupling unit 614 is moved away from second corresponding coupling unit 618 to disengage second coupling unit 614 from second corresponding coupling unit 618.

Consequently, second interface 626 may no longer be present. Once disengaged, external mobile platform 404 may be configured to drive utilities unit 606 still coupled to external mobile platform 404 away from cradle fixture 322 with at least one degree of freedom. In this illustrative example, external mobile platform 404 may move utilities unit 606 independently of cradle fixture 322 with at least one degree of freedom within the range allowed by the connection of number of utility cables 622 between utilities unit 606 and cradle fixture 322.

In this manner, number of utilities 146 may be provided from cradle fixture 322 to external mobile platform 404 in a manner that does not restrict movement of external mobile platform 404 relative to cradle fixture 322 in an undesired manner. Further, cable management system 620 may keep number of utility cables 622 organized and out of the way of external mobile platform 404 as utilities unit 606 is moved freely relative to cradle fixture 322. Further, cable management system 620 may make it safer for human personnel to move around on floor 300.

External mobile platform 404 may then be capable of driving utilities unit 606 back to cradle fixture 322. While utilities unit 606 is still coupled to external mobile platform 404, external mobile platform 404 may drive utilities unit 606 such that second coupling unit 614 is moved towards second corresponding coupling unit 618. Second coupling unit 614 may then be engaged with second corresponding coupling unit 618 to re-establish second interface 626 and, in particular, mechanical interface 644. Mechanical interface 644 may then be locked, or activated.

After mechanical interface 644 has been locked, mechanical interface 652 between first coupling unit 612 and first corresponding coupling unit 616 may be unlocked and first corresponding coupling unit 616 disengaged from first coupling unit 612. In particular, external mobile platform 404 may move first corresponding coupling unit 616 away from first coupling unit 612 to disengage first corresponding coupling unit 616 from first coupling unit 612. External mobile platform 404 may then be driven away. Depending on the implementation, external mobile platform 404 may then drive into some other position relative to another one of number of cradle fixtures 314 in FIG. 3 or to holding area 318 in FIG. 3.

In this manner, at least one of first interface 624 or second interface 626 may be activated at any given point in time. In other words, utilities unit 606 may be interfaced with first system 601, second system 603, or both at any given point in time.

In some illustrative examples, first alignment system 660 may be associated with first corresponding coupling unit 616 and second alignment system 662 may be associated with second corresponding coupling unit 618. When first interface 624 needs to be formed, first alignment system 660 and second alignment system 662 may be used to align first corresponding coupling unit 616 with first coupling unit 612. When second interface 626 needs to be formed, first alignment system 660 and second alignment system 662 may be used to align second coupling unit 614 with second corresponding coupling unit 618.

Figure 7:
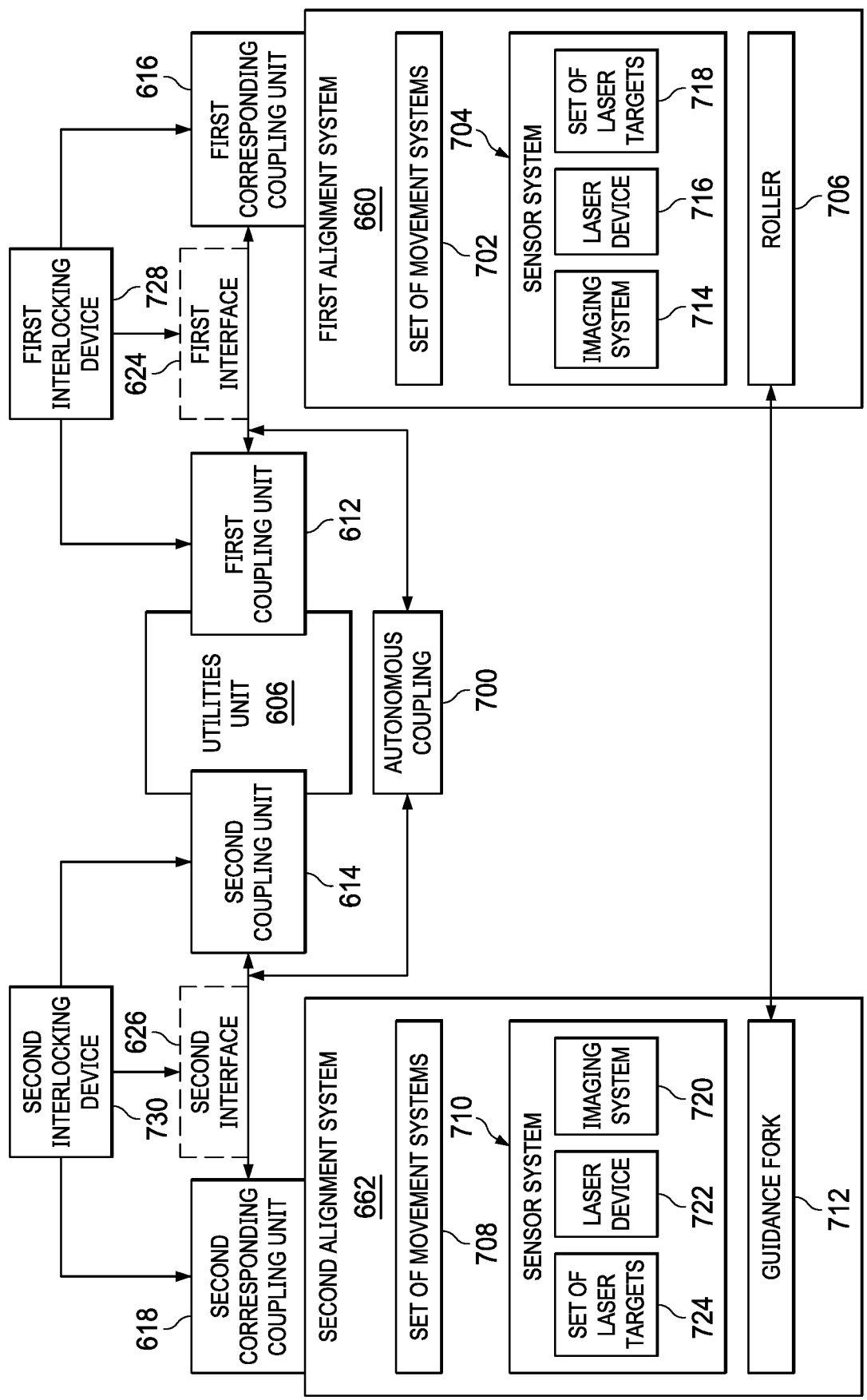
FIG. 7 is an illustration of a first alignment system and a second alignment system in the form of a block diagram in accordance with an illustrative embodiment.

With reference now to FIG. 7, an illustration of first alignment system 660 and second alignment system 662 from FIG. 6 is depicted in the form of a block diagram in accordance with an illustrative embodiment. As depicted, first alignment system 660 may be associated with first corresponding coupling unit 616. Second alignment system 662 may be associated with second corresponding coupling unit 618. First alignment system 660 and second alignment system 662 may include any number of components and devices that can be used for alignment.

When forming first interface 624, first alignment system 660 and second alignment system 662 may be coordinated such that first coupling unit 612 may be aligned with first corresponding coupling unit 616. In particular, first alignment system 660 and second alignment system 662 may align first coupling unit 612 and first corresponding coupling unit 616 such that autonomous coupling 700 may be performed. In other words, first alignment system 660 and second alignment system 662 may be used to align first coupling unit 612 with first corresponding coupling unit 616 autonomously.

When forming second interface 626, first alignment system 660 and second alignment system 662 may be coordinated such that second coupling unit 614 may be aligned with second corresponding coupling unit 618. In particular, first alignment system 660 and second alignment system 662 may align second coupling unit 614 and second corresponding coupling unit 618 such that autonomous coupling 700 may be performed. In other words, first alignment system 660 and second alignment system 662 may be used to align second coupling unit 614 with second corresponding coupling unit 618 autonomously.

In one illustrative example, first alignment system 660 may include at least one of set of movement systems 702, sensor system 704, or roller 706. In this example, second alignment system 662 may include at least one of set of movement systems 708, sensor system 710, or guidance fork 712. Each movement system in set of movement systems 702 and set of movement systems 708 may be implemented using at least one of an actuation device, an air cylinder, a motor, a rail system, an X-Y table, a track system, a slider, a roller, a wheel, or some other type of movement device.

When included in first alignment system 660, set of movement systems 702 may be used to move first corresponding coupling unit 616 with at least one degree of freedom relative to external mobile platform 404 for alignment purposes. Further, moving first corresponding coupling unit 616 while first coupling unit 612 is mated with first coupling unit 612 may also move utilities unit 606, and thereby, second coupling unit 614. In this manner, first corresponding coupling unit 616 may be moved such that second coupling unit 614 may be aligned with second corresponding coupling unit 618.

Similarly, when included in second alignment system 662, set of movement systems 708 may be used to move second corresponding coupling unit 618 with at least one degree of freedom relative to cradle fixture 322 for alignment purposes. Moving second corresponding coupling unit 618 while second coupling unit 614 is mated with second corresponding coupling unit 618 may also move utilities unit 606, and thereby first coupling unit 612. In this manner, second corresponding coupling unit 618 may be moved such that first coupling unit 612 may be aligned with first corresponding coupling unit 616.

Further, in one illustrative example, at least one of set of movement systems 702 or set of movement systems 708 may be used to guide roller 706 within guidance fork 712. In this example, roller 706 may be guided within guidance fork 712 to provide at least one of horizontal alignment or vertical alignment, depending on the orientation of guidance fork 712 relative to second corresponding coupling unit 618 and roller 706 relative to first corresponding coupling unit 616. When roller 706 is within guidance fork 712, roller 706 may be considered engaged with guidance fork 712, thereby mating first alignment system 660 with second alignment system 662.

When first interface 624 needs to be formed, roller 706 may be guided into and within guidance fork 712 such that first coupling unit 612 may be aligned with and engaged with first corresponding coupling unit 616. When second interface 626 needs to be formed, roller 706 may be guided into and within guidance fork 712 such that second coupling unit 614 may be aligned with and engaged with second corresponding coupling unit 618.

In this illustrative example, data generated by sensor system 704 may be processed and used to control the operation of set of movement systems 702. Further, data generated by sensor system 710 may be processed and used to control the operation of set of movement systems 708. In some illustrative examples, sensor system 704 may include at least one of imaging system 714, laser device 716, or set of laser targets 718. Similarly, sensor system 710 may include at least one of imaging system 720, laser device 722, or set of laser targets 724.

Imaging data generated by imaging system 714, imaging system 720, or both may be used to control, for example, the operation of at least one of set of movement systems 702 or set of movement systems 708 to provide alignment for forming first interface 624, second interface 626, or both. In one illustrative example, laser device 716 may be used to detect set of laser targets 724. The data generated by laser device 716 may be used to control the operation of set of movement systems 702. Similarly, laser device 722 may be used to detect set of laser targets 718. The data generated by laser device 722 may be used to control the operation of set of movement systems 708.

Depending on the implementation, second alignment system 662 and first alignment system 660 may include any number of structural members, connective elements, alignment elements, or devices for use in aiding alignment. In this manner, second alignment system 662 and first alignment system 660 may be implemented in any number of different ways to facilitate autonomous coupling 700 between first coupling unit 612 and first corresponding coupling unit 616 to form first interface 624 and autonomous coupling 700 between second coupling unit 614 and second corresponding coupling unit 618 to form second interface 626.

As depicted, first interlocking device 728 may be used to switch first interface 624, and thereby mechanical interface 652 shown in FIG. 6, between the states of activated 654 and inactivated 656 shown in FIG. 6. First interlocking device 728 may comprise any number of elements associated with at least one of first coupling unit 612 or first corresponding coupling unit 616. First interlocking device 728 may lock first interface 624 such that first corresponding coupling unit 616 cannot be disengaged from first coupling unit 612. Further, first interlocking device 728 may unlock first interface 624 such that first corresponding coupling unit 616 can be disengaged from first coupling unit 612.

Similarly, second interlocking device 730 may be used to switch second interface 626, and thereby mechanical interface 644 shown in FIG. 6, between the states of activated 645 and inactivated 646 shown in FIG. 6. Second interlocking device 730 may comprise any number of elements associated with at least one of second coupling unit 614 or second corresponding coupling unit 618. Second interlocking device 730 may lock second interface 626 such that second coupling unit 614 cannot be disengaged from second corresponding coupling unit 618. Further, second interlocking device 730 may unlock second interface 626 such that second coupling unit 614 can be disengaged from second corresponding coupling unit 618.

The illustrations in FIGS. 1-7 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, more than one flexible manufacturing system may be present within manufacturing environment 100. These multiple flexible manufacturing systems may be used to build multiple fuselage assemblies within manufacturing environment 100. In other illustrative examples, flexible manufacturing system 106 may include multiple cradle systems, multiple tower systems, multiple utility systems, multiple autonomous tooling systems, and multiple pluralities of autonomous vehicles such that multiple fuselage assemblies may be built within manufacturing environment 100.

In some illustrative examples, utility system 138 may include multiple utility fixtures that are considered separate from flexible manufacturing system 106. Each of these multiple utility fixtures may be configured for use with flexible manufacturing system 106 and any number of other flexible manufacturing systems.

Additionally, the different couplings of mobile systems in plurality of mobile systems 134 may be performed autonomously in these illustrative examples. However, in other illustrative example, a coupling of one of plurality of mobile systems 134 to another one of plurality of mobile systems 134 may be performed manually in other illustrative examples.

Further, in other illustrative examples, one or more of plurality of mobile systems 134 may be drivable by, for example, without limitation, a human operator. For example, without limitation, in some cases, first tower 334 may be drivable with human guidance.

Figure 8:
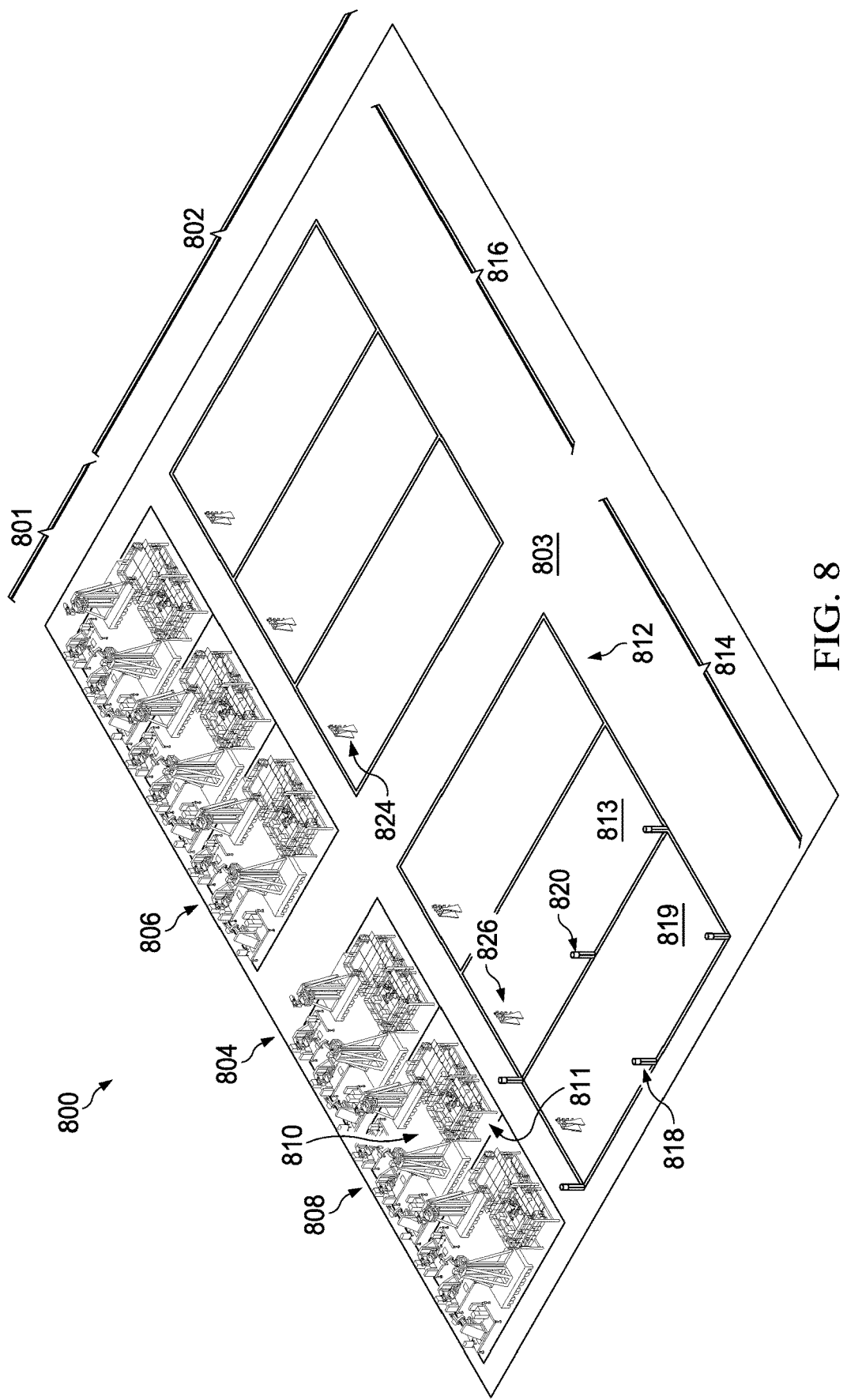
FIG. 8 is an illustration of an isometric view of a manufacturing environment in accordance with an illustrative embodiment.

With reference now to FIG. 8, an illustration of an isometric view of a manufacturing environment is depicted in accordance with an illustrative embodiment. In this illustrative example, manufacturing environment 800 may be an example of one implementation for manufacturing environment 100 in FIG. 1.

As depicted, manufacturing environment 800 may include holding environment 801 and assembly environment 802. Holding environment 801 may be a designated area on and over floor 803 of manufacturing environment 800 for storing plurality of flexible manufacturing systems 806 when plurality of flexible manufacturing systems 806 are not in use. Each of plurality of flexible manufacturing systems 806 may be an example of one implementation for flexible manufacturing system 106 described in FIGS. 1 and 3-5. In particular, each of plurality of flexible manufacturing systems 806 may be an example of one implementation for autonomous flexible manufacturing system 112 in FIG. 1.

Holding environment 801 may include plurality of holding cells 804. In this illustrative example, each of plurality of holding cells 804 may be considered an example of one implementation for holding area 318 in FIG. 3. In other illustrative examples, the entire holding environment 801 may be considered an example of one implementation for holding area 318 in FIG. 3.

Each of plurality of flexible manufacturing systems 806 may be stored in a corresponding one of plurality of holding cells 804. In particular, each of plurality of holding cells 804 may be designated for a specific one of plurality of flexible manufacturing systems 806. However, in other illustrative examples, any one of plurality of holding cells 804 may be used for storing any one of plurality of flexible manufacturing systems 806.

As depicted, flexible manufacturing system 808 may be an example of one of plurality of flexible manufacturing systems 806. Flexible manufacturing system 808 may include plurality of mobile systems 811, which may be an example of one implementation for plurality of mobile systems 134 in FIGS. 1 and 3.

Flexible manufacturing system 808 may be stored in holding cell 810 of plurality of holding cells 804. In this example, all of holding environment 801 may be considered an example of one implementation for holding area 318 in FIG. 3. However, in other examples, each of plurality of holding cells 804 in holding environment 801 may be considered an example of one implementation for holding area 318 in FIG. 3.

Floor 803 of manufacturing environment 800 may be substantially smooth to allow the various components and systems of plurality of flexible manufacturing systems 806 to be autonomously driven across floor 803 of manufacturing environment 800 with ease. When one of plurality of flexible manufacturing systems 806 is ready for use, that flexible manufacturing system may be driven across floor 803 from holding environment 801 into assembly environment 802.

Assembly environment 802 may be the designated area on and above floor 803 for building fuselage assemblies. When none of plurality of flexible manufacturing systems 806 are in use, floor 803 of assembly environment 802 may be kept substantially open and substantially clear.

As depicted, assembly environment 802 may include plurality of work cells 812. In one illustrative example, each of plurality of work cells 812 may be an example of one implementation for assembly area 304 in FIG. 3. Thus, each of plurality of work cells 812 may be designated for performing a fuselage assembly process, such as assembly process 110 in FIG. 1, for building fuselage assembly 114 in FIG. 1. In other illustrative examples, the entire assembly environment 802 may be considered an example of one implementation for assembly area 304 in FIG. 3.

In this illustrative example, first portion 814 of plurality of work cells 812 may be designated for building forward fuselage assemblies, such as forward fuselage assembly 117 in FIG. 1, while second portion 816 of plurality of work cells 812 may be designated for building aft fuselage assemblies, such as aft fuselage assembly 116 in FIG. 1. In this manner, plurality of work cells 812 may allow multiple fuselage assemblies to be built concurrently. Depending on the implementation, the building of these fuselage assemblies may begin at the same time or at different times in plurality of work cells 812.

In one illustrative example, plurality of mobile systems 811 that belong to flexible manufacturing system 808 may be driven across floor 803 from holding cell 810 into work cell 813. Within work cell 813, plurality of mobile systems 811 may be used to build a fuselage assembly (not shown). An example of one manner in which this fuselage assembly may be built using flexible manufacturing system 808 is described in greater detail in FIGS. 9-19 below.

In some illustrative examples, a sensor system may be associated with one or more of plurality of work cells 812. For example, without limitation, in some cases, sensor system 818 may be associated with work cell 819 of plurality of work cells 812. Sensor data generated by sensor system 818 may be used to help drive the various mobile systems of the corresponding one of plurality of flexible manufacturing systems 806 designated for building a fuselage assembly within work cell 819. In one illustrative example, sensor system 818 may take the form of metrology system 820.

Depending on the implementation, sensor system 818 may be optional. For example, without limitation, other sensor systems are not depicted associated with other work cells of plurality of work cells 812. Not using sensors systems such as sensor system 818 may help keep floor 803 of manufacturing environment 800 more open and clear to help the various mobile systems of plurality of flexible manufacturing systems 806 be driven more freely across floor 803.

As depicted, plurality of utility fixtures 824 may be permanently affixed to floor 803. Each of plurality of utility fixtures 824 may be an example of one implementation for utility fixture 150 in FIG. 1.

Plurality of utility fixtures 824 may be interfaced with a number of utility sources (not shown in this view). These utility sources (not shown) may be, for example, without limitation, located beneath floor 803. Utility fixture 826 may be an example of one of plurality of utility fixtures 824.

In this illustrative example, each of plurality of utility fixtures 824 is located in a corresponding one of plurality of work cells 812. Any one of plurality of flexible manufacturing systems 806 may be driven towards and interfaced with any one of plurality of utility fixtures 824. In this manner, plurality of utility fixtures 824 may be used to provide one or more utilities to plurality of flexible manufacturing systems 806.

Referring now to FIGS. 9-19, illustrations of the building of a fuselage assembly within manufacturing environment 800 from FIG. 8 are depicted in accordance with an illustrative embodiment. In FIGS. 9-19, flexible manufacturing system 808 from FIG. 8 may be used to build a fuselage assembly. The building of the fuselage assembly may be performed within any one of plurality of work cells 812 in FIG. 8. For example, without limitation, the building of the fuselage assembly may be performed within one of the work cells in second portion 816 of plurality of work cells 812 in FIG. 8.

Figure 9:
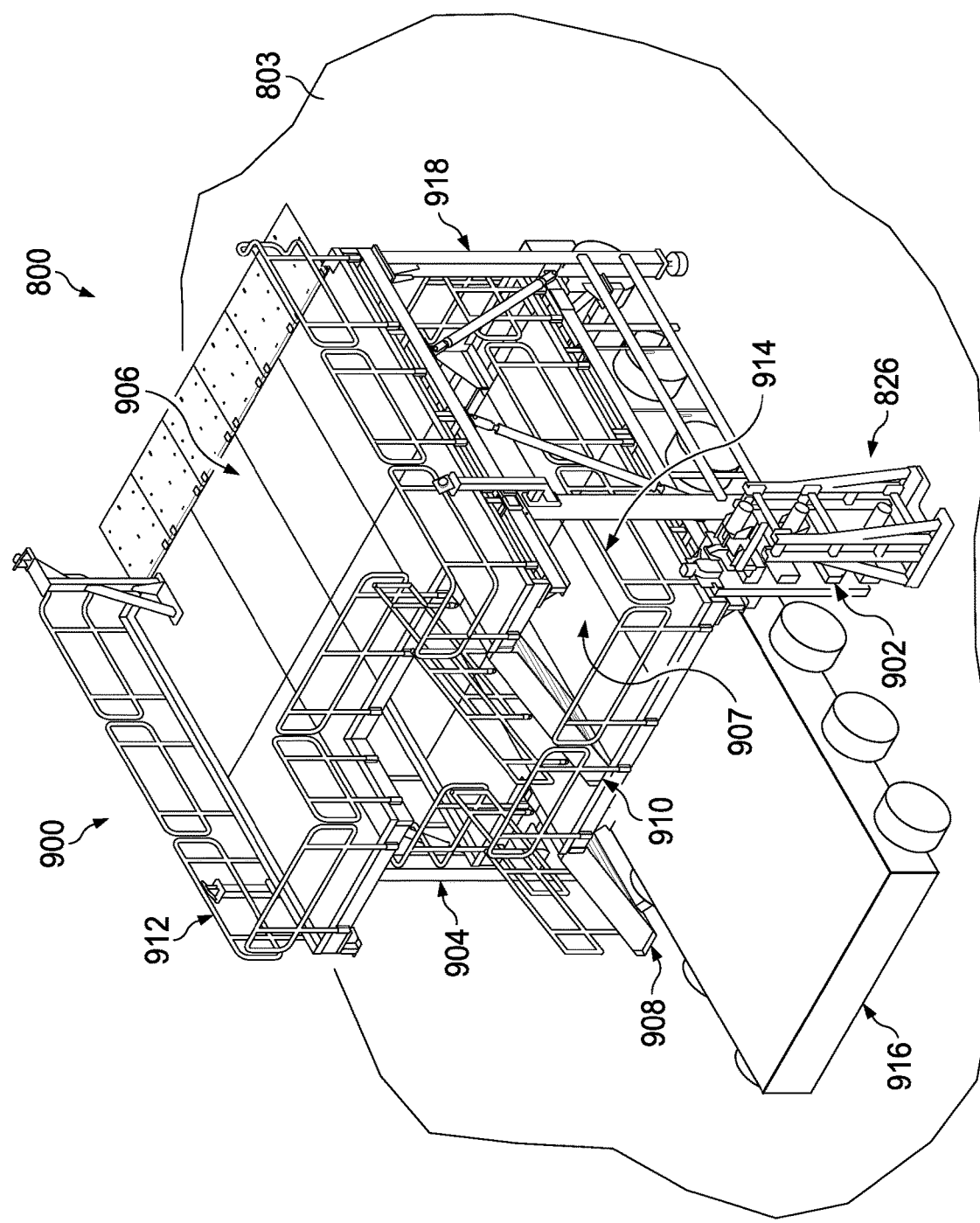
FIG. 9 is an illustration of a first tower coupled to a utility fixture in accordance with an illustrative embodiment.

Turning now to FIG. 9, an illustration of an isometric view of a first tower coupled to utility fixture 826 from FIG. 8 is depicted in accordance with an illustrative embodiment. In this illustrative example, first tower 900 may be coupled to utility fixture 826. First tower 900 may be an example of one of plurality of mobile systems 811 of flexible manufacturing system 808 in FIG. 8. In particular, first tower 900 may be an example of one implementation for first tower 334 in FIG. 3.

First tower 900 may be at least one of electrically and physically coupled to utility fixture 826 such that interface 902 is formed between first tower 900 and utility fixture 826. Interface 902 may be an example of one implementation for interface 342 in FIG. 3.

As depicted, first tower 900 may have base structure 904. Base structure 904 may include top platform 906 and bottom platform 907. In some cases, top platform 906 and bottom platform 907 may be referred to as top platform level and a bottom platform level, respectively. Top platform 906 may be used to provide a human operator with access to a top floor of a fuselage assembly (not shown), such as a passenger floor inside the fuselage assembly. Bottom platform 907 may be used to provide a human operator with access to a bottom floor of the fuselage assembly (not shown), such as a cargo floor inside the fuselage assembly.

In this illustrative example, walkway 908 may provide access from a floor, such as floor 803 in FIG. 8, to bottom platform 907. Walkway 910 may provide access from bottom platform 907 to top platform 906. Railing 912 is associated with top platform 906 for the protection of a human operator moving around on top platform 906. Railing 914 is associated with bottom platform 907 for the protection of a human operator moving around on bottom platform 907.

First tower 900 may be autonomously driven across floor 803 using autonomous vehicle 916. Autonomous vehicle 916 may be an automated guided vehicle (AGV) in this example. Autonomous vehicle 916 may be an example of one of plurality of autonomous vehicles 306 in FIG. 3. As depicted, autonomous vehicle 916 may be used to drive first tower 900 from holding environment 801 in FIG. 8 to selected tower position 918 relative to utility fixture 826. Selected tower position 918 may be an example of one implementation for selected tower position 338 in FIG. 3.

Once first tower 900 has been autonomously driven into selected tower position 918, first tower 900 may autonomously couple to utility fixture 826. In particular, first tower 900 may electrically and physically couple to utility fixture 826 autonomously to form interface 902. This type of coupling may enable a number of utilities to flow from utility fixture 826 to first tower 900. In this manner, first tower 900 and utility fixture 826 may establish at least a portion of a distributed utility network, similar to distributed utility network 144 described in FIGS. 1 and 5.

Figure 10:
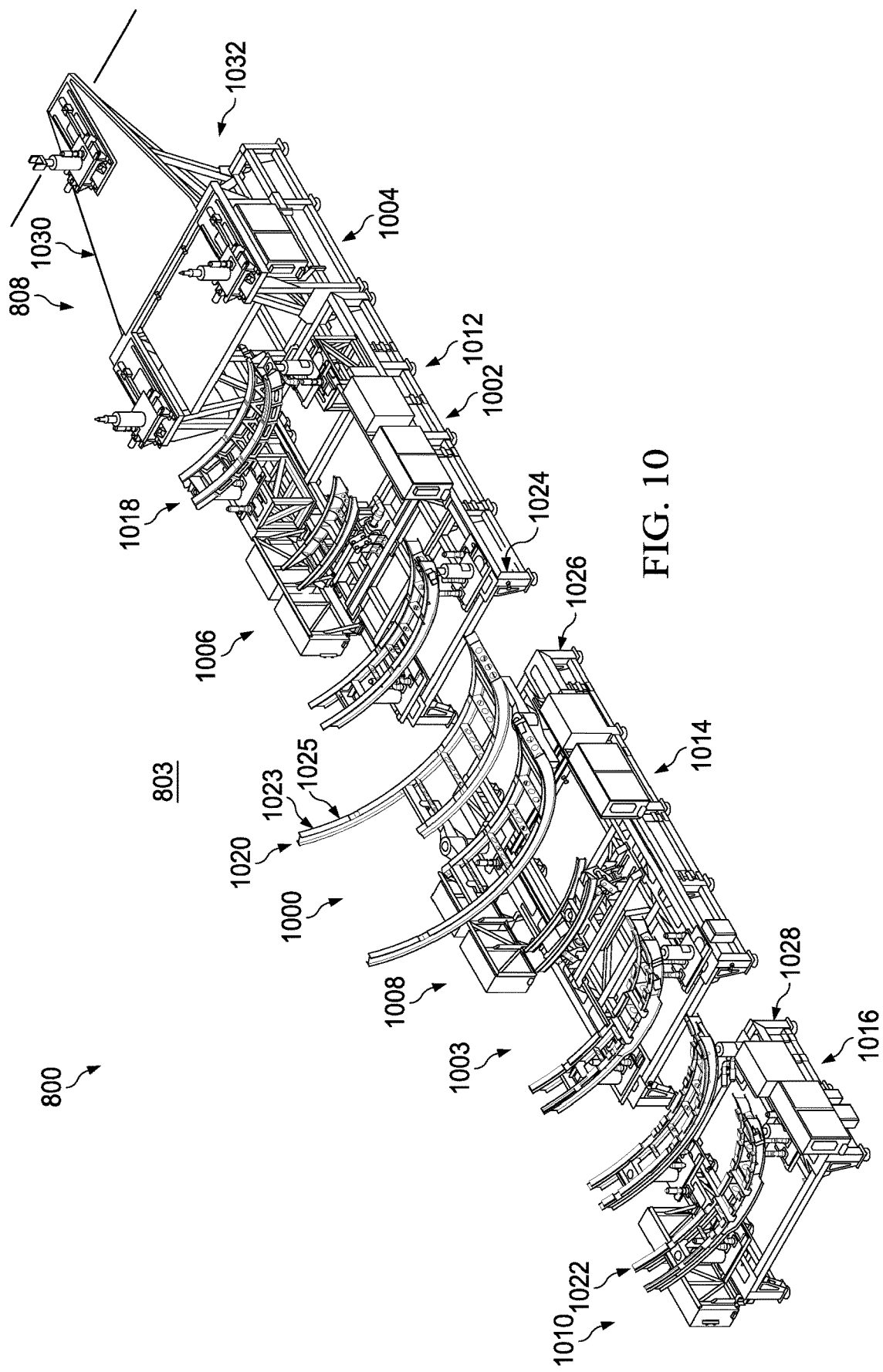
FIG. 10 is an illustration of an isometric view of a cradle system in accordance with an illustrative embodiment.

With reference now to FIG. 10, an illustration of an isometric view of a cradle system is depicted in accordance with an illustrative embodiment. In this illustrative example, cradle system 1000 may be an example of one implementation for cradle system 308 in FIG. 3. Further, cradle system 1000 may be an example of one of plurality of mobile systems 811 of flexible manufacturing system 808 in FIG. 8. In this manner, cradle system 1000 may be an example of one of plurality of mobile systems 811 that are stored in holding cell 810 in FIG. 8.

As depicted, cradle system 1000 may be comprised of number of fixtures 1003. Number of fixtures 1003 may be an example of one implementation for number of fixtures 313 in FIG. 3. Number of fixtures 1003 may include number of cradle fixtures 1002 and fixture 1004. Number of cradle fixtures 1002 may be an example of one implementation for number of cradle fixtures 314 in FIG. 3.

Number of cradle fixtures 1002 may include cradle fixture 1006, cradle fixture 1008, and cradle fixture 1010. Fixture 1004 may be fixedly associated with cradle fixture 1006. In this illustrative example, fixture 1004 may be considered part of cradle fixture 1006. However, in other illustrative examples, fixture 1004 may be considered a separate fixture from cradle fixture 1006.

As depicted, cradle fixture 1006, cradle fixture 1008, and cradle fixture 1010 have base 1012, base 1014, and base 1016, respectively. Number of retaining structures 1018 may be associated with base 1012. Number of retaining structures 1020 may be associated with base 1014. Number of retaining structures 1022 may be associated with base 1016. Each of number of retaining structures 1018, number of retaining structures 1020, and number of retaining structures 1022 may be an example of an implementation for number of retaining structures 326 in FIG. 3.

Each retaining structure in number of retaining structures 1018, number of retaining structures 1020, and number of retaining structures 1022 may have a curved shape that substantially matches a curvature of a corresponding fuselage section to be received by the retaining structure. Retaining structure 1023 may be an example of one of number of retaining structures 1020. As depicted, retaining structure 1023 may have curved shape 1025.

Curved shape 1025 may be selected such that curved shape 1025 substantially matches a curvature of a corresponding keel panel (not shown) that is to be engaged with retaining structure 1023. More specifically, retaining structure 1023 may have a substantially same radius of curvature as a corresponding keel panel (not shown) that is to be engaged with retaining structure 1023.

In this illustrative example, plurality of stabilizing members 1024, plurality of stabilizing members 1026, and plurality of stabilizing members 1028 may be associated with base 1012, base 1014, and base 1016, respectively. Plurality of stabilizing members 1024, plurality of stabilizing members 1026, and plurality of stabilizing members 1028 may be used to stabilize base 1012, base 1014, and base 1016, respectively, relative to floor 803 of manufacturing environment 800.

In one illustrative example, these stabilizing members may keep their respective bases substantially level relative to floor 803. Further, each of plurality of stabilizing members 1024, plurality of stabilizing members 1026, and plurality of stabilizing members 1028 may substantially support their respective base until that base is to be moved to a new location within or outside of manufacturing environment 800. In one illustrative example, each stabilizing member of plurality of stabilizing members 1024, plurality of stabilizing members 1026, and plurality of stabilizing members 1028 may be implemented using a hydraulic leg.

Each of number of fixtures 1003 may be used to support and hold a corresponding fuselage section (not shown) for a fuselage assembly (not shown) for an aircraft (not shown), such as one of plurality of fuselage sections 205 for fuselage assembly 114 for aircraft 104 in FIG. 2. For example, without limitation, fixture 1004 may have platform 1030 associated with base 1032. Platform 1030 may be configured to support and hold a forward fuselage section (not shown) or an aft fuselage section (not shown) for the aircraft (not shown), depending on the implementation. The forward fuselage section (not shown) may be the portion of the fuselage assembly (not shown) that is to be closest to the nose of the aircraft (not shown). The aft fuselage section (not shown) may be the portion of the fuselage assembly (not shown) that is to be closest to the tail of the aircraft (not shown).

Figure 11:
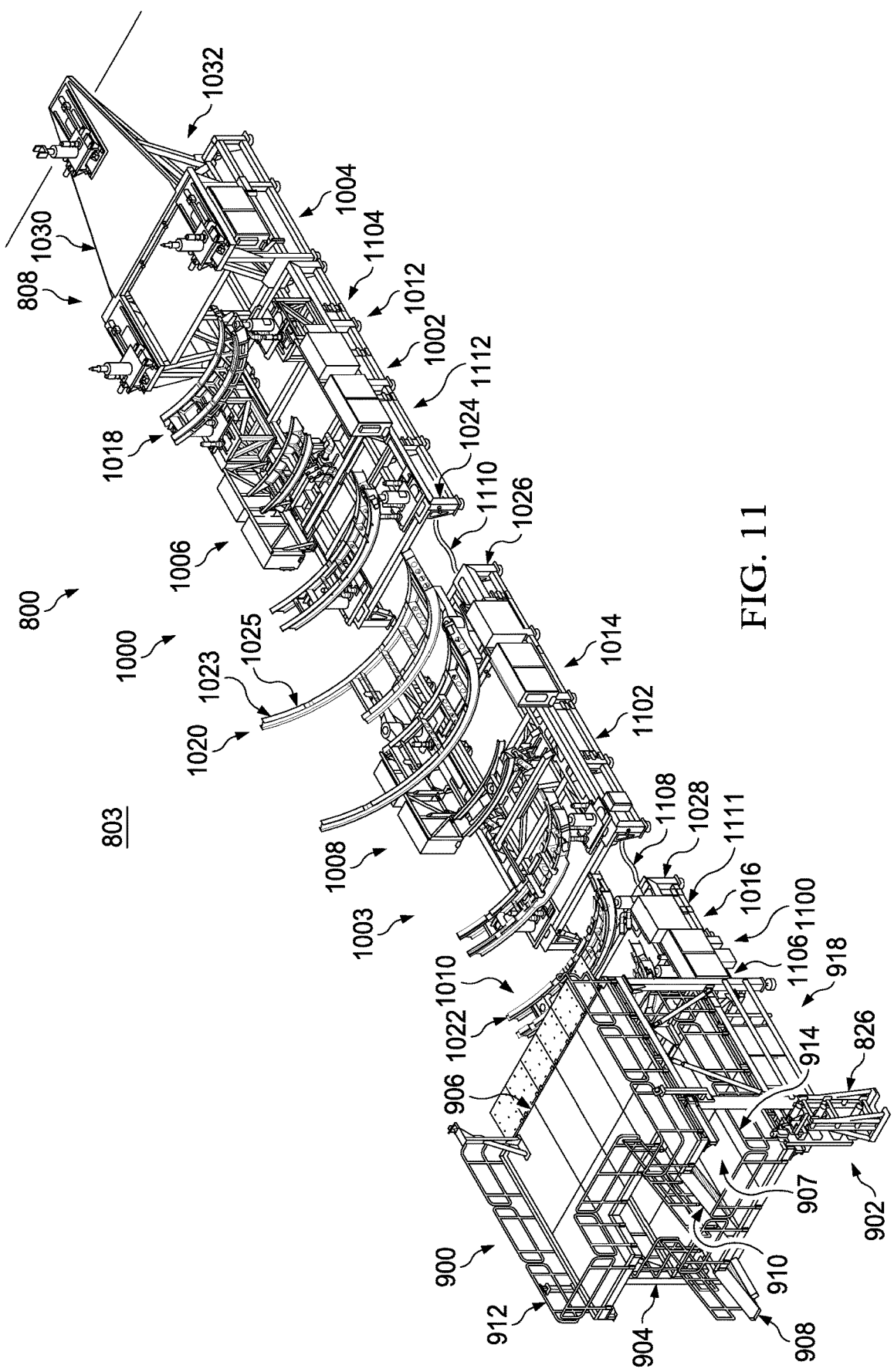
FIG. 11 is an illustration of an isometric view of an assembly fixture formed using a cradle system and coupled to a first tower in accordance with an illustrative embodiment.

With reference now to FIG. 11, an illustration of an isometric view of an assembly fixture formed using cradle system 1000 from FIG. 10 and coupled to first tower 900 from FIG. 9 is depicted in accordance with an illustrative embodiment. In this illustrative example, cradle fixture 1010 is coupled to first tower 900 and cradle fixture 1010, cradle fixture 1006, and cradle fixture 1008 are coupled to each other.

Cradle fixture 1010, cradle fixture 1008, and cradle fixture 1006 may have been autonomously driven across floor 803 of manufacturing environment 800 to selected cradle position 1100, selected cradle position 1102, and selected cradle position 1104, respectively, using a number of corresponding autonomous vehicles (not shown), such as number of corresponding autonomous vehicles 316 from FIG. 3. Driving cradle fixture 1006 may also cause fixture 1004 to be driven when fixture 1004 is part of cradle fixture 1006 as shown. Selected cradle position 1100, selected cradle position 1102, and selected cradle position 1104 may be an example of one implementation for number of selected cradle positions 320 in FIG. 3.

After driving cradle fixture 1010, cradle fixture 1008, and cradle fixture 1006 to selected cradle position 1100, selected cradle position 1102, and selected cradle position 1104, respectively, the number of corresponding autonomous vehicles (not shown) may be autonomously driven away. In other illustrative examples, the number of corresponding autonomous vehicles (not shown) may be integrated as part of cradle fixture 1010, cradle fixture 1008, and cradle fixture 1006.

Selected cradle position 1100 may be a position relative to selected tower position 918 of first tower 900. When cradle fixture 1010 is in selected cradle position 1100 relative to first tower 900, cradle fixture 1010 may be electrically and physically coupled to first tower 900 to form interface 1106. In some cases, cradle fixture 1010 may be coupled to first tower 900 autonomously to form interface 1106. In one illustrative example, interface 1106 may be formed by autonomously coupling cradle fixture 1010 to first tower 900. Interface 1106 may be an electrical and physical interface that enables a number of utilities that are flowing from utility fixture 826 to first tower 900 to also flow to cradle fixture 1010. In this manner, interface 1106 may be formed by autonomously coupling a number of utilities between cradle fixture 1010 and first tower 900. Interface 1106 may be an example of one implementation for interface 340 in FIG. 3. In this illustrative example, cradle fixture 1010, being coupled to first tower 900, may be referred to as primary cradle fixture 1111.

Further, as depicted, cradle fixture 1006, cradle fixture 1008, and cradle fixture 1010 may be coupled to each other. In particular, cradle fixture 1008 may be coupled to cradle fixture 1010 to form interface 1108. Similarly, cradle fixture 1006 may be coupled to cradle fixture 1008 to form interface 1110. In one illustrative example, both interface 1108 and interface 1110 may be formed by autonomously coupling these cradle fixtures to each other.

In particular, interface 1108 and interface 1110 may take the form of electrical and physical interfaces that enable the number of utilities to flow from cradle fixture 1010, to cradle fixture 1008, and to cradle fixture 1006. In this manner, interface 1108 may be formed by autonomously coupling the number of utilities between cradle fixture 1010 and cradle fixture 1008 and interface 1110 may be formed by autonomously coupling the number of utilities between cradle fixture 1008 and cradle fixture 1006. In this manner, number of utilities 146 may be autonomously coupled between adjacent cradle fixtures in number of cradle fixtures 314.

Thus, when utility fixture 826, first tower 900, cradle fixture 1010, cradle fixture 1008, and cradle fixture 1006 are all coupled in series as described above, the number of utilities may be distributed downstream from utility fixture 826 to first tower 900, cradle fixture 1010, cradle fixture 1008, and cradle fixture 1006. In this illustrative example, any utilities that flow to cradle fixture 1006 may also be distributed to fixture 1004.

Any number of coupling units, structural members, connection devices, cables, other types of elements, or combination thereof may be used to form interface 1108 and interface 1110. Depending on the implementation, interface 1108 and interface 1110 may take the form of coupling units that both physically and electrically connect cradle fixture 1010, cradle fixture 1008, and cradle fixture 1006 to each other. In other illustrative examples, interface 1108 and interface 1110 may be implemented in some other manner.

When cradle fixture 1010, cradle fixture 1008, and cradle fixture 1006 are in selected cradle position 1100, selected cradle position 1102, and selected cradle position 1104, respectively, and coupled to each other, these cradle fixtures together form assembly fixture 1112. Assembly fixture 1112 may be an example of one implementation for assembly fixture 324 in FIG. 3. In this manner, interface 1106 between first tower 900 and cradle fixture 1010 may also be considered an electrical and physical interface between first tower 900 and assembly fixture 1112.

Figure 12:
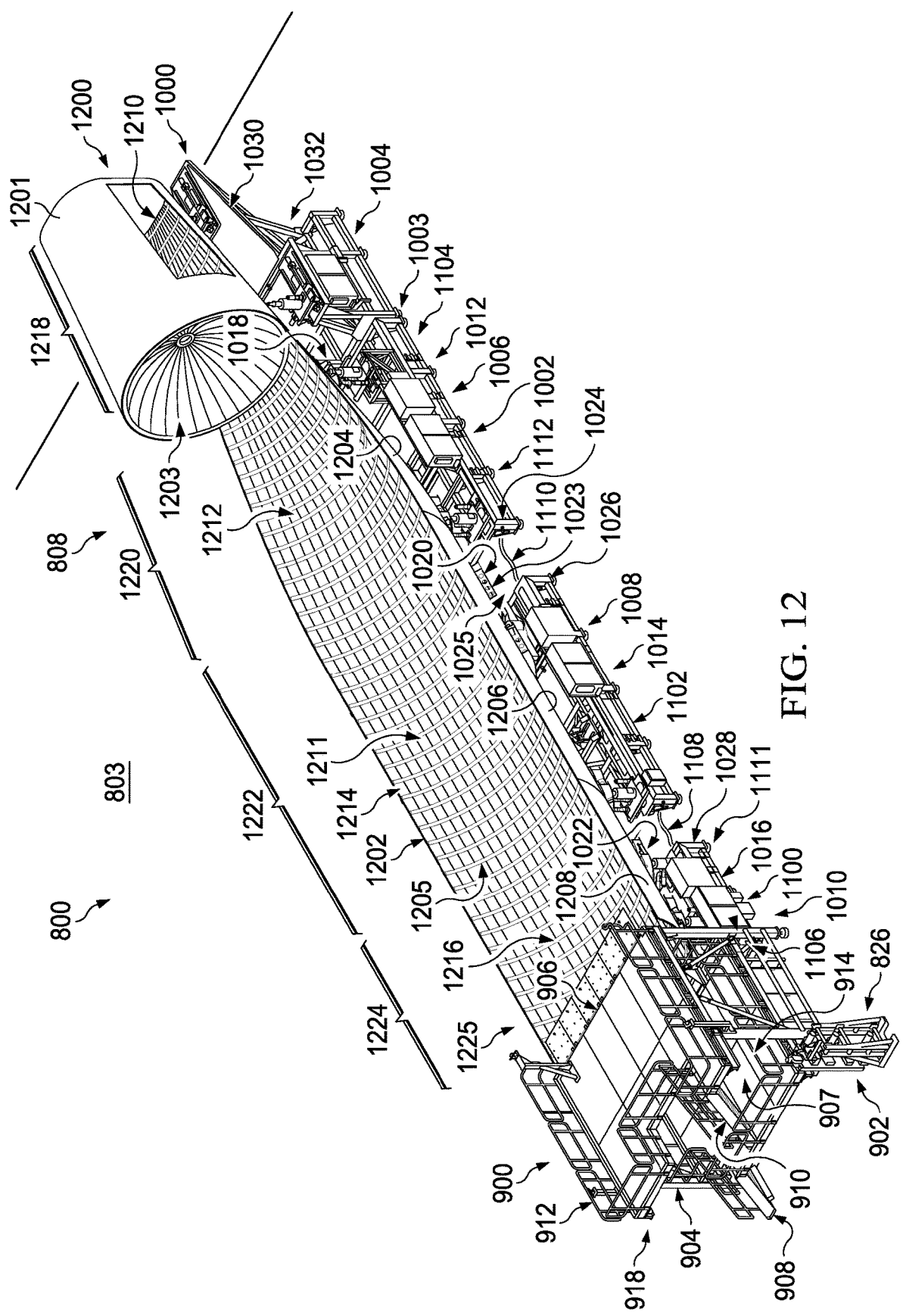
FIG. 12 is an illustration of an isometric view of one stage in the assembly process for building a fuselage assembly that is being supported by an assembly fixture in accordance with an illustrative embodiment.

With reference now to FIG. 12, an illustration of an isometric view of one stage in the assembly process for building a fuselage assembly that is being supported by assembly fixture 1112 from FIG. 11 is depicted in accordance with an illustrative embodiment. In this illustrative example, assembly fixture 1112 may support fuselage assembly 1200 as fuselage assembly 1200 is built on assembly fixture 1112.

Fuselage assembly 1200 may be an aft fuselage assembly that is an example of one implementation for aft fuselage assembly 116 in FIG. 1. Fuselage assembly 1200 may be partially assembled in this illustrative example. Fuselage assembly 1200 may be at an early stage of assembly in this example.

At this stage of the assembly process, fuselage assembly 1200 includes end panel 1201 and plurality of keel panels 1202. End panel 1201 may have a tapered cylindrical shape in this illustrative example. In this manner, one portion of end panel 1201 may form part of the keel 1205 for fuselage assembly 1200, another portion of end panel 1201 may form part of the sides (not fully shown) for fuselage assembly 1200, and yet another portion of end panel 1201 may form part of a crown (not fully shown) for fuselage assembly 1200.

Further, as depicted, bulkhead 1203 may be associated with end panel 1201. Bulkhead 1203 may be a pressure bulkhead. Bulkhead 1203 may be an example of one implementation for bulkhead 272 in FIG. 2.

Plurality of keel panels 1202 include keel panel 1204, keel panel 1206, and keel panel 1208. End panel 1201 and plurality of keel panels 1202 have been engaged with assembly fixture 1112. In particular, end panel 1201 has been engaged with fixture 1004. Keel panel 1204, keel panel 1206, and keel panel 1208 have been engaged with cradle fixture 1006, cradle fixture 1008, and cradle fixture 1010, respectively.

In one illustrative example, end panel 1201 is first engaged with fixture 1004 with keel panel 1204, keel panel 1206, and keel panel 1208 then being successively engaged with cradle fixture 1006, cradle fixture, 1008, and cradle fixture 1010, respectively. In this manner, keel 1205 of fuselage assembly 1200 may be assembled in a direction from the aft end of fuselage assembly 1200 to the forward end of fuselage assembly 1200.

Each of cradle fixture 1006, cradle fixture 1008, and cradle fixture 1010 may be at least one of autonomously or manually adjusted, as needed, to accommodate plurality of keel panels 1202 such that fuselage assembly 1200 may be built to meet outer mold line requirements and inner mold line requirements within selected tolerances. In some cases, at least one of cradle fixture 1006, cradle fixture 1008, and cradle fixture 1010 may have at least one retaining structure that can be adjusted to adapt to the shifting of fuselage assembly 1200 during the assembly process due to increased loading as fuselage assembly 1200 is built.

As depicted, members 1211 may be associated with end panel 1201 and plurality of keel panels 1202. Members 1211 may include frames and stringers in this illustrative example. However, depending on the implementation, members 1211 may also include, without limitation, stiffeners, stanchions, intercostal structural members, connecting members, other types of structural members, or some combination thereof. The connecting members may include, for example, without limitation, shear clips, ties, splices, intercostal connecting members, other types of mechanical connecting members, or some combination thereof.

The portion of members 1211 attached to end panel 1201 may form support section 1210. The portions of members 1211 attached to keel panel 1204, keel panel 1206, and keel panel 1208 may form support section 1212, support section 1214, and support section 1216, respectively.

In this illustrative example, end panel 1201 may form fuselage section 1218 for fuselage assembly 1200. Each of keel panel 1204, keel panel 1206, and keel panel 1208 may form a portion of fuselage section 1220, fuselage section 1222, and fuselage section 1224, respectively, for fuselage assembly 1200. Fuselage section 1218, fuselage section 1220, fuselage section 1222, and fuselage section 1224 may together form plurality of fuselage sections 1225 for fuselage assembly 1200. Each of fuselage section 1218, fuselage section 1220, fuselage section 1222, and fuselage section 1224 may be an example of one implementation for fuselage section 207 in FIG. 2.

End panel 1201 and plurality of keel panels 1202 may be temporarily connected together using temporary fasteners such as, for example, without limitation, tack fasteners. In particular, end panel 1201 and plurality of keel panels 1202 may be temporarily connected to each other as each of the panels is engaged with assembly fixture 1112 and other panels.

For example, without limitation, coordination holes (not shown) may be present at the edges of end panel 1201 and each of plurality of keel panels 1202. In some cases, a coordination hole may pass through a panel and at least one of members 1211 associated with the panel. Engaging one panel with another panel may include aligning these coordination holes such that temporary fasteners, such as tack fasteners, may be installed in these coordination holes. In some cases, engaging one panel with another panel may include aligning a coordination hole through one panel with a coordination hole through one of members 1211 associated with another panel.

In yet another illustrative example, engaging a first panel with another panel may include aligning the edges of the two panels to form a butt splice. These two panels may then be temporarily connected together by aligning a first number of coordination holes in, for example, a splice plate, with a corresponding number of holes on the first panel and aligning a second number of coordination holes in that splice plate with a corresponding number of holes on the second panel. Temporary fasteners may then be inserted through these aligned coordination holes to temporarily connect the first panel to the second panel.

In this manner, panels and members may be engaged with each other and temporarily connected together in a number of different ways. Once end panel 1201 and plurality of keel panels 1202 have been temporarily connected together, assembly fixture 1112 may help maintain the position and orientation of end panel 1201 and each of plurality of keel panels 1202 relative to each other.

Figure 13:
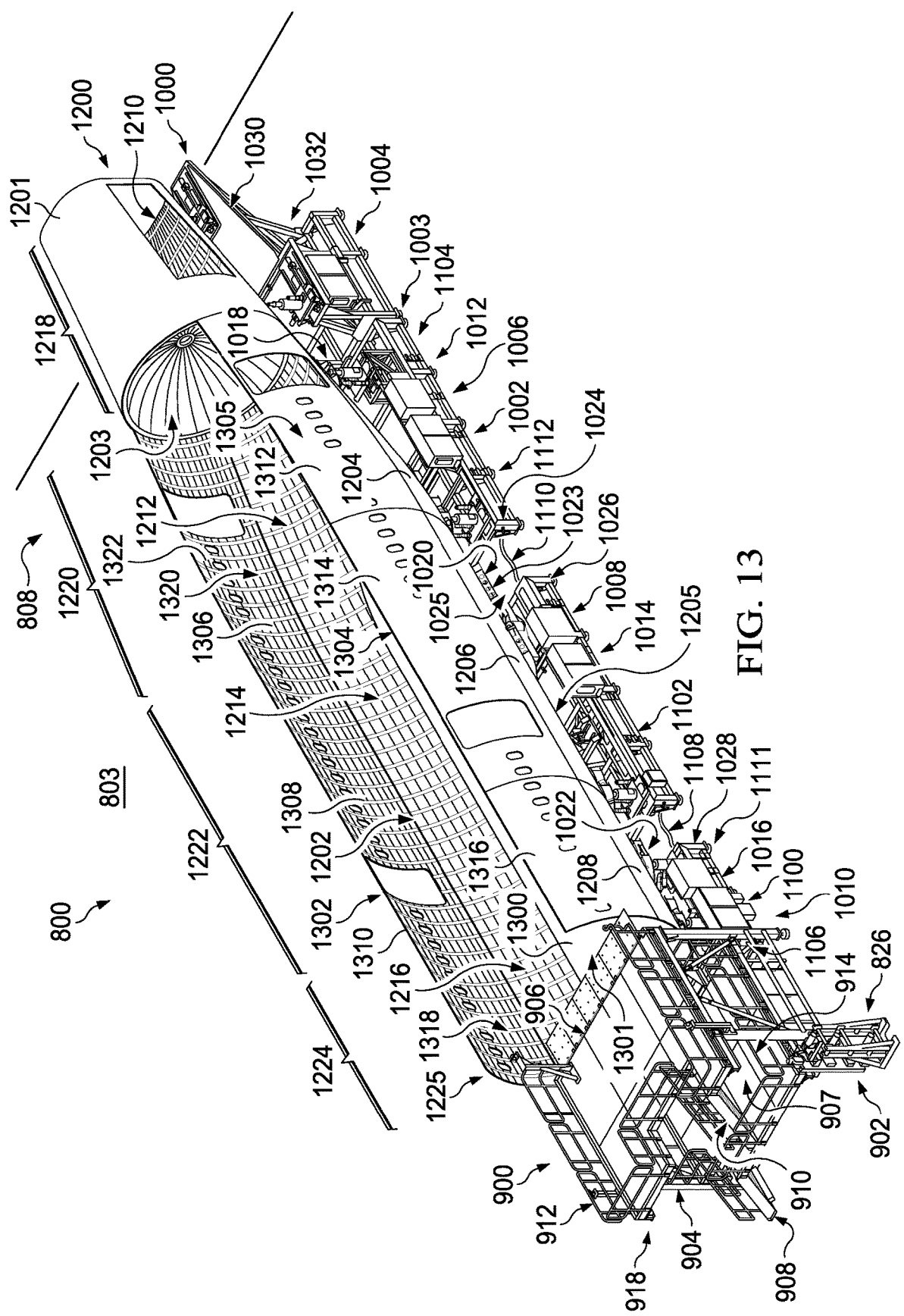
FIG. 13 is an illustration of an isometric view of another stage in the assembly process for building a fuselage assembly being supported by an assembly fixture in accordance with an illustrative embodiment.

Turning now to FIG. 13, an illustration of an isometric view of another stage in the assembly process for building a fuselage assembly is depicted in accordance with an illustrative embodiment. In this illustrative example, cargo floor 1300 has been added to fuselage assembly 1200. In particular, cargo floor 1300 may be associated with plurality of keel panels 1202.

As depicted, at least a portion of cargo floor 1300 may be substantially level with bottom platform 907 of first tower 900. In particular, at least the portion of cargo floor 1300 nearest first tower 900 may be substantially aligned with bottom platform 907 of first tower 900. In this manner, a human operator (not shown) may use bottom platform 907 of first tower 900 to easily walk onto cargo floor 1300 and access interior 1301 of fuselage assembly 1200.

As depicted, first side panels 1302 and second side panels 1304 have been added to fuselage assembly 1200. First side panels 1302 and second side panels 1304 may be an example of one implementation for first side panels 224 and second side panels 226, respectively, in FIG. 2. First side panels 1302, second side panels 1304, and a first and second portion of end panel 1201 may form sides 1305 of fuselage assembly 1200. In this illustrative example, plurality of keel panels 1202, end panel 1201, first side panels 1302, and second side panels 1304 may all be temporarily connected together using, for example, without limitation, tack fasteners.

First side panels 1302 may include side panel 1306, side panel 1308, and side panel 1310 that have been engaged with and temporarily connected to keel panel 1204, keel panel 1206, and keel panel 1208, respectively. Similarly, second side panels 1304 may include side panel 1312, side panel 1314, and side panel 1316 that have been engaged with and temporarily connected to keel panel 1204, keel panel 1206, and keel panel 1208, respectively. Further, both side panel 1306 and side panel 1312 have been engaged with end panel 1201.

As depicted, members 1318 may be associated with first side panels 1302. Other members (not shown) may be similarly associated with second side panels 1304. Members 1318 may be implemented in a manner similar to members 1211. In this illustrative example, corresponding portion 1320 of members 1318 may be associated with side panel 1306. Corresponding portion 1320 of members 1318 may form support section 1322 associated with side panel 1306. Support section 1322 may be an example of one implementation for support section 238 in FIG. 2.

Figure 14:
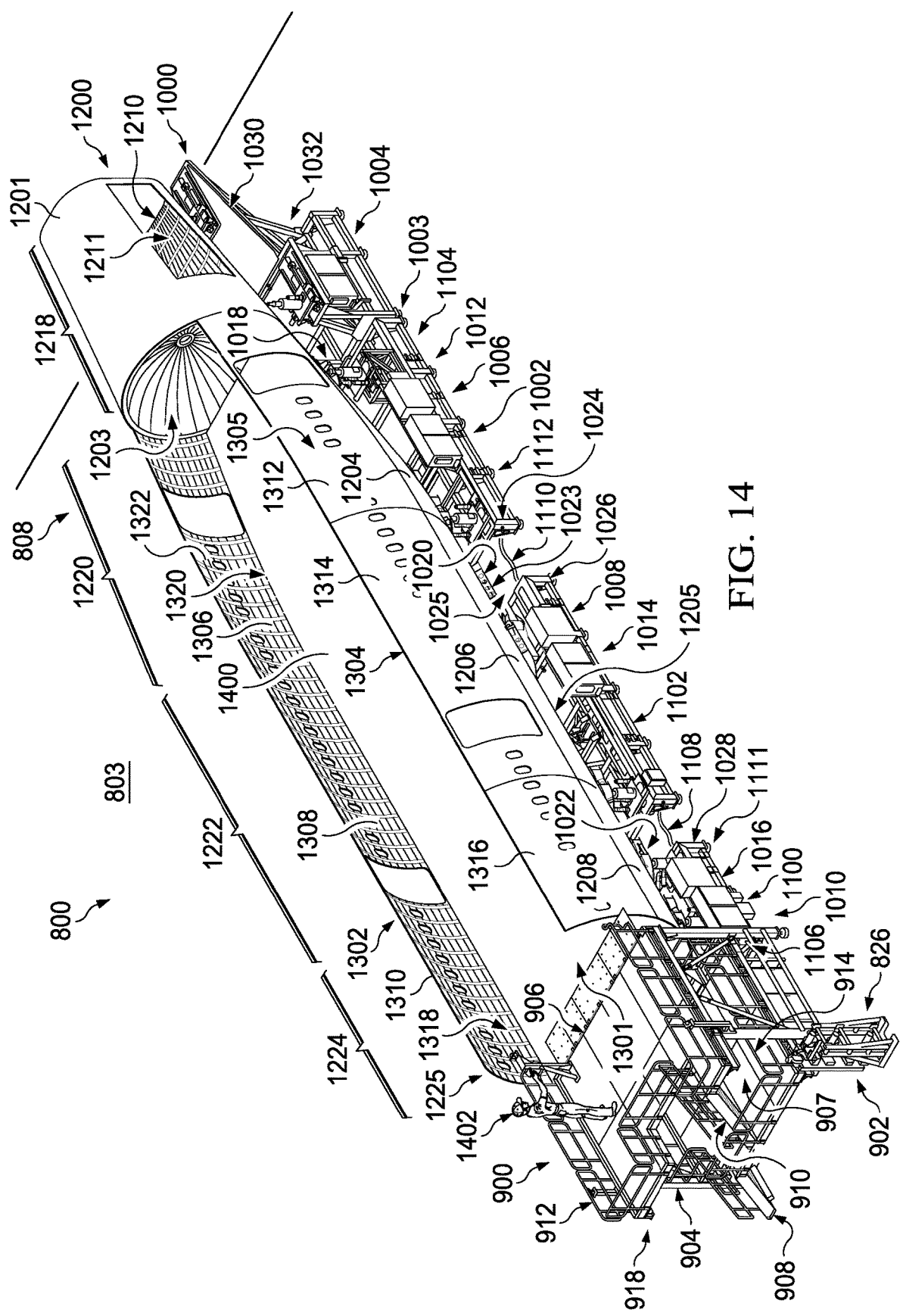
FIG. 14 is an illustration of an isometric view of another stage in the assembly process for building a fuselage assembly in accordance with an illustrative embodiment.

With reference now to FIG. 14, an illustration of an isometric view of another stage in the assembly process for building a fuselage assembly is depicted in accordance with an illustrative embodiment. In this illustrative example, passenger floor 1400 has been added to fuselage assembly 1200. As depicted, passenger floor 1400 may be substantially level with top platform 906 of first tower 900. Human operator 1402 may use top platform 906 of first tower 900 to walk onto passenger floor 1400 and access interior 1301 of fuselage assembly 1200.

Figure 15:
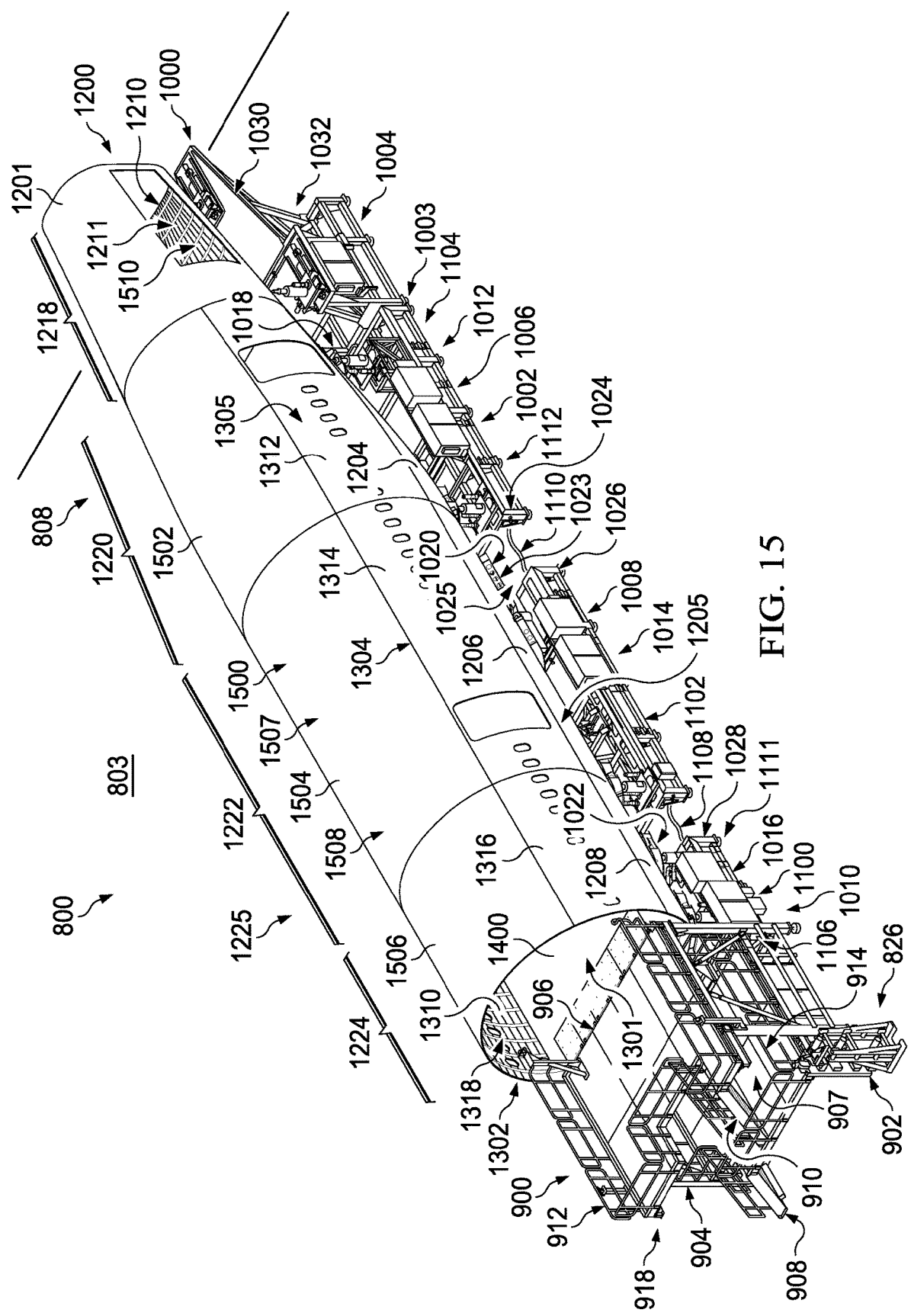
FIG. 15 is an illustration of an isometric view of another stage in the assembly process for building a fuselage assembly in accordance with an illustrative embodiment.

With reference now to FIG. 15, an illustration of an isometric view of another stage in the assembly process for building a fuselage assembly is depicted in accordance with an illustrative embodiment. In this illustrative example, plurality of crown panels 1500 have been added to fuselage assembly 1200. Plurality of crown panels 1500 may be an example of one implementation for crown panels 218 in FIG. 2.

In this illustrative example, plurality of crown panels 1500 may include crown panel 1502, crown panel 1504, and crown panel 1506. These crown panels along with a top portion of end panel 1201 may form crown 1507 of fuselage assembly 1200. Crown panel 1502 may be engaged with and temporarily connected to end panel 1201, side panel 1306 shown in FIG. 13, side panel 1312, and crown panel 1504. Crown panel 1504 may be engaged with and temporarily connected to crown panel 1502, crown panel 1506, side panel 1308 shown in FIG. 13, and side panel 1314. Further, crown panel 1506 may be engaged with and temporarily connected to crown panel 1504, side panel 1310, and side panel 1316.

Together, end panel 1201, plurality of keel panels 1202, first side panels 1302, second side panels 1304, and plurality of crown panels 1500 may form plurality of panels 1508 for fuselage assembly 1200. Plurality of panels 1508 may be an example of one implementation for plurality of panels 120 in FIG. 1.

Plurality of panels 1508 may all be temporarily connected to each other such that desired compliance with outer mold line requirements and inner mold line requirements may be maintained during the building of fuselage assembly 1200. In other words, temporarily connecting plurality of panels 1508 to each other may enable outer mold line requirements and inner mold line requirements to be met within selected tolerances during the building of fuselage assembly 1200 and, in particular, the joining of plurality of panels 1508 together.

Members (not shown) may be associated with plurality of crown panels 1500 in a manner similar to the manner in which members 1318 are associated with first side panels 1302. These members associated with plurality of crown panels 1500 may be implemented in a manner similar to members 1318 and members 1211 as shown in FIGS. 12-13. The various members associated with end panel 1201, plurality of keel panels 1202, plurality of crown panels 1500, first side panels 1302, and second side panels 1304 may form plurality of members 1510 for fuselage assembly 1200. When plurality of panels 1508 are joined together, plurality of members 1510 may form a support structure (not yet shown) for fuselage assembly 1200, similar to support structure 121 in FIG. 1.

After plurality of crown panels 1500 have been added to fuselage assembly 1200, first tower 900 may be autonomously decoupled from assembly fixture 1112 and utility fixture 826. First tower 900 may then be autonomously driven away from utility fixture 826 using, for example, without limitation, autonomous vehicle 916 in FIG. 9. In one illustrative example, first tower 900 may be autonomously driven back to holding environment 801 in FIG. 8.

When first tower 900 is decoupled from assembly fixture 1112 and utility fixture 826, a gap is formed in the distributed utility network. This gap may be filled using a second tower (not shown), implemented in a manner similar to second tower 336 in FIG. 3.

Figure 16:
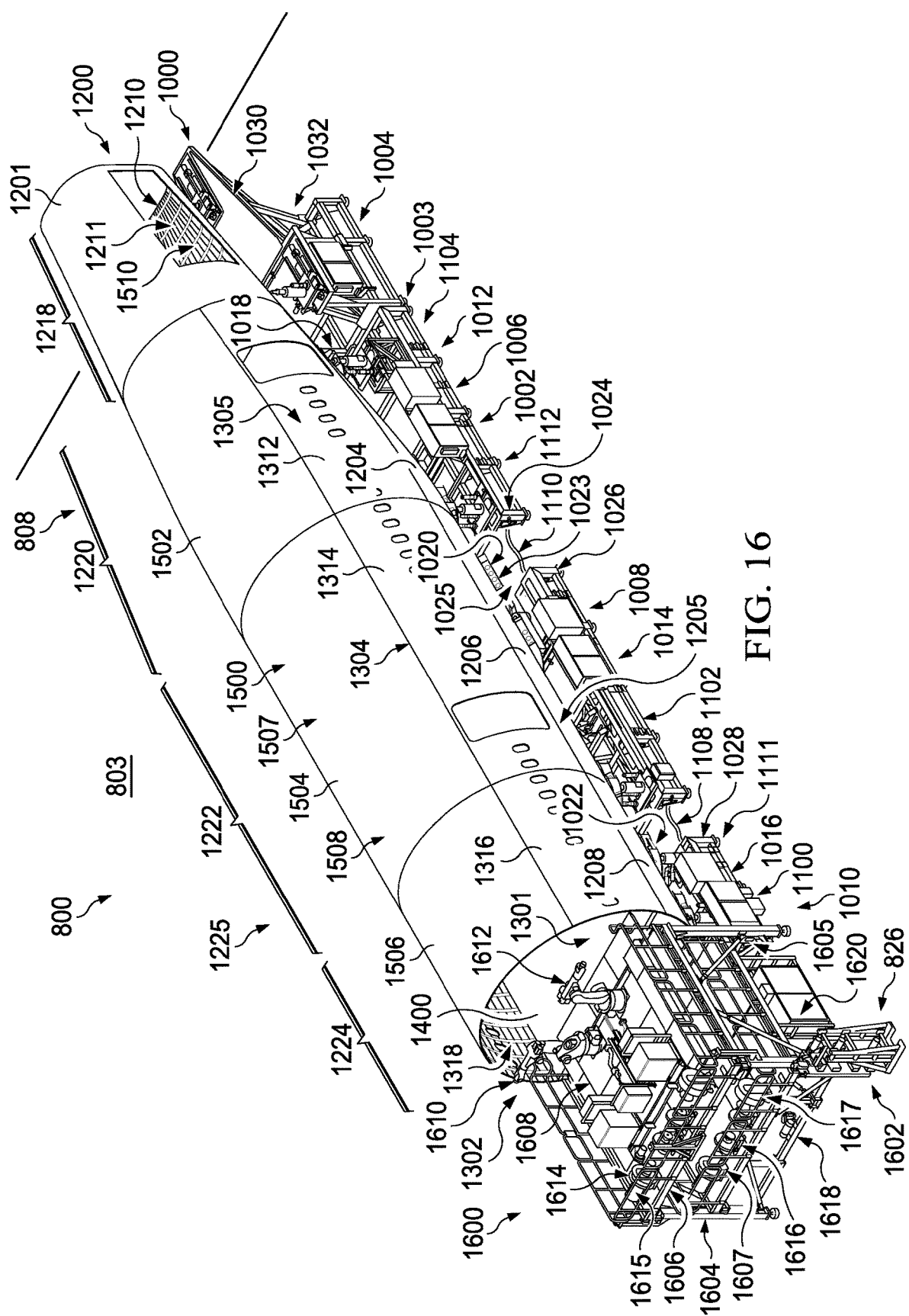
FIG. 16 is an illustration of an isometric view of a second tower coupled to a utility fixture and an assembly fixture supporting a fuselage assembly in accordance with an illustrative embodiment.

With reference now to FIG. 16, an illustration of an isometric view of a second tower coupled to utility fixture 826 and assembly fixture 1112 supporting fuselage assembly 1200 from FIG. 15 is depicted in accordance with an illustrative embodiment. In this illustrative example, second tower 1600 has been positioned relative to assembly fixture 1112 and utility fixture 826. Second tower 1600 may be an example of one implementation for second tower 336 in FIG. 3.

Second tower 1600 may be autonomously driven across floor 803 using an autonomous vehicle (not shown), similar to autonomous vehicle 916 in FIG. 9. Second tower 1600 may be autonomously driven into selected tower position 1618 relative to utility fixture 826. Selected tower position 1618 may be an example of one implementation for selected tower position 338 in FIG. 3. In this illustrative example, selected tower position 1618 may be substantially the same as selected tower position 918 in FIG. 9.

Once second tower 1600 has been autonomously driven into selected tower position 1618, second tower 1600 may autonomously couple to utility fixture 826. In particular, second tower 1600 may electrically and physically couple to utility fixture 826 autonomously to form interface 1602. Interface 1602 may be another example of one implementation for interface 342 in FIG. 3. This type of coupling may enable a number of utilities to flow from utility fixture 826 to second tower 1600.

Further, second tower 1600 may autonomously couple to cradle fixture 1010, thereby autonomously coupling to assembly fixture 1112, to form interface 1605. Interface 1605 may enable the number of utilities to flow downstream from second tower 1600. In this manner, the number of utilities may flow from second tower 1600 to cradle fixture 1010, to cradle fixture 1008, and then to cradle fixture 1006. In this manner, second tower 1600 may fill the gap in the distributed utility network that was created when first tower 900 in FIG. 15 was decoupled from assembly fixture 1112 and utility fixture 826 and driven away.

Similar to first tower 900 in FIG. 9, second tower 1600 may include base structure 1604, top platform 1606, and bottom platform 1607. However, top platform 1606 and bottom platform 1607 may be used to provide internal mobile platforms with access to interior 1301 of fuselage assembly 1200 instead of human operators.

In this illustrative example, internal mobile platform 1608 may be positioned on top platform 1606. Top platform 1606 may be substantially aligned with passenger floor 1400 such that internal mobile platform 1608 may be able to autonomously drive across top platform 1606 onto passenger floor 1400.

Similarly, an internal mobile platform (not shown in this view) may be positioned on bottom platform 1607. Bottom platform 1607 may be substantially aligned with cargo floor 1300 (not shown in this view) from FIG. 13 such that this other internal mobile platform (not shown in this view) may be able to autonomously drive across bottom platform 1607 onto the cargo floor. Internal mobile platform 1608 and the other internal mobile platform (not shown in this view) may be examples of implementations for internal mobile platform 406 in FIG. 4.

As depicted, internal robotic device 1610 and internal robotic device 1612 may be associated with internal mobile platform 1608. Although internal robotic device 1610 and internal robotic device 1612 are shown associated with the same internal mobile platform 1608, in other illustrative examples, internal robotic device 1610 may be associated with one internal mobile platform and internal robotic device 1612 may be associated with another internal mobile platform. Each of internal robotic device 1610 and internal robotic device 1612 may be an example of one implementation for internal robotic device 416 in FIG. 4.

Internal robotic device 1610 and internal robotic device 1612 may be used to perform operations within interior 1301 of fuselage assembly 1200 for joining plurality of panels 1508. For example, without limitation, internal robotic device 1610 and internal robotic device 1612 may be used to perform fastening operations, such as riveting operations, within interior 1301 of fuselage assembly 1200.

In one illustrative example, utility box 1620 may be associated with base structure 1604. Utility box 1620 may manage the number of utilities received from utility fixture 826 through interface 1602 and may distribute these utilities into utility cables that are managed using cable management system 1614 and cable management system 1616.

As depicted in this example, cable management system 1614 may be associated with top platform 1606 and cable management system 1616 may be associated with bottom platform 1607. Cable management system 1614 and cable management system 1616 may be implemented similarly.

Cable management system 1614 may include cable wheels 1615 and cable management system 1616 may include cable wheels 1617. Cable wheels 1615 may be used to spool utility cables that are connected to internal mobile platform 1608. For example, without limitation, cable wheels 1615 may be biased in some manner to substantially maintain a selected amount of tension in the utility cables. This biasing may be achieved using, for example, one or more spring mechanisms.

As internal mobile platform 1608 moves away from second tower 1600 along passenger floor 1400, the utility cables may extend from cable wheels 1615 to maintain utility support to internal mobile platform 1608 and manage the utility cables such that they do not become tangled. Cable wheels 1617 may be implemented in a manner similar to cable wheels 1615.

By using cable wheels 1615 to spool the utility cables, the utility cables may be kept off of internal mobile platform 1608, thereby reducing the weight of internal mobile platform 1608 and the load applied by internal mobile platform 1608 to passenger floor 1400. The number of utilities provided to internal mobile platform 1608 may include, for example, without limitation, electricity, air, water, hydraulic fluid, communications, some other type of utility, or some combination thereof.

Figure 17:
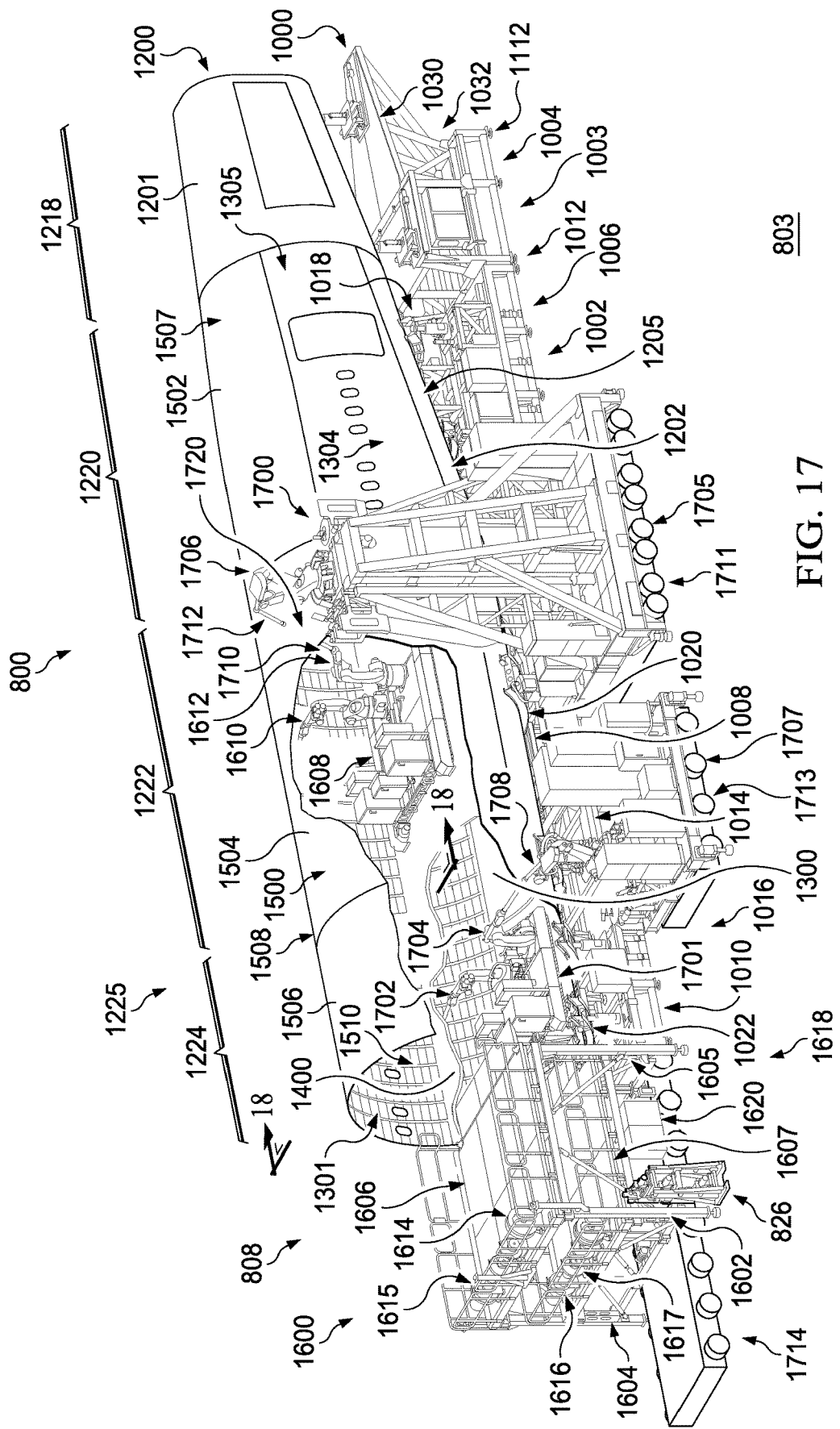
FIG. 17 is an illustration of a cutaway view of a plurality of mobile platforms performing fastening processes within an interior of a fuselage assembly in accordance with an illustrative embodiment.

With reference now to FIG. 17, an illustration of an isometric cutaway view of a plurality of mobile platforms performing fastening processes within interior 1301 of fuselage assembly 1200 is depicted in accordance with an illustrative embodiment. In this illustrative example, plurality of mobile platforms 1700 may be used to perform fastening processes to join plurality of panels 1508 together.

In particular, plurality of panels 1508 may be joined together at selected locations along fuselage assembly 1200. Plurality of panels 1508 may be joined to form at least one of lap joints, butt joints, or other types of joints. In this manner, plurality of panels 1508 may be joined such that at least one of circumferential attachment, longitudinal attachment, or some other type of attachment is created between the various panels of plurality of panels 1508.

As depicted, plurality of mobile platforms 1700 may include internal mobile platform 1608 and internal mobile platform 1701. Internal mobile platform 1608 and internal mobile platform 1701 may be an example of one implementation for number of internal mobile platforms 402 in FIG. 4. Internal mobile platform 1608 may be configured to move along passenger floor 1400, while internal mobile platform 1701 may be configured to move along cargo floor 1300.

As depicted, internal robotic device 1702 and internal robotic device 1704 may be associated with internal mobile platform 1701. Each of internal robotic device 1702 and internal robotic device 1704 may be an example of one implementation for internal robotic device 416 in FIG. 4. Internal robotic device 1702 and internal robotic device 1704 may be similar to internal robotic device 1610 and internal robotic device 1612.

Plurality of mobile platforms 1700 may also include external mobile platform 1705 and external mobile platform 1707. External mobile platform 1705 and external mobile platform 1707 may be an example of one implementation for at least a portion of number of external mobile platforms 400 in FIG. 4. External mobile platform 1705 and external mobile platform 1707 may be examples of implementations for external mobile platform 404 in FIG. 4.

External robotic device 1706 may be associated with external mobile platform 1705. External robotic device 1708 may be associated with external mobile platform 1707. Each of external robotic device 1706 and external robotic device 1708 may be an example of one implementation for external robotic device 408 in FIG. 4.

As depicted, external robotic device 1706 and internal robotic device 1612 may work collaboratively to install fasteners autonomously in fuselage assembly 1200. These fasteners may take the form of, for example, without limitation, at least one of rivets, interference-fit bolts, non-interference-fit bolts, or other types of fasteners or fastener systems. Similarly, external robotic device 1708 and internal robotic device 1704 may work collaboratively to install fasteners autonomously in fuselage assembly 1200. As one illustrative example, end effector 1710 of internal robotic device 1612 and end effector 1712 of external robotic device 1706 may be positioned relative to a same location 1720 on fuselage assembly 1200 to perform a fastening process at location 1720, such as fastening process 424 in FIG. 4.

The fastening process may include at least one of, for example, without limitation, a drilling operation, a fastener insertion operation, a fastener installation operation, an inspection operation, or some other type of operation. The fastener installation operation may take the form of, for example, without limitation, two-stage riveting process 444 described in FIG. 4, interference-fit bolt-type installation process 439 described in FIG. 4, bolt-nut type installation process 433 described in FIG. 4, or some other type of fastener installation operation.

In this illustrative example, autonomous vehicle 1711 may be fixedly associated with external mobile platform 1705. Autonomous vehicle 1711 may be used to drive external mobile platform 1705 autonomously. For example, autonomous vehicle 1711 may be used to autonomously drive external mobile platform 1705 across floor 803 of manufacturing environment 800 relative to assembly fixture 1112.

Similarly, autonomous vehicle 1713 may be fixedly associated with external mobile platform 1707. Autonomous vehicle 1713 may be used to drive external mobile platform 1707 autonomously. For example, autonomous vehicle 1713 may be used to autonomously drive external mobile platform 1707 across floor 803 of manufacturing environment 800 relative to assembly fixture 1112.

By being fixedly associated with external mobile platform 1705 and external mobile platform 1707, autonomous vehicle 1711 and autonomous vehicle 1713 may be considered integral to external mobile platform 1705 and external mobile platform 1707, respectively. However, in other illustrative examples, these autonomous vehicles may be independent of the external mobile platforms in other illustrative examples.

Once all fastening processes have been completed for fuselage assembly 1200, internal mobile platform 1608 and internal mobile platform 1701 may be autonomously driven across passenger floor 1400 and cargo floor 1300 back onto top platform 1606 and bottom platform 1607, respectively, of second tower 1600. Second tower 1600 may then be autonomously decoupled from both utility fixture 826 and assembly fixture 1112. Autonomous vehicle 1714 may then be used to autonomously drive or move second tower 1600 away.

In this illustrative example, building of fuselage assembly 1200 may now be considered completed for this stage in the overall assembly process for the fuselage. Consequently, assembly fixture 1112 may be autonomously driven across floor 803 to move fuselage assembly 1200 to some other location. In other illustrative examples, first tower 900 from FIG. 9 may be autonomously driven back into selected tower position 918 in FIG. 9 relative to utility fixture 826. First tower 900 from FIG. 9 may then be autonomously recoupled to utility fixture 826 and assembly fixture 1112. First tower 900 from FIG. 9 may enable a human operator (not shown) to access interior 1301 of fuselage assembly 1200 to perform other operations including, but not limited to, at least one of inspection operations, fastening operations, system installation operations, or other types of operations. System installation operations may include operations for installing systems such as, for example, without limitation, at least one of a fuselage utility system, an air conditioning system, interior panels, electronic circuitry, some other type of system, or some combination thereof.

Figure 18:
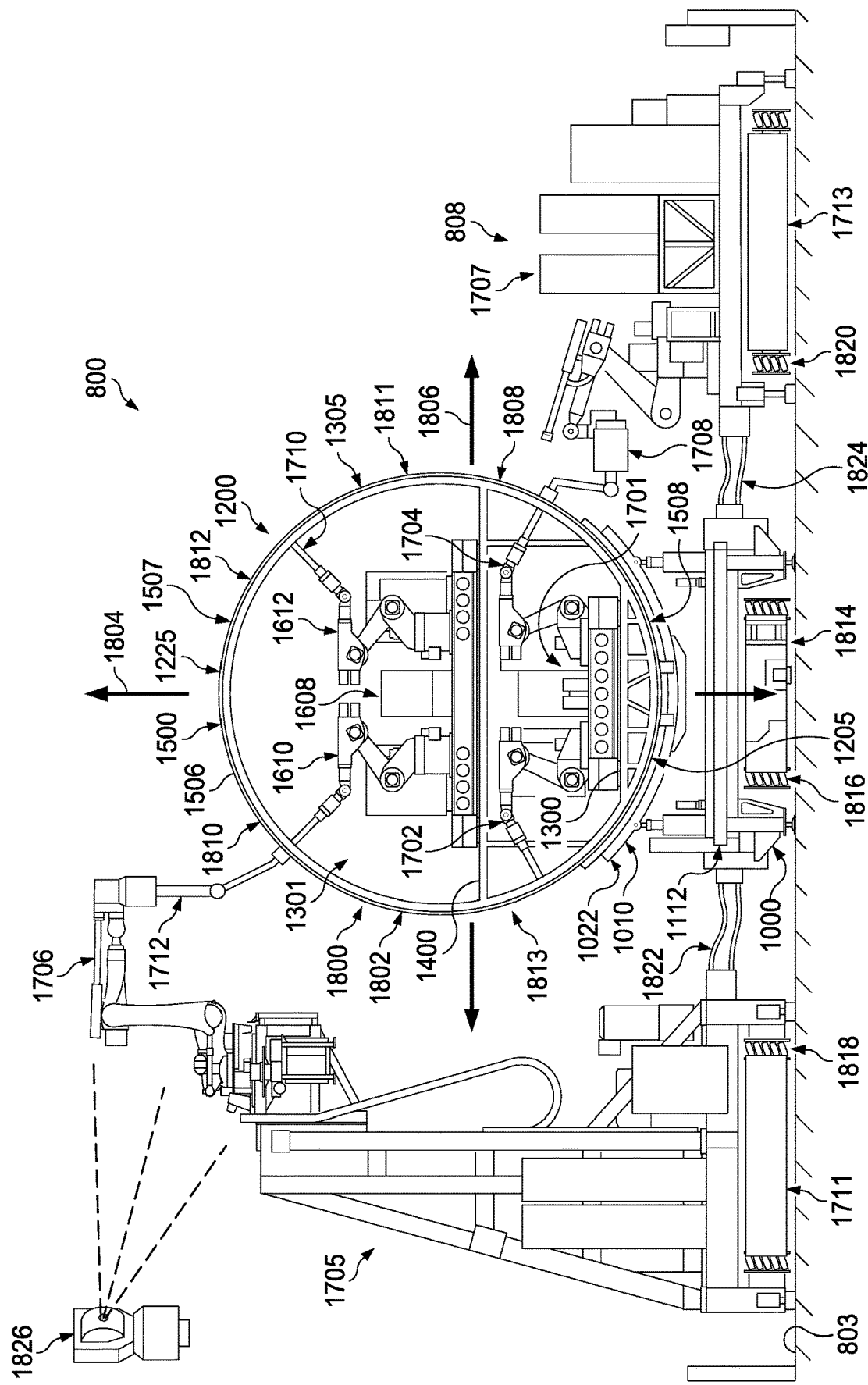
FIG. 18 is an illustration of a cross-sectional view of a flexible manufacturing system performing operations on a fuselage assembly in accordance with an illustrative embodiment.

With reference now to FIG. 18, an illustration of a cross-sectional view of flexible manufacturing system 808 performing operations on fuselage assembly 1200 from FIG. 17 is depicted in accordance with an illustrative embodiment. In this illustrative example, a cross-sectional view of fuselage assembly 1200 from FIG. 17 is depicted taken in the direction of lines 18-18 in FIG. 17.

As depicted, internal mobile platform 1608 and internal mobile platform 1701 are performing operations within interior 1301 of fuselage assembly 1200. External mobile platform 1705 and external mobile platform 1707 are performing assembly operations along exterior 1800 of fuselage assembly 1200.

In this illustrative example, external mobile platform 1705 may be used to perform operations along portion 1802 of exterior 1800 between axis 1804 and axis 1806 at first side 1810 of fuselage assembly 1200. External robotic device 1706 of external mobile platform 1705 may work collaboratively with internal robotic device 1610 of internal mobile platform 1608 to perform fastening processes.

Similarly, external mobile platform 1707 may be used to perform operations along portion 1808 of exterior 1800 of fuselage assembly 1200 between axis 1804 and axis 1806 at second side 1812 of fuselage assembly 1200. External robotic device 1708 of external mobile platform 1707 may work collaboratively with internal robotic device 1704 of internal mobile platform 1701 to perform fastening processes.

Although external mobile platform 1705 is depicted as being located at first side 1810 of fuselage assembly 1200, external mobile platform 1705 may be autonomously driven by autonomous vehicle 1711 to second side 1812 of fuselage assembly 1200 to perform operations along portion 1811 of exterior 1800 of fuselage assembly 1200 between axis 1804 and axis 1806. Similarly, external mobile platform 1707 may be autonomously driven by autonomous vehicle 1713 to first side 1810 of fuselage assembly 1200 to perform operations along portion 1813 of exterior 1800 of fuselage assembly 1200 between axis 1804 and axis 1806.

Although not shown in this illustrative example, an external mobile platform similar to external mobile platform 1705 may have an external robotic device configured to work collaboratively with internal robotic device 1612 of internal mobile platform 1608 at second side 1812 of fuselage assembly 1200. Similarly, an external mobile platform similar to external mobile platform 1707 may have an external robotic device configured to work collaboratively with internal robotic device 1702 of internal mobile platform 1701 at first side 1810 of fuselage assembly 1200.

These four different external mobile platforms and two internal mobile platforms may be controlled such that the operations performed by internal mobile platform 1608 located on passenger floor 1400 may occur at a different location with respect to the longitudinal axis of fuselage assembly 1200 than the operations performed by internal mobile platform 1701 located on cargo floor 1300. The four external mobile platforms may be controlled such that the two external mobile platforms located on the same side of fuselage assembly 1200 do not collide or impede one another. The two external mobile platforms located at the same side of fuselage assembly 1200 may be unable to occupy the same footprint in this illustrative example.

In this illustrative example, external mobile platform 1705 may autonomously couple to assembly fixture 1112 to form interface 1822 such that a number of utilities may flow from assembly fixture 1112 to external mobile platform 1705. In other words, the number of utilities may be autonomously coupled between external mobile platform 1705 and assembly fixture 1112 through interface 1822. In particular, external mobile platform 1705 has been coupled to cradle fixture 1010 through interface 1822.

Similarly, external mobile platform 1707 may autonomously couple to assembly fixture 1112 to form interface 1824 such that a number of utilities may flow from assembly fixture 1112 to external mobile platform 1707. In other words, the number of utilities may be autonomously coupled between external mobile platform 1707 and assembly fixture 1112 through interface 1824. In particular, external mobile platform 1707 has been coupled to cradle fixture 1010 through interface 1824.

As operations are performed along fuselage assembly 1200 by external mobile platform 1705, external mobile platform 1707, and any other external mobile platforms, these external mobile platforms may be coupled to and decoupled from assembly fixture 1112 as needed. For example, external mobile platform 1707 may decouple from cradle fixture 1010 as external mobile platform 1707 moves aftward along fuselage assembly 1200 such that external mobile platform 1707 may then autonomously couple to cradle fixture 1008 (not shown) from FIGS. 10-17. Further, these external mobile platforms may be coupled to and decoupled from assembly fixture 1112 to avoid collisions and prevent the external mobile platforms from impeding each other during maneuvering of the external mobile platforms relative to assembly fixture 1112 and fuselage assembly 1200.

As depicted, autonomous vehicle 1814 is shown positioned under the assembly fixture 1112 formed by cradle system 1000. In this illustrative example, autonomous vehicle 1814, autonomous vehicle 1711, and autonomous vehicle 1713 may have omnidirectional wheels 1816, omnidirectional wheels 1818, and omnidirectional wheels 1820, respectively. In some illustrative examples, metrology system 1826 may be used to help position external mobile platform 1705 and external mobile platform 1707 relative to fuselage assembly 1200.

Figure 19:
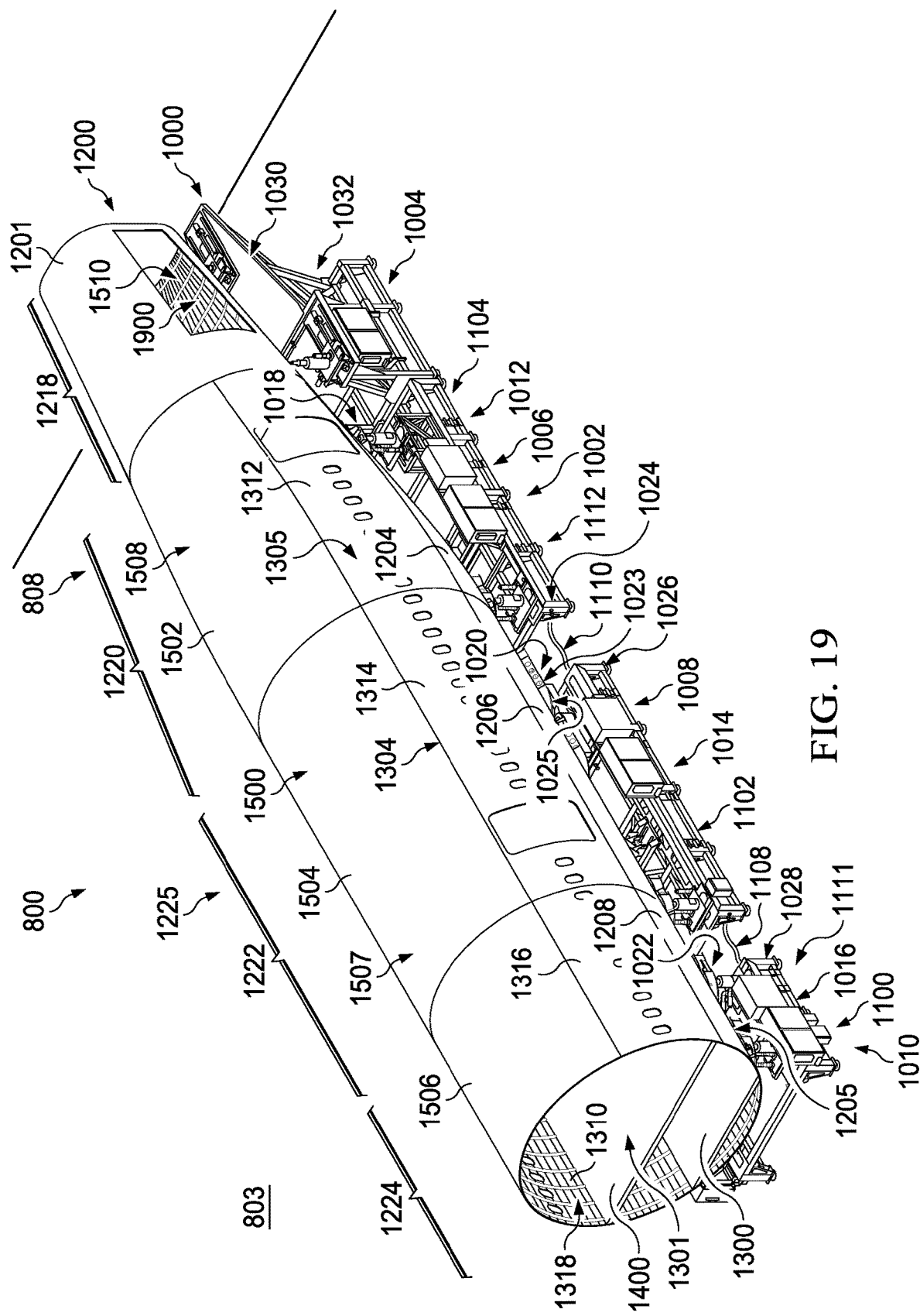
FIG. 19 is an illustration of an isometric view of a fully built fuselage assembly in accordance with an illustrative embodiment.

Turning now to FIG. 19, an illustration of an isometric view of a fully built fuselage assembly is depicted in accordance with an illustrative embodiment. In this illustrative example, fuselage assembly 1200 may be considered completed when plurality of panels 1508 have been fully joined.

In other words, all fasteners needed to join together plurality of panels 1508 have been fully installed. With plurality of panels 1508 joined together, support structure 1900 may be fully formed. Support structure 1900 may be an example of one implementation for support structure 121 in FIG. 1. Fuselage assembly 1200, which is an aft fuselage assembly, may now be ready for attachment to a corresponding middle fuselage assembly (not shown) and forward fuselage assembly (not shown).

As depicted, autonomous vehicles (not shown in this view), similar to autonomous vehicle 1714 shown in FIG. 17, may be positioned under base 1012 of cradle fixture 1006, base 1014 of cradle fixture 1008, and base 1016 of cradle fixture 1010, respectively. Autonomous vehicles, such as number of corresponding autonomous vehicles 316 in FIG. 3, may lift up base 1012, base 1014, and base 1016, respectively, such that plurality of stabilizing members 1024, plurality of stabilizing members 1026, and plurality of stabilizing members 1028, respectively, no longer contact the floor.

These autonomous vehicles (not shown) may then autonomously drive cradle system 1000 carrying fuselage assembly 1200 that has been fully built away from assembly environment 802 in FIG. 8 and, in some cases, away from manufacturing environment 800 in FIG. 8. Computer-controlled movement of these autonomous vehicles (not shown) may ensure that number of cradle fixtures 1002 maintain their positions relative to each other as fuselage assembly 1200 is being moved.

Figure 20:
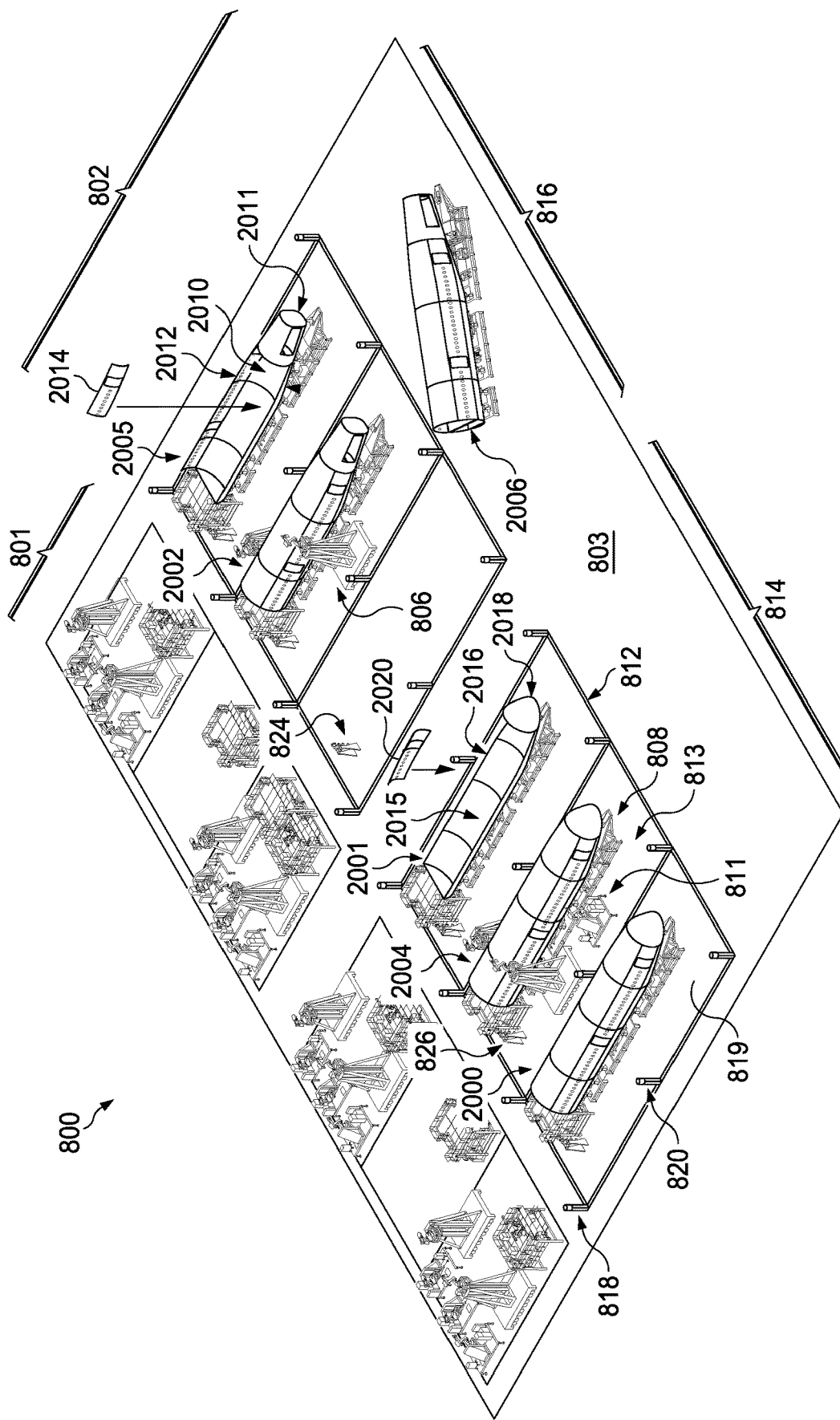
FIG. 20 is an illustration of an isometric view of fuselage assemblies being built within a manufacturing environment in accordance with an illustrative embodiment.

With reference now to FIG. 20, an illustration of an isometric view of fuselage assemblies being built within manufacturing environment 800 is depicted in accordance with an illustrative embodiment. In this illustrative example, plurality of fuselage assemblies 2000 are being built within plurality of work cells 812 in manufacturing environment 800.

Plurality of fuselage assemblies 2000 may include plurality of forward fuselage assemblies 2001 being built in first portion 814 of plurality of work cells 812 and plurality of aft fuselage assemblies 2002 being built in second portion 816 of plurality of work cells 812. Each of plurality of fuselage assemblies 2000 may be an example of one implementation for fuselage assembly 114 in FIG. 1.

As depicted, plurality of fuselage assemblies 2000 are being built concurrently. However, plurality of fuselage assemblies 2000 are at different stages of assembly in this illustrative example.

Forward fuselage assembly 2004 may be an example of one of plurality of forward fuselage assemblies 2001. Forward fuselage assembly 2004 may be an example of one implementation for forward fuselage assembly 117 in FIG. 1. Aft fuselage assembly 2005 may be an example of one of plurality of aft fuselage assemblies 2002. Aft fuselage assembly 2005 may be an example of one implementation for aft fuselage assembly 116 in FIG. 1. In this illustrative example, aft fuselage assembly 2005 may be at an earlier stage of assembly than forward fuselage assembly 2004.

Aft fuselage assembly 2006, which may be another example of an implementation for aft fuselage assembly 116 in FIG. 1, may be a fuselage assembly with all panels joined. As depicted, aft fuselage assembly 2006 is being autonomously driven to some other location for a next stage in the overall fuselage and aircraft manufacturing process.

As described above, aft fuselage assembly 2005 may be partially assembled. In this illustrative example, aft fuselage assembly 2005 has keel 2010, end panel 2011, and first side 2012. End panel 2011 may form an end fuselage section of aft fuselage assembly 2005. As depicted, side panel 2014 may be added to aft fuselage assembly 2005 to build a second side of aft fuselage assembly 2005.

Forward fuselage assembly 2015 may be another example of one of plurality of forward fuselage assemblies 2001. In this illustrative example, forward fuselage assembly 2015 has keel 2016 and end panel 2018. End panel 2018 may form an end fuselage section of forward fuselage assembly 2015. As depicted, side panel 2020 may be added to forward fuselage assembly 2015 to begin building a first side of forward fuselage assembly 2015.

Figure 21:
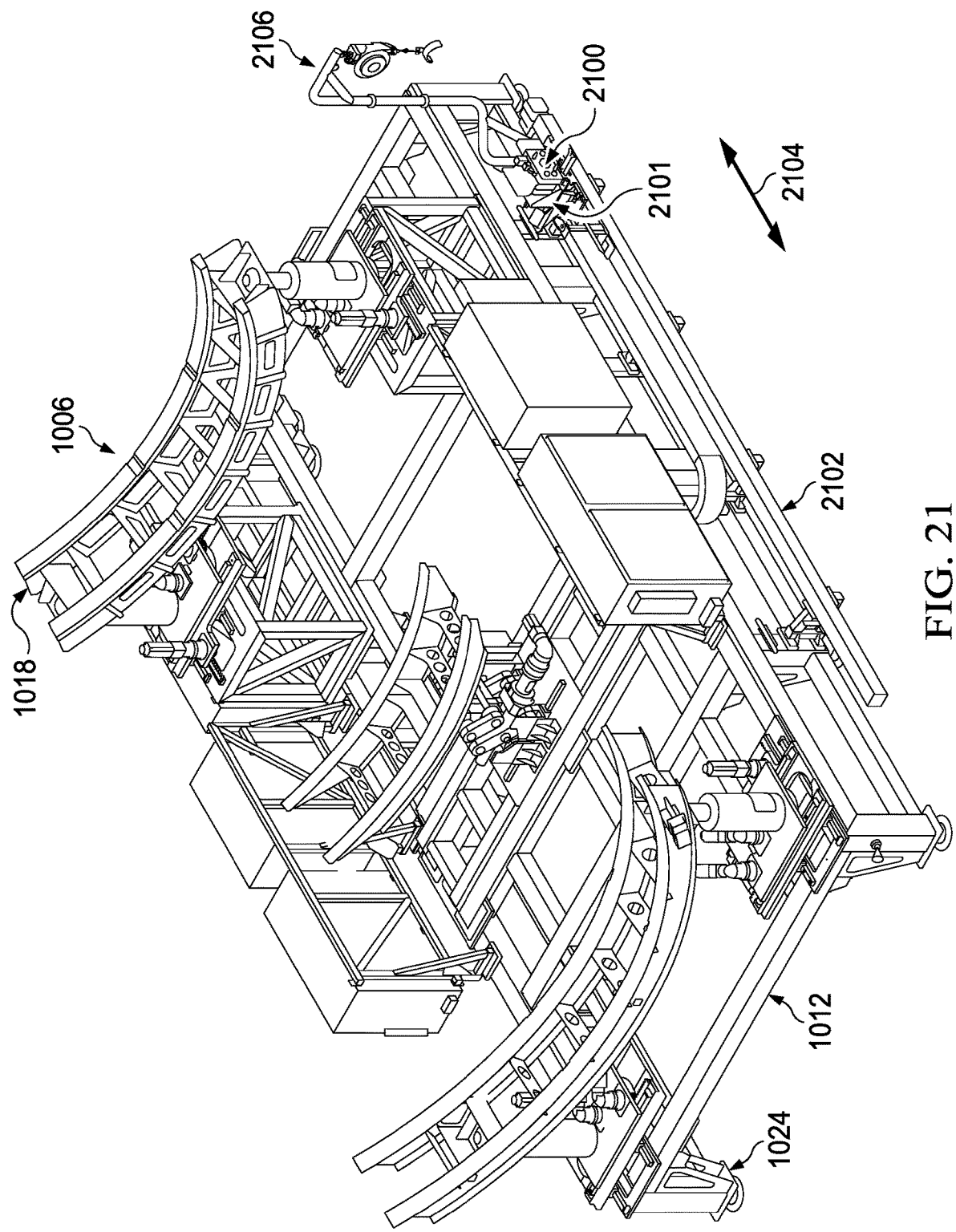
FIG. 21 is an illustration of an enlarged isometric view of a cradle fixture in accordance with an illustrative embodiment.

With reference now to FIG. 21, an illustration of an enlarged isometric view of cradle fixture 1006 from FIG. 10 is depicted in accordance with an illustrative embodiment. In this illustrative example, utilities unit 2100 may be associated with cradle fixture 1006. Utilities unit 2100 may be an example of one implementation for utilities unit 606 in FIG. 6.

As depicted, utilities unit 2100 may be associated with base 2101. Base 2101 may be associated with rail system 2102, which is attached to cradle fixture 1006. Base 2101, and thereby utilities unit 2100, may be moved along rail system 2102 relative to base 1012 of cradle fixture 1006 in a direction along X-axis 2104.

Utilities unit 2100 may be coupled to an external mobile platform, such as either external mobile platform 1705 or external mobile platform 1707 in FIG. 17. Utilities unit 2100 may provide a number of utilities from cradle fixture 1006 to this external mobile platform.

Cable management system 2106 may be associated with cradle fixture 1006 and utilities unit 2100. Cable management system 2106 may be an example of one implementation for cable management system 620 in FIG. 6. Cable management system 2106 may be used to manage a number of utility cables (not shown) that connect to utilities unit 2100.

Figure 22:
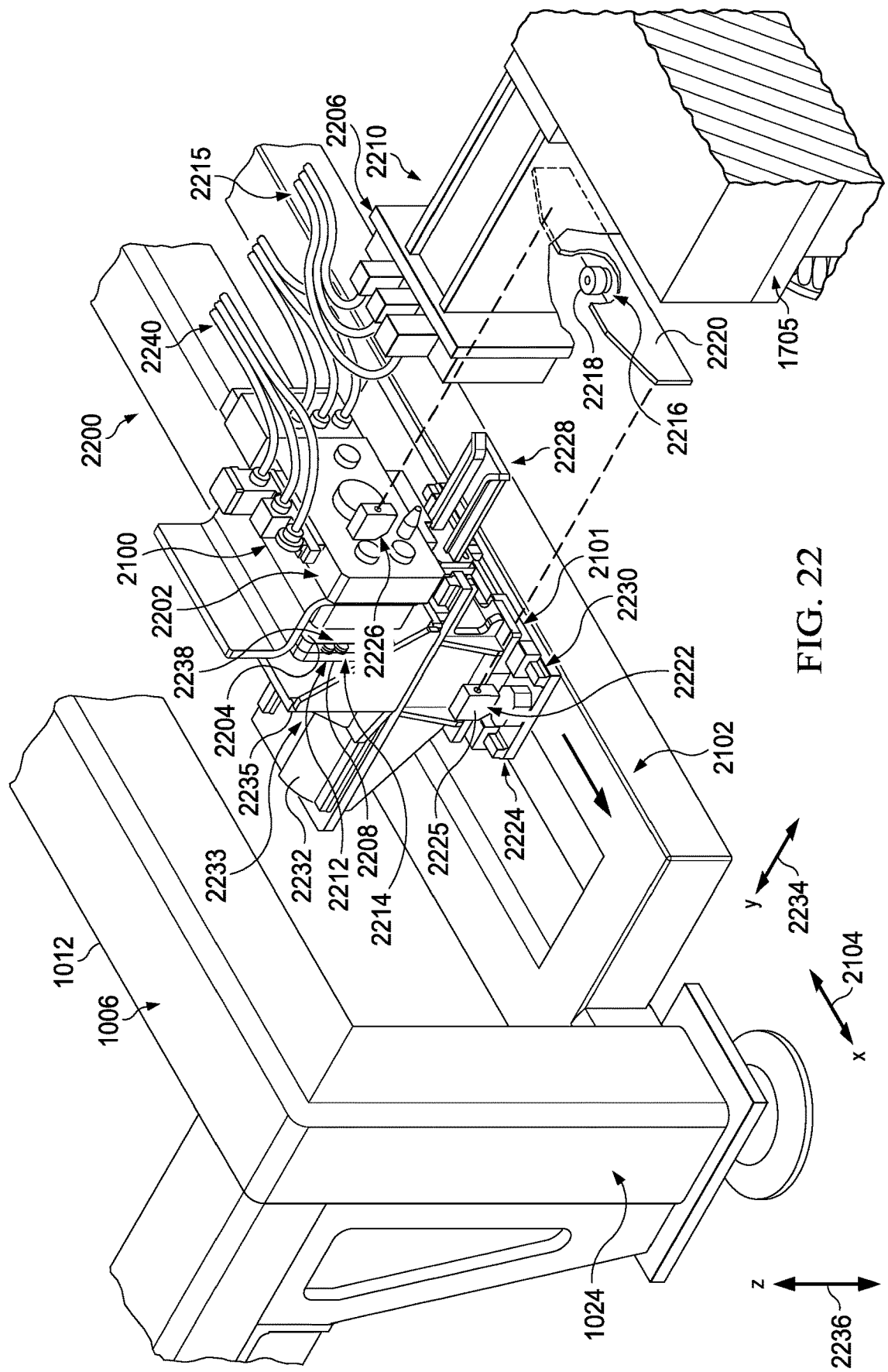
FIG. 22 is an illustration of an isometric view of a dual-interface coupler in accordance with an illustrative embodiment.

With reference now to FIG. 22, an illustration of an isometric view of a dual-interface coupler is depicted in accordance with an illustrative embodiment. In this illustrative example, dual-interface coupler 2200 may be an example of one implementation for dual-interface coupler 600 in FIG. 6. Dual-interface coupler 2200 may include utilities unit 2100 shown in FIG. 21.

First coupling unit 2202 and second coupling unit 2204 may be associated with utilities unit 2100. First coupling unit 2202 and second coupling unit 2204 may be examples of implementations for first coupling unit 612 and second coupling unit 614, respectively, in FIG. 6.

Further, first corresponding coupling unit 2206 has been fitted to external mobile platform 1705 from FIG. 17. In this illustrative example, first corresponding coupling unit 2206 may be permanently attached to external mobile platform 1705 by fitting 2210. Second corresponding coupling unit 2208 is shown associated with rail system 2102 of cradle fixture 1006 from FIG. 21. First corresponding coupling unit 2206 and second corresponding coupling unit 2208 may be examples of implementations for first corresponding coupling unit 616 and second corresponding coupling unit 618, respectively, in FIG. 6.

In this illustrative example, second coupling unit 2204 is mated with second corresponding coupling unit 2208. Interface 2212 is formed between second coupling unit 2204 and second corresponding coupling unit 2208. In particular, mechanical interface 2214 is formed between second coupling unit 2204 and second corresponding coupling unit 2208. In this illustrative example, mechanical interface 2214, and thereby interface 2212, may be activated, or locked. Interface 2212 and mechanical interface 2214 may be examples of implementations for second interface 626 and mechanical interface 644, respectively, in FIG. 6.

First coupling unit 2202 may be configured to mate with first corresponding coupling unit 2206 associated with external mobile platform 1705. As depicted, number of utility cables 2215 extend from first corresponding coupling unit 2206. Number of utility cables 2215 may connect to, for example, without limitation, a set of units (not shown) that may be associated with external mobile platform 1705. When first corresponding coupling unit 2206 is mated with first coupling unit 2202 associated with utilities unit 2100, a number of utilities may flow from cradle fixture 1006 through utilities unit 2100 to external mobile platform 1705. Number of utility cables 2215 may distribute these utilities to at least one of a set of units (not shown) associated with external mobile platform 1705, external robotic device 1706 in FIG. 17 associated with external mobile platform 1705, a tool (not shown) associated with external mobile platform 1705, or some other type of device.

As depicted, first alignment system 2216 may be associated with first corresponding coupling unit 2206. First alignment system 2216 may be an example of one implementation for first alignment system 660 in FIGS. 6 and 7. First alignment system 2216 may include roller 2218 and target plate 2220. Roller 2218 may be an example of one implementation for roller 706 in FIG. 7. Target plate 2220 may be an example of one implementation for set of laser targets 718 in FIG. 7.

Second alignment system 2222 may be associated with second corresponding coupling unit 2208. Second alignment system 2222 may be an example of one implementation for second alignment system 662 in FIGS. 6 and 7. Second alignment system 2222 may include set of movement systems 2224, laser device 2225, laser device 2226, and guidance fork 2228. Set of movement systems 2224 may be an example of one implementation for set of movement systems 708 in FIG. 7. Laser device 2225 and laser device 2226 may each be an example of one implementation for laser device 722 in FIG. 7. Further, guidance fork 2228 may be an example of one implementation for guidance fork 712 in FIG. 7.

As depicted in this example, set of movement systems 2224 may include rail system 2230 and air cylinder 2232. Rail system 2230 may be used to move second corresponding coupling unit 2208, and thereby utilities unit 2100, in a direction along at least one of X-axis 2104 or Y-axis 2234. Rail system 2230 may include any number of rails. Air cylinder 2232 may be used to move bracket 2233 in a direction along Y-axis 2234. In this illustrative example, bracket 2233 is in forward position 2235 that is located further away from cradle fixture 1006 than a home position (not shown) of bracket 2233. Second corresponding coupling unit 2208 may be integrated with bracket 2233 such that movement of bracket 2233 by air cylinder 2232 also moves second corresponding coupling unit 2208.

In this illustrative example, laser device 2225 and laser device 2226 may be used to more precisely position first coupling unit 2202 relative to first corresponding coupling unit 2206 such that the two coupling units may be engaged with each other. Guidance fork 2228 may be used to guide roller 2218 to aid in the alignment of first corresponding coupling unit 2206 with first coupling unit 2202 in the direction of at least one of X-axis 2104 or Z-axis 2236. For example, external mobile platform 1705 may be driven to move first corresponding coupling unit 2206 towards first coupling unit 2202. As first corresponding coupling unit 2206 is moved towards first coupling unit 2202, set of movement systems 2224 may move utilities unit 2100, and thereby first coupling unit 2202 associated with utilities unit 2100, into alignment with first corresponding coupling unit 2206. Roller 2218 may be guided into and engaged with guidance fork 2228.

In this illustrative example, compliance unit 2238 may be associated with utilities unit 2100. Compliance unit 2238 may be an example of one implementation for compliance unit 651 in FIG. 6. Compliance unit 2238 may allow utilities unit 2100 to have a certain amount of rotational freedom of movement relative to second coupling unit 2204, which may aid in the alignment of first coupling unit 2202 to first corresponding coupling unit 2206. Compliance unit 2238 may be integrated with utilities unit 2100 in this illustrative example.

In this illustrative example, number of utility cables 2240 may connect to utilities unit 2100. Number of utility cables 2240 may carry a number of utilities from cradle fixture 1006 to utilities unit 2100.

Figure 23:
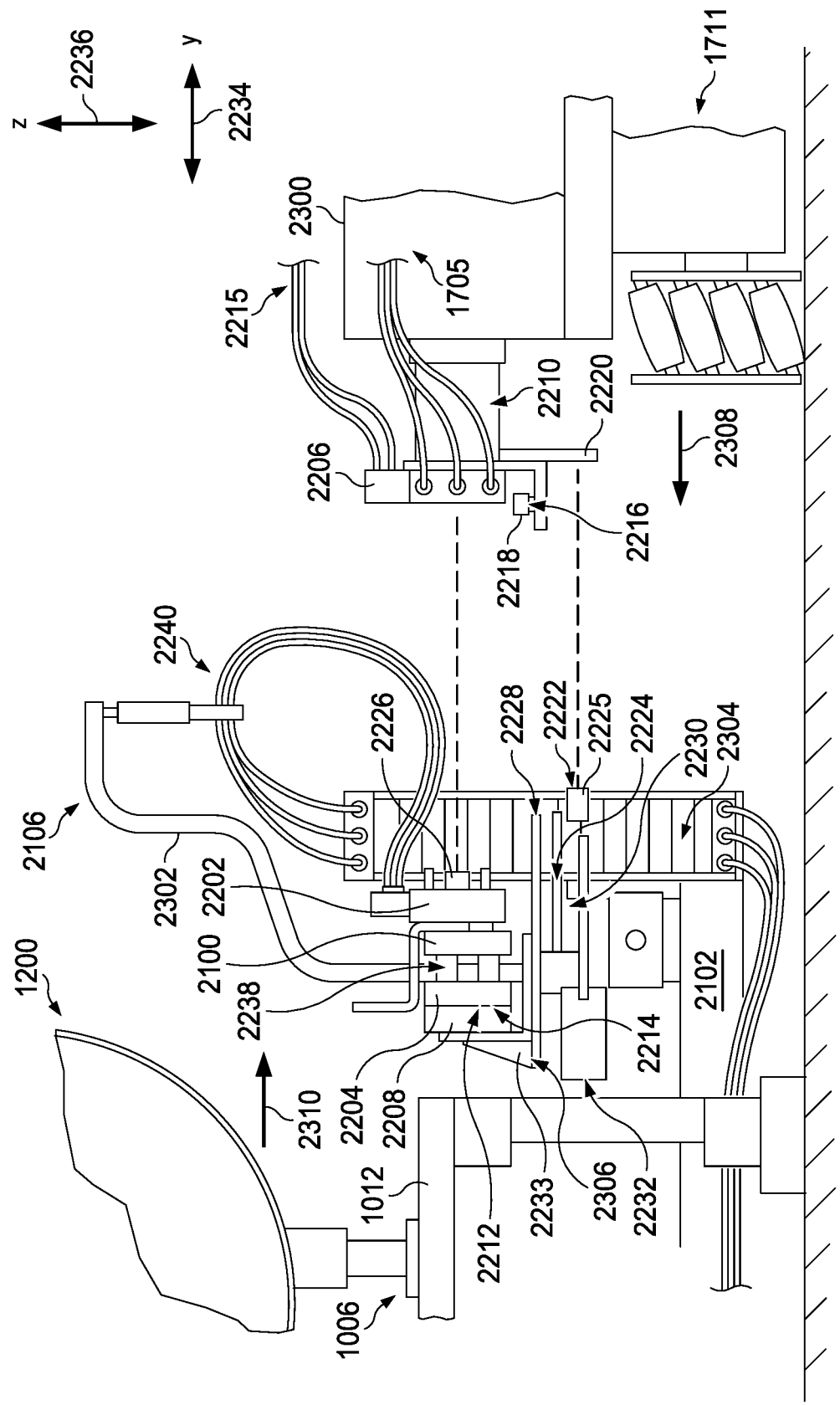
FIG. 23 is an illustration of a front view of a dual-interface coupler in accordance with an illustrative embodiment.

With reference now to FIG. 23, an illustration of a front view of dual-interface coupler 2200 from FIG. 22 is depicted in accordance with an illustrative embodiment. In this illustrative example, autonomous vehicle 1711 fixedly associated with external mobile platform 1705 may be seen. Fitting 2210 may be permanently affixed to platform base 2300 of external mobile platform 1705 in this illustrative example.

As depicted, cable management system 2106 may include cable support arm 2302 and cable track 2304. Cable support arm 2302 and cable track 2304 may be examples of implementations for cable support arm 623 and cable track 621, respectively, shown in FIG. 6. Cable support arm 2302 and cable track 2304 keep number of utility cables 2240 organized and may support number of utility cables 2240 as utilities unit 2100 is moved relative to cradle fixture 1006. In some cases, cable track 2304 may be comprised of a flexible material.

In this illustrative example, bracket 2233 may be shown in home position 2306. As depicted, home position 2306 may be located closer to cradle fixture 1006 than forward position 2235 for bracket 2233 seen in in FIG. 22.

External mobile platform 1705 may be driven in the direction of arrow 2308 such that first corresponding coupling unit 2206 may be moved towards first coupling unit 2202 and thereby, utilities unit 2100. Air cylinder 2232 may be used to move bracket 2233 in the direction of arrow 2310 to move utilities unit 2100 towards external mobile platform 1705.

Bracket 2233 may be associated with rail system 2230. Rail system 2230 may be used to move bracket 2233 in a direction along at least one of Y-axis 2234 or X-axis 2104 seen in FIG. 22. In some cases, bracket 2233 may be stabilized on rail system 2230 by a biasing system (not shown). The biasing system (not shown) may be comprised of any number of springs for use in stabilizing bracket 2233 with respect to rail system 2230 such that bracket 2233 may be biased into a home position after second coupling unit 2204 is decoupled from second corresponding coupling unit 2208. Decoupling second coupling unit 2204 from second corresponding coupling unit 2208 decouples utilities unit 2100 from cradle fixture 1006.

Further, as described above, second corresponding coupling unit 2208 may be associated with bracket 2233. Still further, guidance fork 2228 may be associated with bracket 2233. In this manner, movement of bracket 2233 in any direction may cause movement of second corresponding coupling unit 2208 and guidance fork 2228 of a substantially same distance in substantially the same direction.

At least one of laser device 2225 or laser device 2226 may be used to determine whether first corresponding coupling unit 2206 is aligned with first coupling unit 2202 within selected tolerances. When first corresponding coupling unit 2206 is not precisely positioned in alignment with first coupling unit 2202 within selected tolerances, air cylinder 2232 may move bracket 2233, and thereby guidance fork 2228, towards first coupling unit 2202. Guidance fork 2228 may receive roller 2218 and aid in the alignment of first coupling unit 2202 with respect to X-axis 2104 in FIG. 22.

In these illustrative examples, at least one of laser device 2225 or laser device 2226 may be used to generate data that may be used by, for example, without limitation, autonomous vehicle 1711. Autonomous vehicle 1711 may use the data to drive external mobile platform 1705 at least one of linearly or rotationally such that first corresponding coupling unit 2206 may be aligned with first coupling unit 2202.

Once first corresponding coupling unit 2206 has been aligned with first coupling unit 2202 within selected tolerances, first corresponding coupling unit 2206 may be mated with first coupling unit 2202. In other words, an interface may be formed between utilities unit 2100 and external mobile platform 1705.

Figure 24:
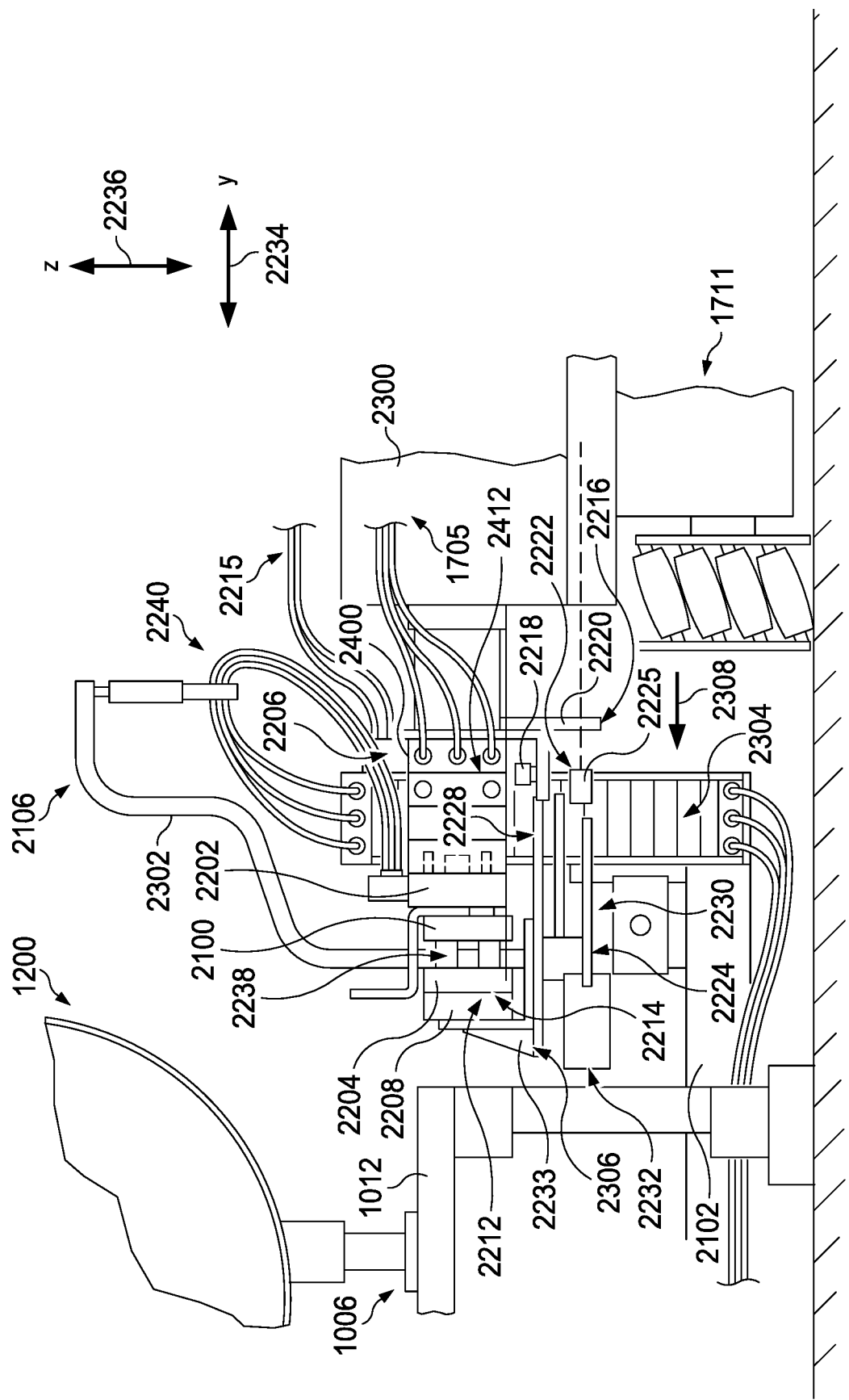
FIG. 24 is an illustration of an interface formed between a utilities unit and an external mobile platform in accordance with an illustrative embodiment.

With reference now to FIG. 24, an illustration of an interface formed between utilities unit 2100 and external mobile platform 1705 from FIG. 23 is depicted in accordance with an illustrative embodiment. In this illustrative example, interface 2400 has been formed between utilities unit 2100 and external mobile platform 1705. In particular, mechanical interface 2402 and utility interface 2404 has been formed between first coupling unit 2202 and first corresponding coupling unit 2206. Compliance unit 2238 may provide the rotational freedom of movement needed to fine-tune the coupling of first coupling unit 2202 to first corresponding coupling unit 2206.

Once interface 2400 is formed, interface 2400 may be activated. More specifically, mechanical interface 2402 may be activated, or locked. Once interface 2400 has been activated, interface 2212 may be deactivated. In other words, interface 2212 may be switched from a state of activated to a state of inactivated. Interface 2212 may be deactivated by unlocking interface 2212. Once interface 2212 has been deactivated, second coupling unit 2204 may be capable of being disengaged from second corresponding coupling unit 2208.

Figure 25:
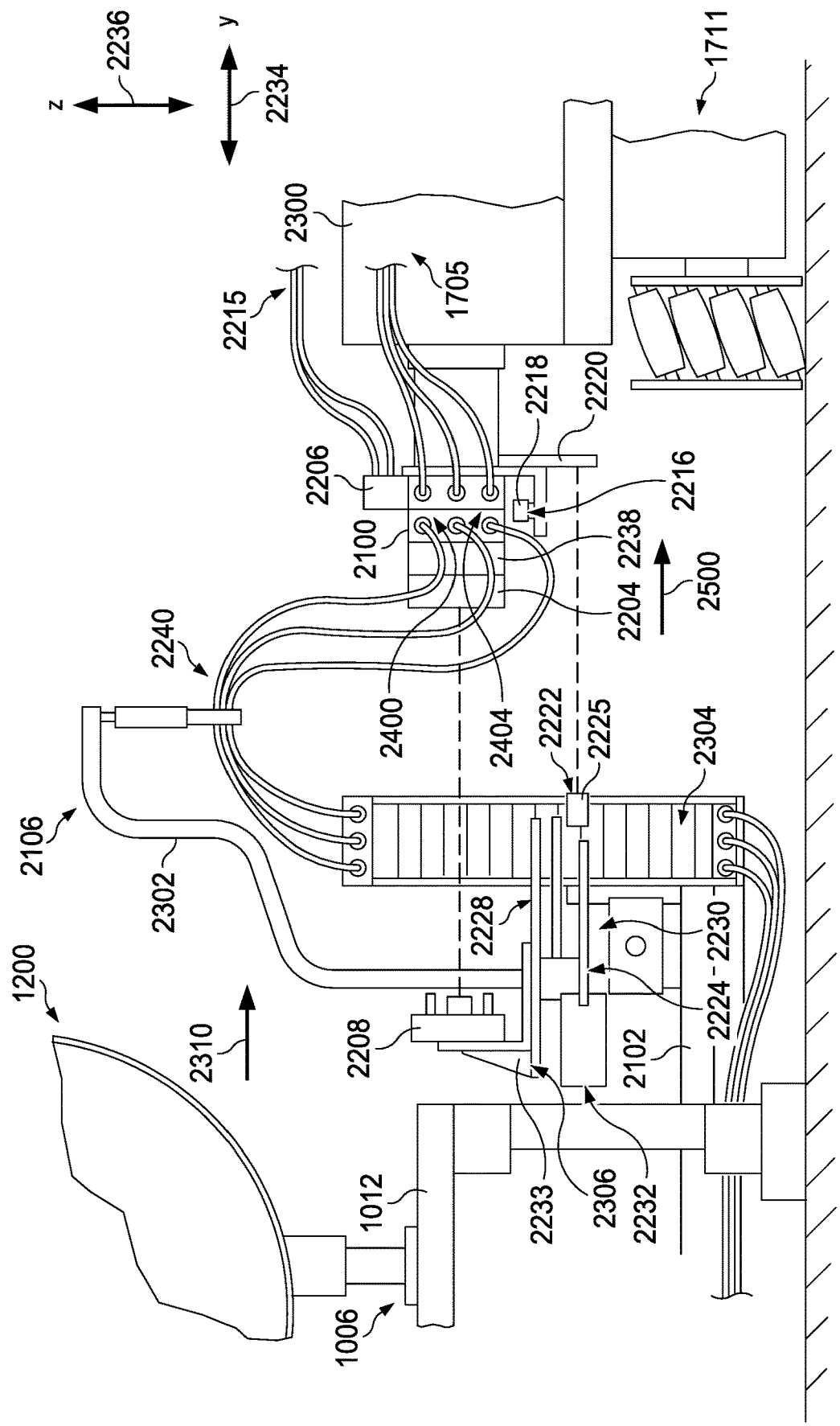
FIG. 25 is an illustration of a second coupling unit disengaged from a second corresponding coupling unit in accordance with an illustrative embodiment.

With reference now to FIG. 25, an illustration of second coupling unit 2204 disengaged from second corresponding coupling unit 2208 from FIG. 24 is depicted in accordance with an illustrative embodiment. In this illustrative example, autonomous vehicle 1711 may drive external mobile platform 1705 in the direction of arrow 2500.

As external mobile platform 1705 moves in the direction of arrow 2500, second coupling unit 2204 disengages from second corresponding coupling unit 2208 because interface 2212 was deactivated as described in FIG. 24. Interface 2400 remains activated such that utilities unit 2100 is moved with external mobile platform 1705 as external mobile platform 1705 moves away from cradle fixture 1006.

The illustrations of manufacturing environment 800 in FIGS. 8-25 are not meant to imply physical or architectural limitations to the manner in which an illustrative embodiment may be implemented. Other components in addition to or in place of the ones illustrated may be used. Some components may be optional.

The different components shown in FIGS. 8-25 may be illustrative examples of how components shown in block form in FIGS. 1-7 can be implemented as physical structures. Additionally, some of the components in FIGS. 8-25 may be combined with components in FIGS. 1-7, used with components in FIG. 1-7, or a combination of the two.

Figure 26:
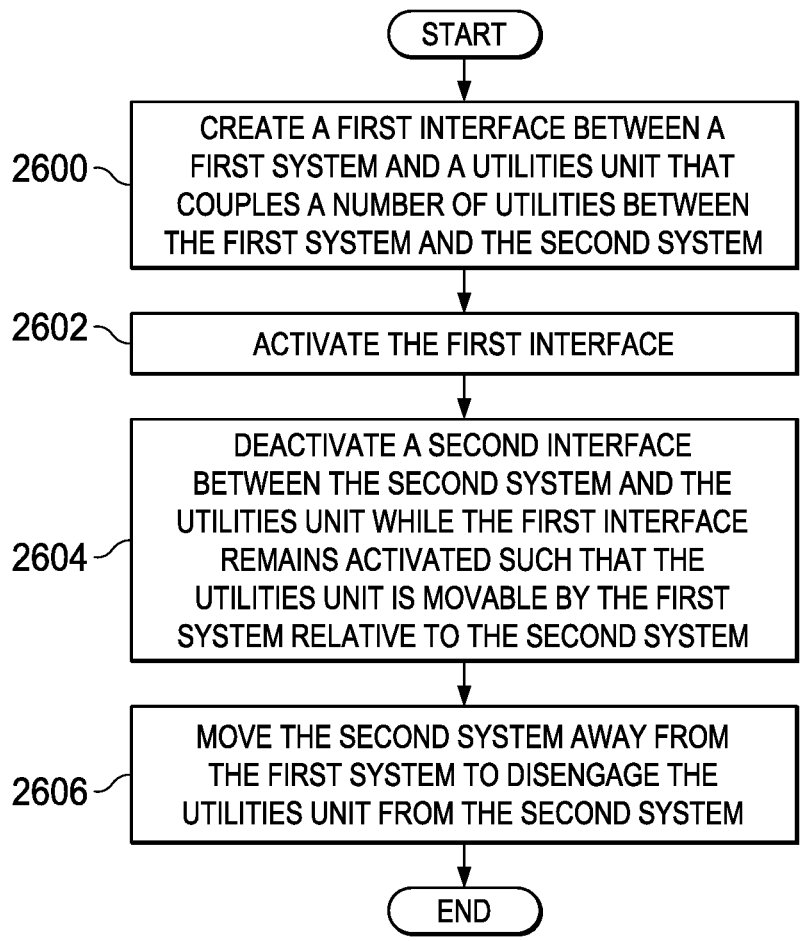
FIG. 26 is an illustration of a process for coupling a number of utilities between a first system and a second system in the form of a flowchart in accordance with an illustrative embodiment.

With reference now to FIG. 26, an illustration of a process for coupling a number of utilities between a first system and a second system is depicted in the form of a flowchart in accordance with an illustrative embodiment. The process illustrated in FIG. 26 may be implemented using dual-interface coupler 600 in FIG. 6.

The process may begin by creating first interface 624 between first system 601 and utilities unit 606 that couples number of utilities 146 between first system 601 and second system 603 (operation 2600). Creating first interface 624 may mechanically couple utilities unit 606 with first system 601 but may also create utility interface 653 between utilities unit 606 and first system 601. In other words, creating first interface 624 couples number of utilities 146 between utilities unit 606 and first system 601, thereby coupling number of utilities 146 between first system 601 and second system 603.

Next, first interface 624 is activated (operation 2602). Thereafter, second interface 626 between second system 603 and utilities unit 606 may be deactivated while first interface 624 remains activated such that utilities unit 606 is movable by first system 601 relative to second system 603 (operation 2604).

Next, second system 603 may be moved away from first system 601 to disengage utilities unit 606 from second system 603 (operation 2606), with the process terminating thereafter. Operation 2606 may effectively disconnect second interface 626.

With utilities unit 606 disengaged from second system 603, first system 601 may have the capability to freely move relative to second system 603, while still receiving number of utilities 146 from second system 603 through utilities unit 606. First system 601 may be capable of moving freely within the range allowed by cable management system 620 and number of utility cables 622. In some illustrative examples, one or more of the operations described above may be performed autonomously.

Figure 27:
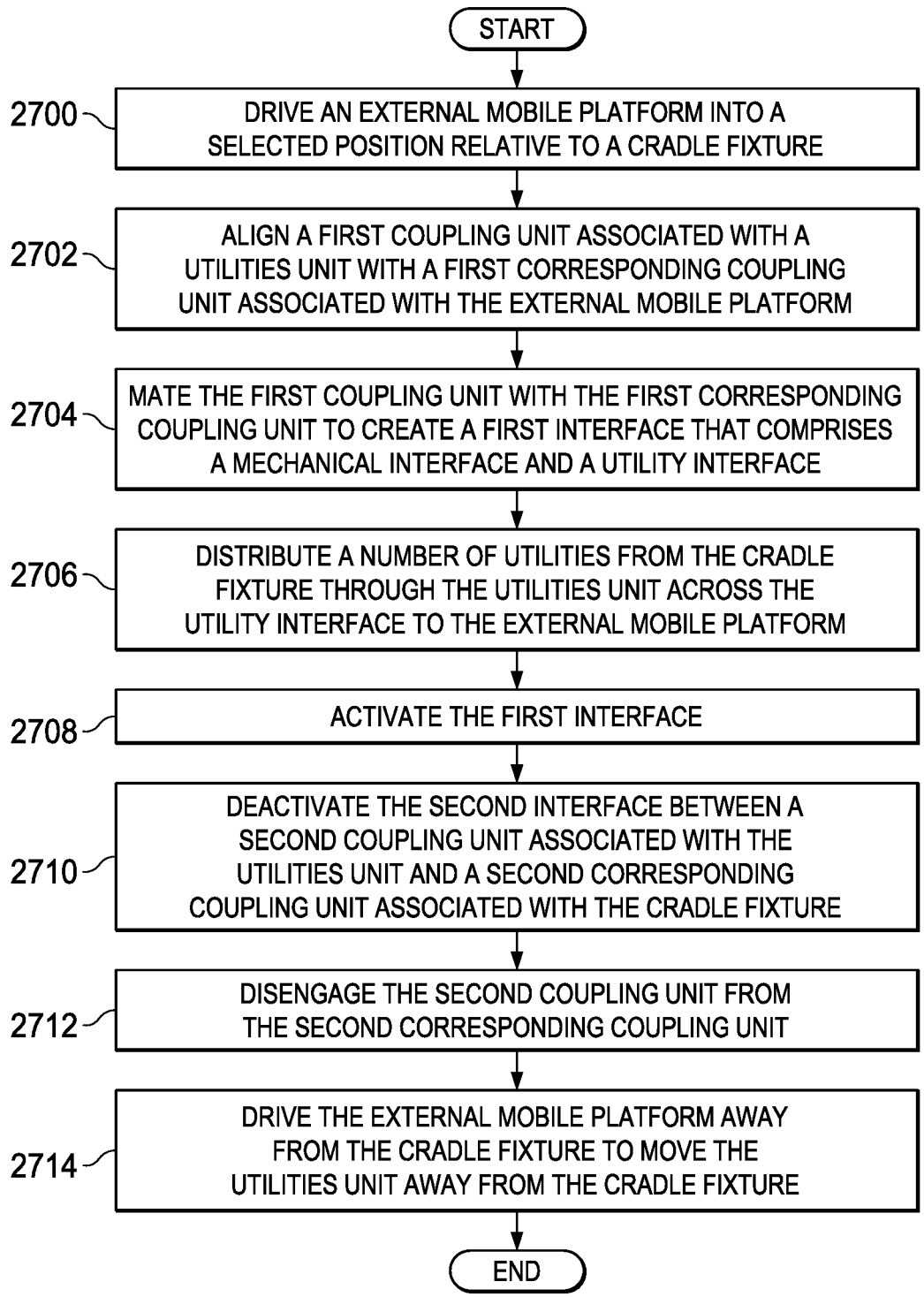
FIG. 27 is an illustration of a process for coupling a number of utilities between an external mobile platform and a cradle fixture in the form of a flowchart in accordance with an illustrative embodiment.

With reference now to FIG. 27, an illustration of a process for coupling a number of utilities between an external mobile platform and a cradle fixture is depicted in the form of a flowchart in accordance with an illustrative embodiment. The process illustrated in FIG. 27 may be implemented using dual-interface coupler 600 in FIG. 6.

The process may begin by driving external mobile platform 404 into selected position 650 relative to cradle fixture 322 (operation 2700). Next, first coupling unit associated with utilities unit 606 may be aligned with first corresponding coupling unit 616 associated with external mobile platform 404 (operation 2702). Then first coupling unit 612 may be mated with first corresponding coupling unit 616 to create first interface 624 that comprises mechanical interface 652 and utility interface 653 (operation 2704).

Number of utilities 146 may be distributed from cradle fixture 322 through utilities unit 606 across utility interface 653 to external mobile platform 404 (operation 2706). Next, first interface 624 may be activated (operation 2708). Second interface 626 between second coupling unit 614 associated with utilities unit 606 and second corresponding coupling unit 618 associated with cradle fixture 322 may be deactivated (operation 2710).

Second coupling unit 614 may then be disengaged from second corresponding coupling unit 618 and moved away from cradle fixture 322 (operation 2712). External mobile platform 404 may be driven away from cradle fixture 322 to move utilities unit 606 away from cradle fixture 322 (operation 2714), with the process terminating thereafter.

Figure 28:
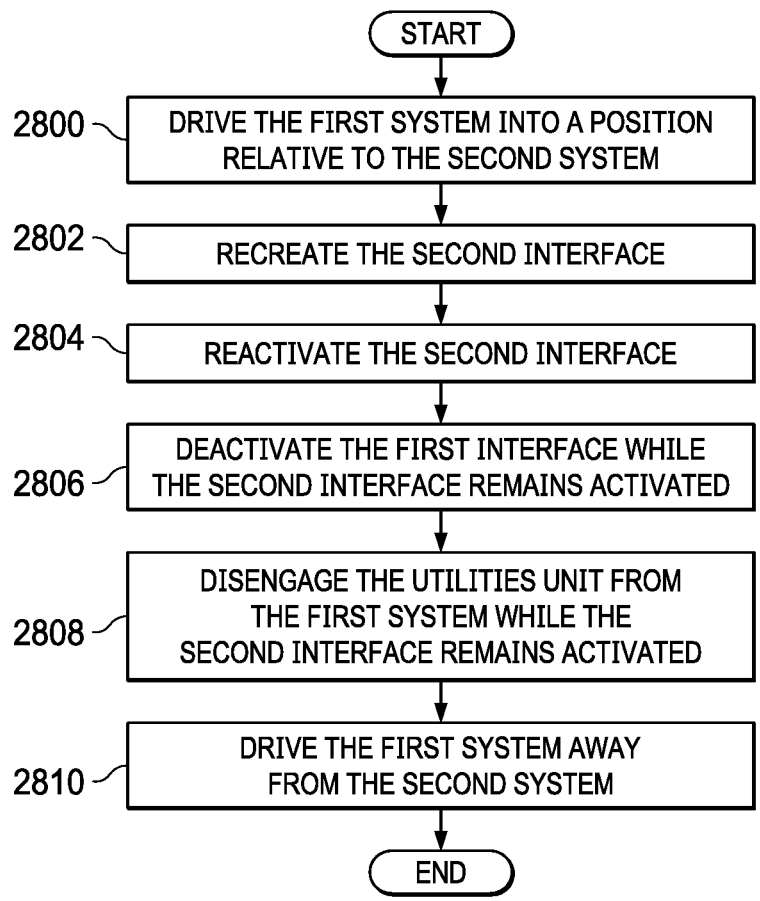
FIG. 28 is an illustration of a process for decoupling a number of utilities between an external mobile platform and a cradle fixture in the form of a flowchart in accordance with an illustrative embodiment.

With reference now to FIG. 28, an illustration of a process for decoupling a number of utilities between a first system and a second system is depicted in the form of a flowchart in accordance with an illustrative embodiment. The process illustrated in FIG. 28 may be implemented to decouple number of utilities 146 between first system 601 and second system 603 in FIG. 6.

The process described in FIG. 28 may be performed after, for example, without limitation, the process described in FIG. 26 has been performed. Prior to the process in FIG. 28 beginning, utilities unit 606 may be mechanically coupled to first system 601 but not mechanically coupled to second system 603 from FIG. 6. Further, utilities unit 606 may have utility interface 653 with first system 601.

The process may begin by driving first system 601 into a position relative to second system 603 (operation 2800). Next, second interface 626 may be recreated (operation 2802). In operation 2802, creating second interface 626 mechanically couples utilities unit 606 to second system 603. Then, second interface 626 may be reactivated (operation 2804). First interface 624 may then be deactivated while second interface 626 remains activated (operation 2806).

Thereafter, utilities unit 606 may be disengaged from first system 601 while second interface 626 remains activated (operation 2808). Then, first system 601 may be driven away from second system 603 (operation 2810), with the process terminating thereafter. Depending on the implementation, one or more of the operations described above may be performed autonomously.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 29:
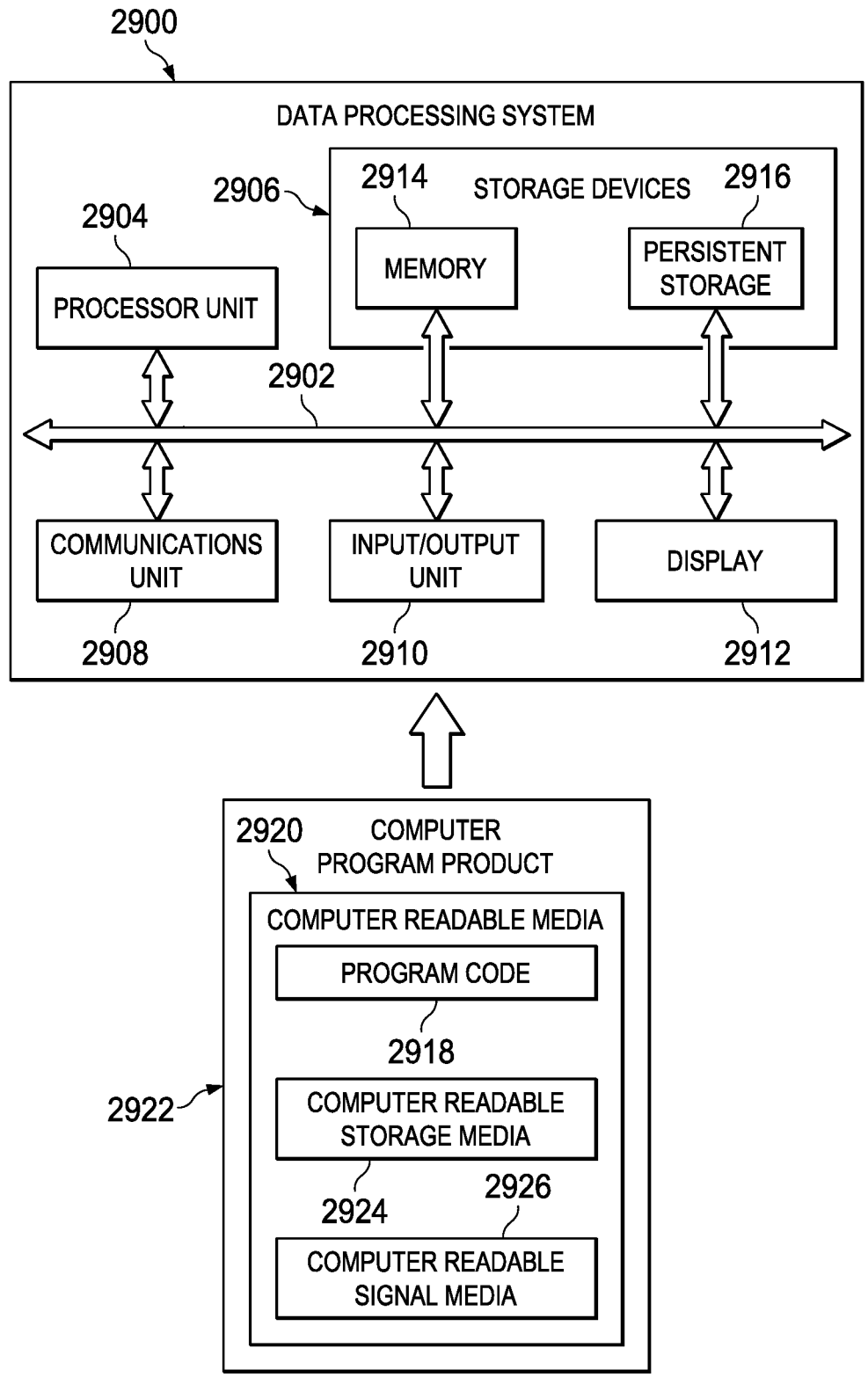
FIG. 29 is an illustration of a data processing system in the form of a block diagram in accordance with an illustrative embodiment.

Turning now to FIG. 29, an illustration of a data processing system is depicted in the form of a block diagram in accordance with an illustrative embodiment. Data processing system 2900 may be used to implement any of the controllers described above, including control system 136 in FIG. 1. In some illustrative examples, data processing system 2900 may be used to implement at least one of a controller in set of controllers 140 in FIG. 1.

As depicted, data processing system 2900 includes communications framework 2902, which provides communications between processor unit 2904, storage devices 2906, communications unit 2908, input/output unit 2910, and display 2912. In some cases, communications framework 2902 may be implemented as a bus system.

Processor unit 2904 is configured to execute instructions for software to perform a number of operations. Processor unit 2904 may comprise at least one of a number of processors, a multi-processor core, or some other type of processor, depending on the implementation. In some cases, processor unit 2904 may take the form of a hardware unit, such as a circuit system, an application specific integrated circuit (ASIC), a programmable logic device, or some other suitable type of hardware unit.

Instructions for the operating system, applications and programs run by processor unit 2904 may be located in storage devices 2906. Storage devices 2906 may be in communication with processor unit 2904 through communications framework 2902. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 2914 and persistent storage 2916 are examples of storage devices 2906. Memory 2914 may take the form of, for example, a random access memory or some type of volatile or non-volatile storage device. Persistent storage 2916 may comprise any number of components or devices. For example, persistent storage 2916 may comprise a hard drive, a flash memory, a rewritable optical disk, a rewritable magnetic tape, or some combination of the above. The media used by persistent storage 2916 may or may not be removable.

Communications unit 2908 allows data processing system 2900 to communicate with other data processing systems, devices, or both. Communications unit 2908 may provide communications using physical communications links, wireless communications links, or both.

Input/output unit 2910 allows input to be received from and output to be sent to other devices connected to data processing system 2900. For example, input/output unit 2910 may allow user input to be received through a keyboard, a mouse, some other type of input device, or a combination thereof. As another example, input/output unit 2910 may allow output to be sent to a printer connected to data processing system 2900.

Display 2912 is configured to display information to a user. Display 2912 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 2904 using computer-implemented instructions. These instructions may be referred to as program code, computer usable program code, or computer readable program code and may be read and executed by one or more processors in processor unit 2904.

In these examples, program code 2918 is located in a functional form on computer readable media 2920, which is selectively removable, and may be loaded onto or transferred to data processing system 2900 for execution by processor unit 2904. Program code 2918 and computer readable media 2920 together form computer program product 2922. In this illustrative example, computer readable media 2920 may be computer readable storage media 2924 or computer readable signal media 2926.

Computer readable storage media 2924 is a physical or tangible storage device used to store program code 2918 rather than a medium that propagates or transmits program code 2918. Computer readable storage media 2924 may be, for example, without limitation, an optical or magnetic disk or a persistent storage device that is connected to data processing system 2900.

Alternatively, program code 2918 may be transferred to data processing system 2900 using computer readable signal media 2926. Computer readable signal media 2926 may be, for example, a propagated data signal containing program code 2918. This data signal may be an electromagnetic signal, an optical signal, or some other type of signal that can be transmitted over physical communications links, wireless communications links, or both.

The illustration of data processing system 2900 in FIG. 29 is not meant to provide architectural limitations to the manner in which the illustrative embodiments may be implemented. The different illustrative embodiments may be implemented in a data processing system that includes components in addition to or in place of those illustrated for data processing system 2900. Further, components shown in FIG. 29 may be varied from the illustrative examples shown.

Figure 30:
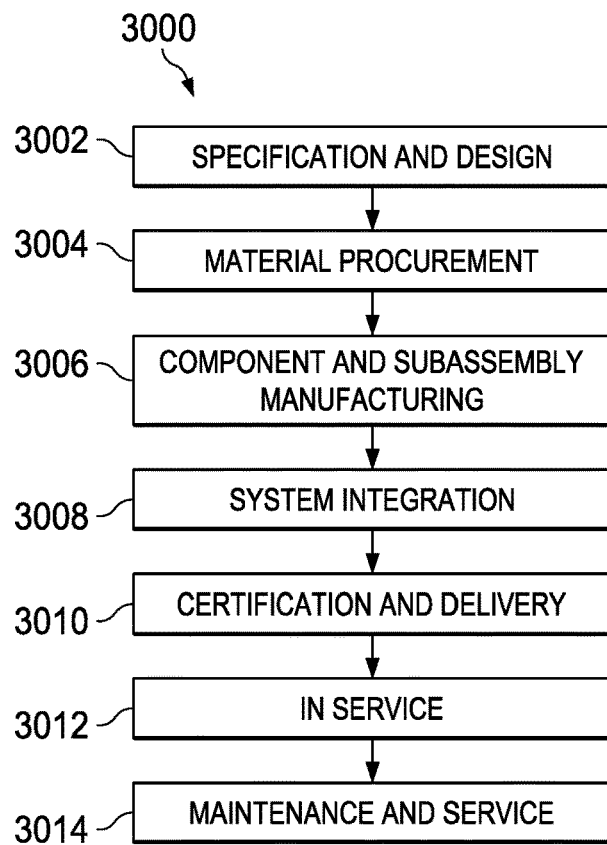
FIG. 30 is an illustration of an aircraft manufacturing and service method in the form of a block diagram in accordance with an illustrative embodiment.
Figure 31:
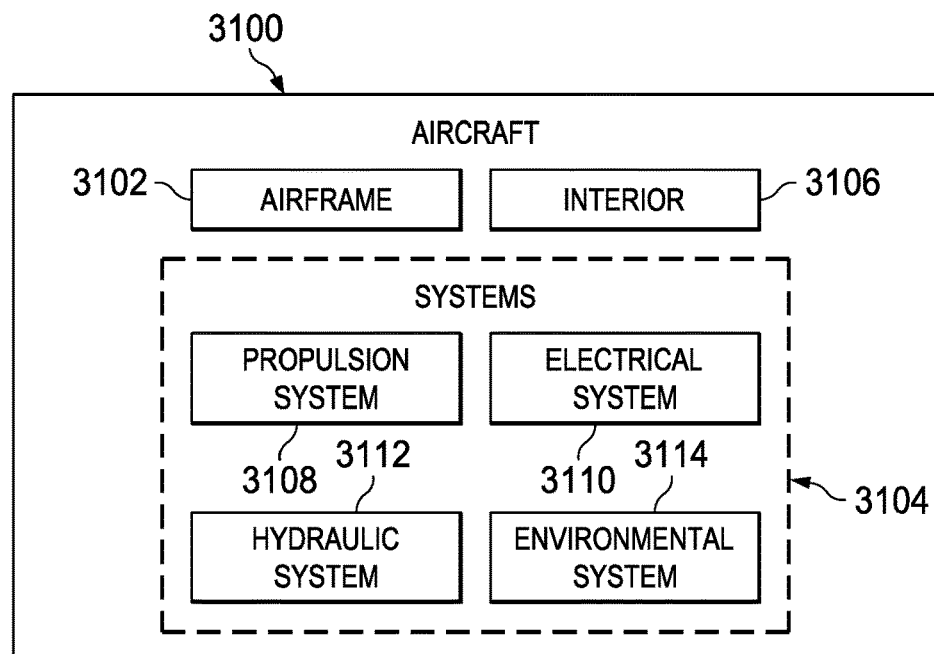
FIG. 31 is an illustration of an aircraft in the form of a block diagram in which an illustrative embodiment may be implemented.

The illustrative embodiments of the disclosure may be described in the context of aircraft manufacturing and service method 3000 as shown in FIG. 30 and aircraft 3100 as shown in FIG. 31. Turning first to FIG. 30, an illustration of an aircraft manufacturing and service method is depicted in the form of a block diagram in accordance with an illustrative embodiment. During pre-production, aircraft manufacturing and service method 3000 may include specification and design 3002 of aircraft 3100 in FIG. 31 and material procurement 3004.

During production, component and subassembly manufacturing 3006 and system integration 3008 of aircraft 3100 in FIG. 31 takes place. Thereafter, aircraft 3100 in FIG. 31 may go through certification and delivery 3010 in order to be placed in service 3012. While in service 3012 by a customer, aircraft 3100 in FIG. 31 is scheduled for routine maintenance and service 3014, which may include modification, reconfiguration, refurbishment, and other maintenance or service.

Each of the processes of aircraft manufacturing and service method 3000 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 31, an illustration of an aircraft is depicted in the form of a block diagram in which an illustrative embodiment may be implemented. In this example, aircraft 3100 is produced by aircraft manufacturing and service method 3000 in FIG. 30 and may include airframe 3102 with plurality of systems 3104 and interior 3106. Examples of systems 3104 include one or more of propulsion system 3108, electrical system 3110, hydraulic system 3112, and environmental system 3114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3000 in FIG. 30. In particular, flexible manufacturing system 106 from FIG. 1 may be used to build at least a portion of airframe 3102 of aircraft 3100 during any one of the stages of aircraft manufacturing and service method 3000. For example, without limitation, flexible manufacturing system 106 from FIG. 1 may be used during at least one of component and subassembly manufacturing 3006, system integration 3008, or some other stage of aircraft manufacturing and service method 3000 to form a fuselage for aircraft 3100.

In one illustrative example, components or subassemblies produced in component and subassembly manufacturing 3006 in FIG. 30 may be fabricated or manufactured in a manner similar to components or subassemblies produced while aircraft 3100 is in service 3012 in FIG. 30. As yet another example, one or more apparatus embodiments, method embodiments, or a combination thereof may be utilized during production stages, such as component and subassembly manufacturing 3006 and system integration 3008 in FIG. 30. One or more apparatus embodiments, method embodiments, or a combination thereof may be utilized while aircraft 3100 is in service 3012, during maintenance and service 3014 in FIG. 30, or both. The use of a number of the different illustrative embodiments may substantially expedite the assembly of and reduce the cost of aircraft 3100.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A utilities unit for providing a number of utilities from a second system to a first system, comprising:
   a number of utility cables configured to provide the number of utilities from the second system to the utilities unit;
   a first coupling unit on a first side of the utilities unit, wherein the first coupling unit is configured to mechanically couple the utilities unit to the first system and form a utility interface between the utilities unit and the first system when the utilities unit is engaged to the first system, wherein the first coupling unit is configured to be locked to the first system such that the utilities unit cannot be disengaged from the first system and to be unlocked from the first system such that the utilities unit can be disengaged from the first system;
   a second coupling unit on a second side of the utilities unit, wherein the second coupling unit is configured to mechanically couple the utilities unit to the second system, wherein the second coupling unit is configured to be locked to the second system such that the utilities unit cannot be disengaged from the second system and to be unlocked from the second system such that the utilities unit can be disengaged from the second system; and
   a compliance unit configured to aid in aligning the first coupling unit with the first system when the first system is moved to engage the first system with the first coupling unit while the second coupling unit is locked to the second system;
   wherein the utilities unit is movable with the first system away from the second system when the first coupling unit is engaged to the first system and the second coupling unit is disengaged from the second system; and
   wherein the number of utilities are distributable from the second system through the number of utility cables to the utilities unit and across the utility interface from the utilities unit to the first system when the first system with the utilities unit is moved away from the second system.

2. The utilities unit of claim 1 further comprising:
   a first corresponding coupling unit associated with the first system, wherein the first coupling unit is configured to mechanically couple the utilities unit to the first corresponding coupling unit to engage the utilities unit to the first system; and
   a second corresponding coupling unit associated with the second system, wherein the second coupling unit is configured to mechanically couple the utilities unit to the second corresponding coupling unit to engage the utilities unit to the second system.

3. The utilities unit of claim 1, further comprising:
   a first interlocking device configured to lock the first coupling unit to the first system; and
   a second interlocking device configured to lock the second coupling unit to the second system.

4. The utilities unit of claim 1, wherein:
   the first coupling unit comprises a first quick-change device; and
   the second coupling unit comprises a second quick-change device.

5. The utilities unit of claim 4, wherein:
   the first quick-change device comprises a male quick-change device; and
   the second quick-change device comprises a female quick-change device.

6. The utilities unit of claim 1, wherein the compliance unit comprises a number of springs that provide the first coupling unit with rotational freedom of movement.

7. A utilities unit for providing a number of utilities from a second system to a first system, comprising:
   a number of utility cables configured to provide the number of utilities from the second system to the utilities unit;
   a first coupling unit on a first side of the utilities unit, wherein the first coupling unit is configured to mechanically couple the utilities unit to the first system and form a utility interface between the utilities unit and the first system when the utilities unit is engaged to the first system;
   a second coupling unit on a second side of the utilities unit, wherein the second coupling unit is configured to mechanically couple the utilities unit to the second system; and
   a compliance unit configured to aid in aligning the first coupling unit with the first system when the first system is moved to engage the first system with the first coupling unit while the second coupling unit is mechanically coupled to the second system;
   wherein the utilities unit is movable with the first system away from the second system when the first coupling unit is engaged to the first system and the second coupling unit is disengaged from the second system; and
   wherein the number of utilities are distributable from the second system through the number of utility cables to the utilities unit and across the utility interface from the utilities unit to the first system when the first system with the utilities unit is moved away from the second system.

8. The utilities unit of claim 7, wherein the first system is an external mobile platform and the second system is a cradle fixture.

9. The utilities unit of claim 7, further comprising:
   a first interlocking device configured to lock the first coupling unit to the first system; and a second interlocking device configured to lock the second coupling unit to the second system.

10. The utilities unit of claim 7 further comprising:
a first corresponding coupling unit associated with the first system, wherein the first coupling unit is configured to mechanically couple the utilities unit to the first corresponding coupling unit to engage the utilities unit to the first system; and
a second corresponding coupling unit associated with the second system, wherein the second coupling unit is configured to mechanically couple the utilities unit to the second corresponding coupling unit to engage the utilities unit to the second system.

11. The utilities unit of claim 7, wherein:
the first corresponding coupling unit comprises a first corresponding quick-change device;
the second corresponding coupling unit comprises a second corresponding quick-change device;
the first coupling unit comprises a first quick-change device; and
the second coupling unit comprises a second quick-change device.

12. The utilities unit of claim 11, wherein:
the first corresponding quick-change device comprises a first female quick-change device;
the second corresponding quick-change device comprises a first male quick-change device;
the first quick-change device comprises a second male quick-change device; and
the second quick-change device comprises a second female quick-change device.

13. The utilities unit of claim 10 further comprising an alignment system configured to align the second coupling unit with the second corresponding coupling unit.

14. The utilities unit of claim 13, wherein the alignment system is associated with the second corresponding coupling unit.

15. The utilities unit of claim 7, wherein the compliance unit comprises a number of springs that provide the first coupling unit with rotational freedom of movement.

16. A method of providing a number of utilities from a second system to a first system, comprising:
coupling the first system to a utilities unit;
coupling the second system to the utilities unit; and
providing the number of utilities from the second system to the first system through the utilities unit; wherein the utilities unit comprises:
a number of utility cables configured to provide the number of utilities from the second system to the utilities unit,
a first coupling unit on a first side of the utilities unit, wherein the first coupling unit is configured to mechanically couple the utilities unit to the first system and form a utility interface between the utilities unit and the first system when the utilities unit is engaged to the first system, wherein the first coupling unit is configured to be locked to the first system such that the utilities unit cannot be disengaged from the first system and to be unlocked from the first system such that the utilities unit can be disengaged from the first system,
a second coupling unit on a second side of the utilities unit, wherein the second coupling unit is configured to mechanically couple the utilities unit to the second system, wherein the second coupling unit is configured to be locked to the second system such that the utilities unit cannot be disengaged from the second system and to be unlocked from the second system such that the utilities unit can be disengaged from the second system, and
a compliance unit configured to aid in aligning the first coupling unit with the first system when the first system is moved to engage the first system with the first coupling unit while the second coupling unit is locked to the second system,
wherein the utilities unit is movable with the first system away from the second system when the first coupling unit is engaged to the first system and the second coupling unit is disengaged from the second system, and
wherein the number of utilities are distributable from the second system through the number of utility cables to the utilities unit and across the utility interface from the utilities unit to the first system when the first system with the utilities unit is moved away from the second system.

17. The method of claim 16, wherein the first system is an external mobile platform and the second system is a cradle fixture.

18. The method of claim 16 further comprising using an alignment system to align the second coupling unit with the second system.

19. The method of claim 16, wherein:
the first system is an external mobile platform configured to be driven to a position relative to an exterior of a fuselage assembly to perform an operation on the fuselage assembly; and
the second system is a cradle fixture configured to hold the fuselage assembly.

20. The method of claim 16, wherein the compliance unit comprises a number of springs that provide the first coupling unit with rotational freedom of movement.

* * * * *